United States Patent [19]
Akao et al.

[11] Patent Number: 5,307,464
[45] Date of Patent: Apr. 26, 1994

[54] MICROPROCESSOR AND METHOD FOR SETTING UP ITS PERIPHERAL FUNCTIONS

[75] Inventors: Yasushi Akao, Kokubunji; Shiro Baba, Tokorozawa; Yoshiyuki Miwa, Kawasaki; Terumi Sawase, Hannou; Yuji Sato, Kokubunji; Shigeki Masumura, Kodaira, all of Japan

[73] Assignees: Hitachi, Ltd.; Hitachi VLSI Engineering Corp., Tokyo, Japan

[21] Appl. No.: 621,641

[22] Filed: Dec. 3, 1990

[30] Foreign Application Priority Data

| Dec. 7, 1989 | [JP] | Japan | 1-318573 |
| Jan. 29, 1990 | [JP] | Japan | 2-15991 |
| Mar. 12, 1990 | [JP] | Japan | 2-57953 |
| Mar. 16, 1990 | [JP] | Japan | 2-64251 |
| Nov. 26, 1990 | [JP] | Japan | 2-321649 |

[51] Int. Cl.⁵ ............................................. G06F 13/00
[52] U.S. Cl. ................................... 395/325; 395/275; 364/244.9; 364/267.91; 364/275.5; 364/DIG. 1; 364/925.6; 364/965.76; 364/965.77; 364/DIG. 2
[58] Field of Search ......................... 395/325, 275, 650; 371/16.1, 19; 364/267.91, 275.5, 244.9, DIG. 1, 965.77, 925.6, 965.76, DIG. 2

[56] References Cited

U.S. PATENT DOCUMENTS

| 3,753,236 | 8/1973 | Flynn et al. | 395/375 |
| 4,079,452 | 3/1978 | Larson et al. | 395/275 |
| 4,153,933 | 5/1979 | Blume, Jr. et al. | 395/325 |
| 4,720,812 | 1/1988 | Kao et al. | 395/700 |
| 5,021,996 | 6/1991 | Watanabe | 395/800 |
| 5,101,490 | 3/1992 | Getson et al. | 395/425 |

FOREIGN PATENT DOCUMENTS

| 0111161 | 6/1984 | European Pat. Off. | G06F 9/26 |
| 0306962 | 3/1989 | European Pat. Off. | G06F 15/06 |
| 0361525 | 4/1990 | European Pat. Off. | G06F 15/78 |
| 0364743 | 4/1990 | European Pat. Off. | G06F 15/78 |
| 2226433 | 6/1990 | United Kingdom | G06F 13/00 |

Primary Examiner—Michael R. Fleming
Assistant Examiner—Glenn A. Auve
Attorney, Agent, or Firm—Fay, Sharpe, Beall, Fagan, Minnich & McKee

[57] ABSTRACT

A single chip microprocessor 1 includes a CPU 2 and a sub-processor 5 for software implementation of peripheral functions of the microprocessor 1. Sub-processor 5 includes electrically writable internal storage devices microprogram memory unit 13 and sequence control memory unit 62 for storing the software. Peripheral functions are defined and/or modified by writing software into the memory units 13 and 62. Accordingly, the time it takes to define and/or modify the peripheral functions is the time it takes to program the memory units 13 and 62. The sub-processor 5 also includes an execution unit 16 for executing a plurality of tasks and an address control circuit 14 for providing addresses to the microprogram memory unit 13. Additionally, the microprogram memory unit 13 provides microinstructions to the execution unit 16. The sequence control memory unit 62 is part of the address control circuit 14 which also includes a plurality of address registers MAR0 to MAR11. The sequence control memory unit 62 is used for storing information regarding the order of selection of the multiple address registers MAR0 to MAR11. One of the address registers MAR0 to MAR11 is selected each time the sequence control memory unit 62 is read. A microaddress stored in the selected address register is then supplied to the microprogram memory unit 13.

13 Claims, 34 Drawing Sheets

FIG. 3A
| | NO. | INSTRUCTION | OPERATION |
|---|---|---|---|
| GENERAL INSTRUCTION | 1 | MOV | Rs(Imm) → Rd |
| | 2 | ADD[/Cin] | Rd+Rs(Imm)+Cin → Rd<br>Cin:0.I.Pi |
| | 3 | SUB[/Cin] | Rd-Rs(Imm)-Cin → Rd<br>Cin:0.I.Pi |
| | 4 | CMP | Rd-Rs(Imm) |
| | 5 | AND | Rd ∧ Rs(Imm) → Rd |
| | 6 | OR | Rd ∨ Rs(Imm) → Rd |
| | 7 | EOR | Rd ⊕ Rs(Imm) → Rd |
| | 8 | LSL[/Cin] | 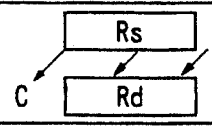 |
| | 9 | LSR[/Cin] | 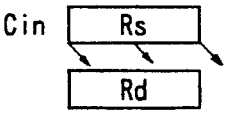 |
| | 10 | NOP | NON OPERATION |
| | 11 | TST | Rd ∧ Rs(Imm) |
| TIMER INSTRUCTION | 12 | INCCLR | 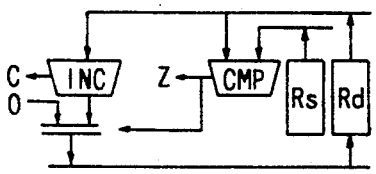 |
| | 13 | INCCMP | 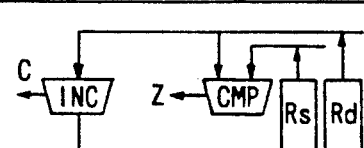 |
| | 14 | DECCMP | CHANGE INC IN INCCMP TO DEC |
| | 15 | DECLD | 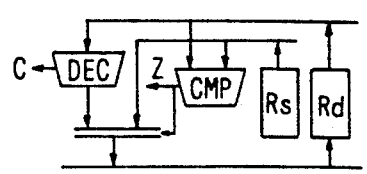 |

| INSTRUCTION | OPERATION |
|---|---|
| WRSET Rs,MDB | Rs(Imm) → DATA BUFFER |
| WRSTART Rs,MAB | Rs(Imm) → ADDRESS BUFFER (STARTS THE WRITE CYCLE) |
| RDSTART Rs,MAB | Rs(Imm) → ADDRESS BUFFER (STARTS THE READ CYCLE) |
| RDGET MDB,Rd | DATA BUFFER → Rd |
| REFRESH Rs,MAB | Rs(Imm) → ADDRESS BUFFER (STARTS THE REFRESH CYCLE) |

FIG. 5

```
   PWM TIMER LIBRARY                                          }30

R0  ; COUNTER
   ICR0 ; ENABLE/DISABLE BIT OF COUNTER
    MAX ; VALUE FOR DEFINING A PERIOD OF COUNTER
   IOR00 ; OUTPUT 0 OF PWM TIMER
   IOR01 ; OUTPUT 1 OF PWM TIMER
   IOR02 ; OUTPUT 2 OF PWM TIMER
    R1  ; REGISTER FOR SETTING A VALUE DEFINING A DUTY OF     }31
          OUTPUT 0 OF PWM TIMER
    R2  ; REGISTER FOR SETTING A VALUE DEFINING A DUTY OF
          OUTPUT 1 OF PWM TIMER
    R3  ; REGISTER FOR SETTING A VALUE DEFINING A DUTY OF
          OUTPUT 2 OF PWM TIMER

MOV #0,R0                              ;SETTING INITIAL
                                                  CONDITION

LOCP.E NOP         (Pi)START,LOCP.E.(Pi=ICR0);ENABLING COUNTER
                                                 OPERATION ?

START  INCCLR#MAX R0                                        }32

CMP R1,R0          (Z)P0=T (P0=IOR00)

CMP R2,R0          (Z)P0=T (P0=IOR01)

CMP R3,R0 LOCP.E (Z)P0=T (P0=IOR02)
```

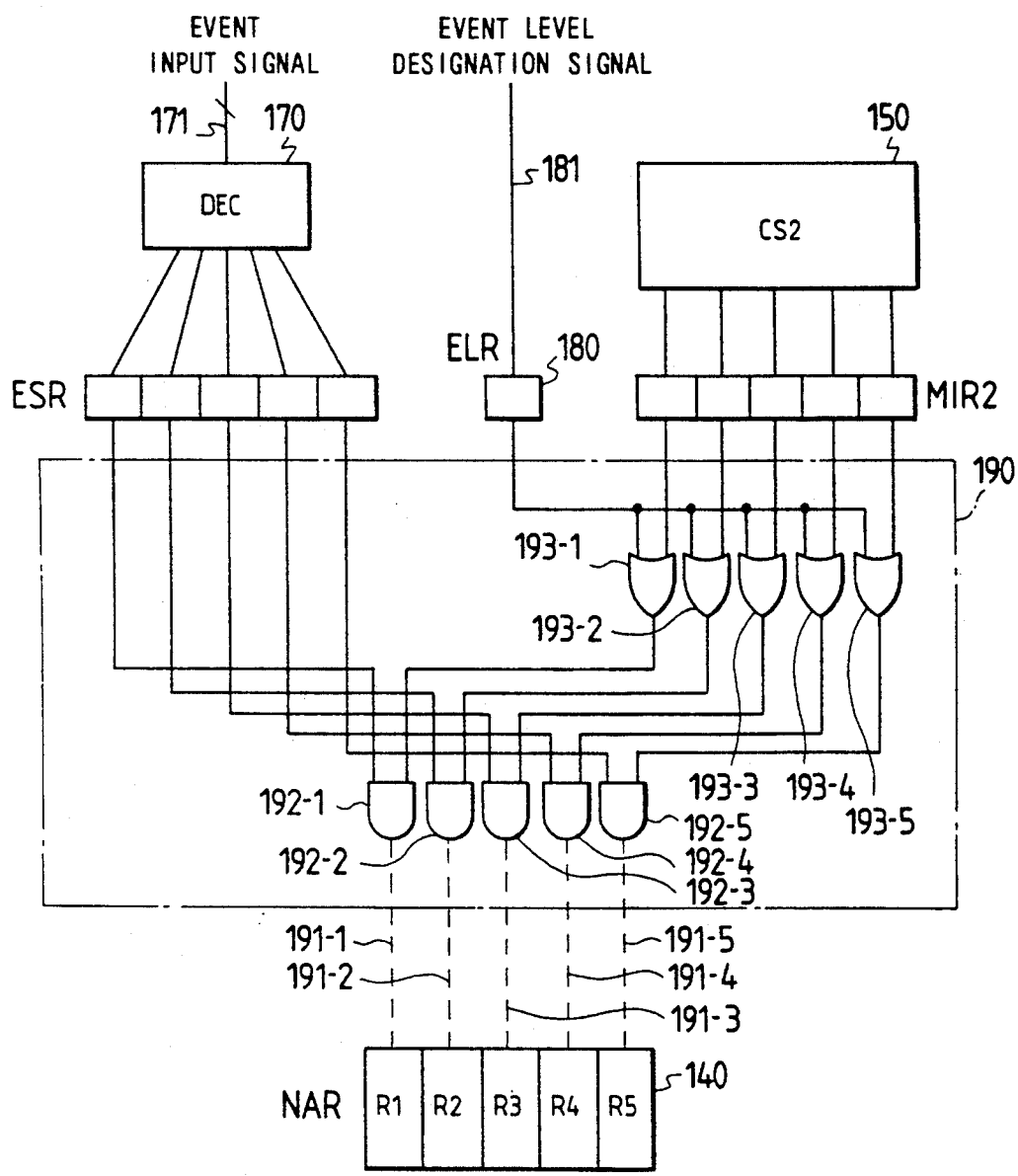

FIG. 21

| NO. | FLOW OF TASK EXECUTION | EXAMPLE OF PROGRAM | CONTENT |
|---|---|---|---|
| 1 | 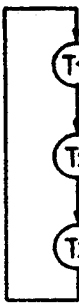 | L1 (T1)<br>   (T2)<br>   (T3)<br><br>L1(T1,T2,T3) BR(L1) | · TASKS $T_1$, $T_2$ AND $T_3$ ARE EXECUTED REPEATEDLY AND SUCCESSIVELY. |
| 2 | 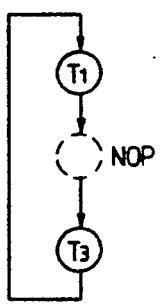 | L1 (T1)<br>   ( )<br>   (T3) BR(L1)<br><br>L1(T1, ,T3) BR(L1) | · AFTER EXECUTION OF TASK $T_1$, TASK NOP IS EXECUTED.<br>AFTER THAT, TASK $T_3$ IS EXECUTED.<br>ABOVE STEPS REPEAT. |
| 3 | 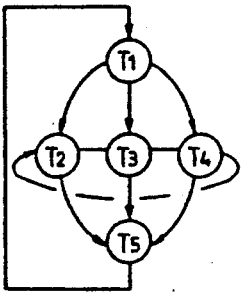 | L1 (T1)<br>   SQ(T2,T3,T4)<br>   (T5) BR(L1) | · TASKS $T_1$, $T_j$ AND $T_5$ ARE EXECUTED REPEATEDLY AND SUCCESSIVELY TASK $T_j$ IS CHANGED TO TASK $T_2$, $T_3$ OR $T_4$ EVERY ONE CYCLE. |
| 4 | 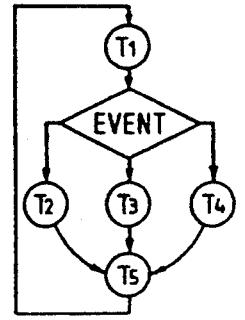 | L1 (T1)<br>   EV(T2,T3,T4)<br>   (T5) BR(L1) | · AFTER EXECUTION OF TASK $T_1$, ONE OF EITHER TASK $T_2$, $T_3$ OR $T_4$ IS SELECTED AND EXECUTED IN RESPONSE TO LEVEL OF EXTERNAL SIGNAL. AFTER THAT, TASK $T_5$ IS EXECUTED.<br>ABOVE STEPS REPEAT. |

MICROPROCESSOR AND METHOD FOR SETTING UP ITS PERIPHERAL FUNCTIONS

BACKGROUND OF THE INVENTION

1. Field of the Invention

The present invention particularly relates to a single chip microprocessor comprising a central processing unit and a means for implementing its peripheral functions embedded in the same semiconductor package as the central processing unit and relates to a method for setting up the peripheral functions of the microprocessor. The invention thus relates to an effective technology applicable to a technique for coping up with the user's typical need for facilities for setting up and modifying operational specifications and functions of the microprocessor.

2. Description of the Prior Art

In the case of a microprocessor such as a single chip microcomputer comprising a CPU (Central Processing Unit) as a core and necessary peripheral circuits embedded in a single semiconductor package, electrically writable read-only memory known as EPROM is used as program memory for storing its software programs so as to allow the programs to be modified and program bugs to be corrected. A technology allowing external code to be written into such EPROM has been disclosed in Japanese Patent Laid-open No. 60-198667.

By the way, in recent years, while the microcomputer application system is becoming versatile and even smaller in size, there is every indication that the number of applications of single chip microcomputers embedding a variety of on-chip hardware peripheral circuits is increasing more and more. As a result, the single chip microcomputer has got to embed a variety of hardware peripheral circuits configurable also as logic external to the CPU such as interface circuits, timers, counters, and serial input/output control circuits. However, even though software stored in EPROM program memory can be modified, the hardware peripheral circuits embedded in such a microcomputer, particularly functional portions of the hardware logic, are fixed. Therefore, the overall design of the microcomputer and a master pattern for manufacturing use must inevitably be modified in order to change logical functions of the embedded hardware. As a result, the microcomputer user can neither by himself set required operational specifications and functions into the functional portions of the embedded hardware logic nor even modify them. In addition, there is a lack of flexibility in coping with needs to modify operational specifications and functions of a microcomputer application system during the development phase of the system. Being aware of such problems, the inventors of the invention studied a technique for implementing required peripheral functions through software which is stored into electrically writable non-volatile memory elements in their writable state. Viewing the problems one step further from the standpoint of implementing peripheral functions that should essentially be defined by the user, the inventors of the invention identified a need for a technology that allows the peripheral functions to be defined more easily or a technology that allows the peripheral functions to be used in the user's own way. In addition, the inventors of the invention also recognized a need to implement the peripheral functions by means of software in a general sense, consuming only low power as well.

SUMMARY OF THE INVENTION

It is an object of the invention to provide a technology for implementing required peripheral functions through software which is stored into electrically writable non-volatile memory elements in their writable state embedded inside of a microprocessor so as to enable the user to use the peripheral functions in his own way.

More specifically speaking, it is an object of the invention to provide a microprocessor that allows the user to set and modify peripheral functions implemented therein with ease and in a short period of time and a method that reduces the user's work load in setting the desired peripheral functions into such a microprocessor.

It is further another object of the invention to provide a microprocessor containing a means for implementing peripheral functions that allows the execution order of tasks executing the peripheral functions to be designated and changed with ease so that the microprocessor can also be easily used in a variety of applications requiring different task execution orders from each other.

It is still further another object of the invention to provide a microprocessor containing a means for implementing peripheral functions that allows the number, types and order of tasks to be executed and the execution speed of each task to be modified at the microprocessor's run time in accordance with a variety of conditions.

It is still further another object of the invention to provide a microprocessor containing a means for implementing peripheral functions that can reduce consumed current in accordance with execution performances of tasks.

The above and other objects, novel features and advantages of the present invention will become apparent from the following description and appended claims, taken in conjunction with the accompanying drawings.

The outlines of representative parts of the invention disclosed in this patent application are briefly described below.

According to a first configuration of the invention, a microprocessor is configured as follows. A microprocessor provided by the invention comprises a central processing unit and writable non-volatile memory elements. The microprocessor also includes a means for implementing peripheral functions which determines the time required for defining or modifying some or all of the peripheral functions to be implemented as a function of the time it takes to store information into the writable non-volatile memory elements. The microprocessor is formed by embedding the central processing unit and the means for implementing peripheral functions into a single semiconductor chip.

In order to enhance the generality of the microprocessor, the means for implementing peripheral functions is configured so that a plurality of peripheral functions can be selected arbitrarily in accordance with information written into the writable non-volatile memory elements. The non-volatile memory elements must therefore be provided with logic for generating a procedure controlling the operations of the peripheral functions. In other words, the nonvolatile memory elements can be either hard-wired logical components or a device for storing a microprogram. However, the latter is preferred due to the fact that a microprogram storing device allows stored information describing the logical configuration to be generated with ease and provides high speed operations.

With peripheral functions such as a timer, a counter, a pulse input/output facility such as a pulse width controller and a communication controller implemented by the peripheral function implementing means described above, control logic for setting and resetting flags connected to external pins is required in order to equip the peripheral functions with capabilities of detecting and influencing external events which are generally found as part of their properties. To increase the speed of the flag control and enhance the resolution of input/output pulses to be handled by the peripheral functions, an information designation field for controlling the flags is included in the code of microinstructions constituting the microprogram.

In order to enhance the functionality of the peripheral function implementing means described above and to increase the cost-performance of the microprocessor, the peripheral function implementing means executes numerous kinds of microinstructions stored in the non-volatile memory elements for every peripheral function or every control item of a peripheral function on a time-division basis. In this way, with a single means for implementing peripheral functions, a plurality of peripheral functions can be implemented on a time-division basis.

Functions are prescribed in the peripheral function implementing means allowing implementable peripheral functions to be selected in accordance with the configuration of a system in which the microprocessor is employed. Accordingly, assuming that at the time the microprocessor is delivered to the user, the specification of the application system is not written yet or that the user wants to freely use the peripheral functions of the microprocessor in a way different from application system to application system, the inventors of the invention believe it is desirable for the manufacturer to ship the microprocessor with no information defining peripheral functions stored in the non-volatile memory elements of the peripheral function implementing means. In this way, electrically nonerasable non-volatile memory elements require no ultraviolet light erasing window or no operation to erase prestored information is necessary even if such a window is provided. As for non-volatile memory elements which can be electrically both erasable and writable, shipping the microprocessor in this way prevents undesirable information irrelevant to peripheral functions to be implemented from remaining stored as it is.

In the case of peripheral functions to be set in a such microprocessor, it is desirable for the manufacturer to provide in advance a library of information for defining implementable functions by using the peripheral function implementing means. The user can thus select desired information from the library and use the selected information to program the non-volatile memory elements of the peripheral function implementing means.

In order to easily implement the above method using a work station or a personal computer, a list of functions of the information provided in advance as a library is displayed on the screen or CRT of the computer system. As the user selects a desired function from the displayed list, information for defining characteristics of the selected function are retrieved from the storage media, typically a floppy disk, of the computer system. The retrieved information is then transmitted by the computer system to a writer where the non-volatile memory elements of the peripheral function implementing means are programmed.

In this way, by spending only the time it takes to write information into the non-volatile memory elements included in the peripheral function implementing means, the peripheral functions can be set or modified. This means that the microprocessor user can also set and modify peripheral functions to be embedded into the chip in a short period of time with ease.

Since the peripheral function implementing means described above is so configured that a variety of peripheral functions different from each other can be selected arbitrarily in accordance with information written into the non-volatile memory elements, the degree of freedom to choose peripheral functions to be implemented is enhanced, resulting in an increase in the generality of the microprocessor. Accordingly, since the range of system applications utilizing the microprocessor is also widened, the degree of the user's freedom to use the microprocessor is further increased as well.

Since no information defining peripheral functions is stored in the peripheral function implementing means at the time the microprocessor is shipped by the manufacturer, the user is assured that he can set peripheral functions freely regardless of the type of the non-volatile memory elements. Therefore, in case no application system utilizing the microprocessor is determined yet at the time the microprocessor is delivered to the user, he can keep the microprocessor in stock at no risk, because he can later, readily make proper use of the microprocessor by setting required peripheral functions depending upon the type of the application system. Also in this case, the user's freedom to use the microprocessor is still increased further.

In addition, the user sets peripheral functions into the microprocessor by selecting information defining the desired ones from a library containing data for facilities implementable in the peripheral function implementing means provided in advance by the manufacturer. The technique for setting peripheral functions thus makes it no longer necessary for the user to develop information on the desired peripheral functions by himself. As a result, the user's work load of setting peripheral functions are reduced.

According to a second configuration of the invention, a peripheral function implementing means provided by the invention comprises a control memory unit for storing microprograms, a plurality of address registers for storing addresses of locations in the control memory unit and an address register selecting means for selecting one or more of the address registers. The address register selecting means is characterized by comprising a means for storing a plurality of selection orders of the address registers and a means for selecting a specific one among the selection orders. A simplified concept of the address register selecting means is shown in FIG. 28.

It is desirable to design an address register selecting means into such a configuration that the address register selecting means receives an external input signal and, in response to the external input signal, a specific address register selection order is chosen. A simplified diagram illustrating the principle of operation of a desirable address register selecting means is shown in FIG. 29.

In this way, the order in which address registers are selected can thus be changed by using an external signal.

The means for selecting an address register selection order typically includes a programmable device such as an EPROM or RAM unit for storing a sequence of specific address register selection orders in advance. The means for selecting an address register selection order is shown in FIG. 30.

The simple configuration of the address register selecting means of FIG. 30 is suitable for selecting a fixed sequence of selection orders.

It is nice to use each of the address registers described above for storing the number of a task. The plurality of address registers thus support different tasks comprising a plurality of microprograms for implementing timer and communication functions, etc. The address registers are shown in FIG. 31.

The assignment of an address register to a task has an advantage of being able to execute tasks readily. As a matter of fact, a plurality of tasks can also be executed so that they appear to run concurrently.

It is desirable to include a selector in the configuration of the address register selecting means described above. The selector specifies whether an address register selection order is selected using data obtained from the means for storing a plurality of selection orders or address registers is selected depending upon the level of an external signal. The selector's simplified principle of operation is shown in FIG. 32.

The inclusion of the selector allows the address register selecting means to cope with a case in which the address register selection orders stored internally do not include the selected one.

In a configuration shown in FIG. 33, address registers are selected by taking the logical AND of data obtained from the means for storing a plurality of selection orders and the level of an external signal. In this way, one of the address registers specified in a stored order is selected eventually by the external signal, resulting in a good selection feature.

It is desirable to make at least one of the control memory unit for storing microprograms and the means for storing a plurality of address register selection orders described above of rewritable non-volatile memory in order to widen the range of applications. In this case, it is needless to say that RAM or others such as EPROM can be used.

In addition, it is also desirable to specify the selection of an address register selection order or the selection of a task execution order through a program language.

In this way, a task execution order can be selected by software. In order to attain the objects of the invention described above, the program development apparatus of the microprocessor is characterized in that an address selection order or task execution order specified by a programming language is converted into displayed data representing a selection order to be input to the means for storing a plurality of address register selection orders.

In this way, an order in which a plurality of address registers each corresponding to a task are selected can be specified by a program language and the selected order is then input to the address register selecting means.

The program language for specifying an address selection order or a task execution order described above is input to the microprocessor or the program development apparatus of the microprocessor. A desirable program language comprises fields for designating a label, an address or a task and a branch specification. Such a program language is easy to understand.

FIG. 34 is a diagram showing a simplified flow of information from the program development apparatus to the microprocessor which allow an address selection order or a task execution order to be specified using a program language. Program examples are shown in FIGS. 21 to 23.

By including a means for storing a plurality of address register selection orders in an address register selecting means, the microprocessor provided by the invention is prepared to readily cope with a variety of selection orders, allowing a selection order to be specified with ease. In addition, by providing a means for selecting a specific selection order among the stored selection orders, it becomes possible to easily switch to the specific selection order.

By providing the address register selecting means with a means for selecting a specific selection order in response to an external signal, the specific selection order can be selected from the selection orders by directly inputting the external signal or by inputting typical control information coming from the CPU of the microcomputer as the external signal. It thus becomes possible to change the order of selecting address registers by using the external signal.

By providing the address register selection order selecting means with a unit of programmable elements for storing a sequence of selection orders in advance, it becomes no longer necessary to provide an external signal from time to time to select a selection order, resulting in a configuration which is effective for a fixed sequence of selection orders or a so-called firmed program of selection orders.

By storing a task number in each address register, the address registers are associated to different tasks. Controlling the selection of the address registers thus allows a task execution order to be switched with ease. Accordingly, by controlling the selection of the address registers on a time-division basis, it also becomes possible to make a plurality of the tasks appear to execute concurrently.

A selector can be included in the configuration of the address register selecting means described above for specifying whether an address register selection order is selected using data obtained from the means for storing a plurality of the selection orders or address registers are selected depending upon the level of an external signal. The inclusion of such a selector allows the address register selecting means to effectively cope with a case in which specific address registers must be selected in accordance with some external factors or a case in which the contents of the means for storing selection orders have been destroyed so that a selection order must be selected by an external signal.

As another alternative, address registers are selected by taking the logical AND of data obtained from the means for storing a plurality of selection orders and the level of an external signal. This alternative allows an external signal such as a signal from the CPU or a signal representing a processing result output by a processing circuit to eventually determine which address is to be selected among specified ones.

An address register selection order or task execution order specified by a programming language is converted by the program development apparatus described above into displayed data representing a selection order to be input to a means for storing a plurality of address register selection orders. In addition, the task registers are each associated with different task numbers. It thus becomes possible to specify a task execution order by software without taking the hardware configuration into consideration. Accordingly, the invention allows anybody to specify a task execution order easily, requiring no knowledge of the hardware. Moreover, the execution order of tasks can be switched with ease continuously without halting the operation of the apparatus.

By using a program language with the format explained above, the description of an address register selection order becomes simple and easy to understand so that anybody can specify a task execution order easily.

According to a third configuration of the invention, a peripheral function implementing means comprises a memory unit into which an execution order of a plurality of tasks can be programmed and a means for dynamically (that is, while the microcomputer is running) changing the sequence of addresses at which data is read from the memory unit.

A first configuration of the means for dynamically changing the sequence of addresses comprises a register and a plurality of counters for generating addresses at which data is read from the memory unit. For each access to the memory unit, an address is generated by combining the contents of the register and the counters. A plurality of tasks are executed successively according to a task execution order read from the memory unit at the generated addresses.

A typical example of the above means is described in more concrete terms as follows. The memory unit into which an execution order of tasks is programmed contains codes for identifying the tasks along with codes for controlling the register and the counters. An address of a location in the memory unit at which a control code is to be read is generated. In addition to the memory unit for storing a program representing the execution order of the tasks, the above means is also provided with a plurality of address registers for holding addresses at which data is read from the memory unit. The means described above also includes a facility for generating an address, at which data is read from the memory unit, based on the contents of an address register and the identification code of a task corresponding to the address register. In addition, a specific value or any arbitrary one can be set into each of the address registers without regard to the execution sequence of the task corresponding to the address register.

The means described above thus makes it possible to control the generation of addresses, converting the addresses into multidimensional values. As has been described, the addresses are used in reading the memory unit into which an execution order of tasks has been programmed. That is to say, since a read address of the memory unit is generated from a value based on a combination of the register and one of the counters, by replacing the counter in the combination with another one, the sequence of read addresses corresponding to the combination can be changed dynamically. Therefore, the execution order of the tasks according to the sequence of read addresses can also be changed dynamically.

It should be noted that part of information on how to replace a counter in the combination of the counter and the register used for generating a read address and how to control the initialization of a counter and to start the counter counting up can also be preprogrammed into the memory unit containing a program which represents the execution order of a plurality of tasks. An address sequence that cannot be programmed in advance can also be controlled dynamically by modifying the contents of the register at any time and for any arbitrary period of time. In addition to the technique using the control code, the address sequence can also be controlled dynamically by changing the combination of the register and a counter and initializing the counter for a counting-up operation at any time and for any arbitrary period of time.

In addition, according to a means more concrete than the one described above, memory addresses at which execution programs of a task are stored can be sequentially generated by using the contents of an address register associated with one of the tasks as a base. In the case an execution program shared among two or more tasks, however, it becomes necessary to identify which task is currently using the execution program. Therefore, a means is provided for generating memory addresses which are different from task to task using a task identification code. Such addresses can be generated by allocating memory areas to execution programs of a task which do not overlap those allocated to execution programs of other tasks. As another alternative such addresses can also be generated by locating only the start address of the execution program of a task or only part of the execution program including the start address at a memory area which does not overlap that allocated to another task. According to a means even more concrete than the one described above, the sequence of the execution program in each task can also be changed dynamically. To be more specific, the execution program of a task can be controlled so as to carry out initialization, halt the execution temporarily or jump to an arbitrary address at any time. Therefore, this means can dynamically control not only the sequence of tasks but also the sequence of the execution program in each task. Even when a plurality of tasks are executing concurrently, the dynamic sequence control can be performed at the execution program level.

According to a fourth configuration of the invention, a microprocessor having a peripheral function implementing means for executing a plurality of tasks on a time-division basis one after another is provided with specific information referred to as task null information which denotes that none of the tasks are to be executed. When the task null information is specified, the peripheral function implementing means enters an idle state. The idle state can be attained by halting the function to execute a task for a predetermined period of time.

A typical means according to the fourth configuration is described in more concrete terms as follows. The idle state can be attained by halting the operation to read a memory unit for storing execution programs of tasks for a predetermined period of time. As another alternative, the output of the memory unit is converted to a fixed value disabling the operation of a functional circuit for executing a program regardless of data read from the memory unit.

A microcomputer according to the invention executes a plurality of tasks sequentially on a time-division basis. Task null information which indicates that none of the tasks are to be executed can also be provided for use in determining which of the tasks is to be executed and in what order the tasks are selected for execution. To be more specific, the operation of the function for executing a task can be halted for any arbitrary period of time at any time during a task execution sequence.

The period of time during which the operation of the function for executing a task can be adjusted according to the required execution performances of the tasks. It is thus possible to control the execution frequency of each task, adjusting each task's turn for execution to a suitable frequency meeting the required execution performance of the task.

When the task null information described above is specified, the operation of each functional circuit related to the execution of a task is halted for a required period of time. The outputs of the functional circuits are converted to fixed values not affecting processing results obtained so far.

The above technique saves the microprocessor an amount of current that would otherwise be consumed by the functional circuits the operations of which are halted during the period of time.

BRIEF DESCRIPTION OF THE DRAWINGS

FIG. 3A is a table explaining typical microinstructions controlling ALU operations used by the sub-processor.

FIG. 5 is a diagram showing the listing of a typical microprogram executed by the sub-processor.

FIG. 20 is a detailed circuit diagram explaining the principle of operation of a means for selecting a next address register employed by the subprocessor shown in FIG. 19.

FIG. 21 is program examples written in a language shown in Table 1.

DETAILED DESCRIPTION OF THE PREFERRED EMBODIMENTS

Figure 1:
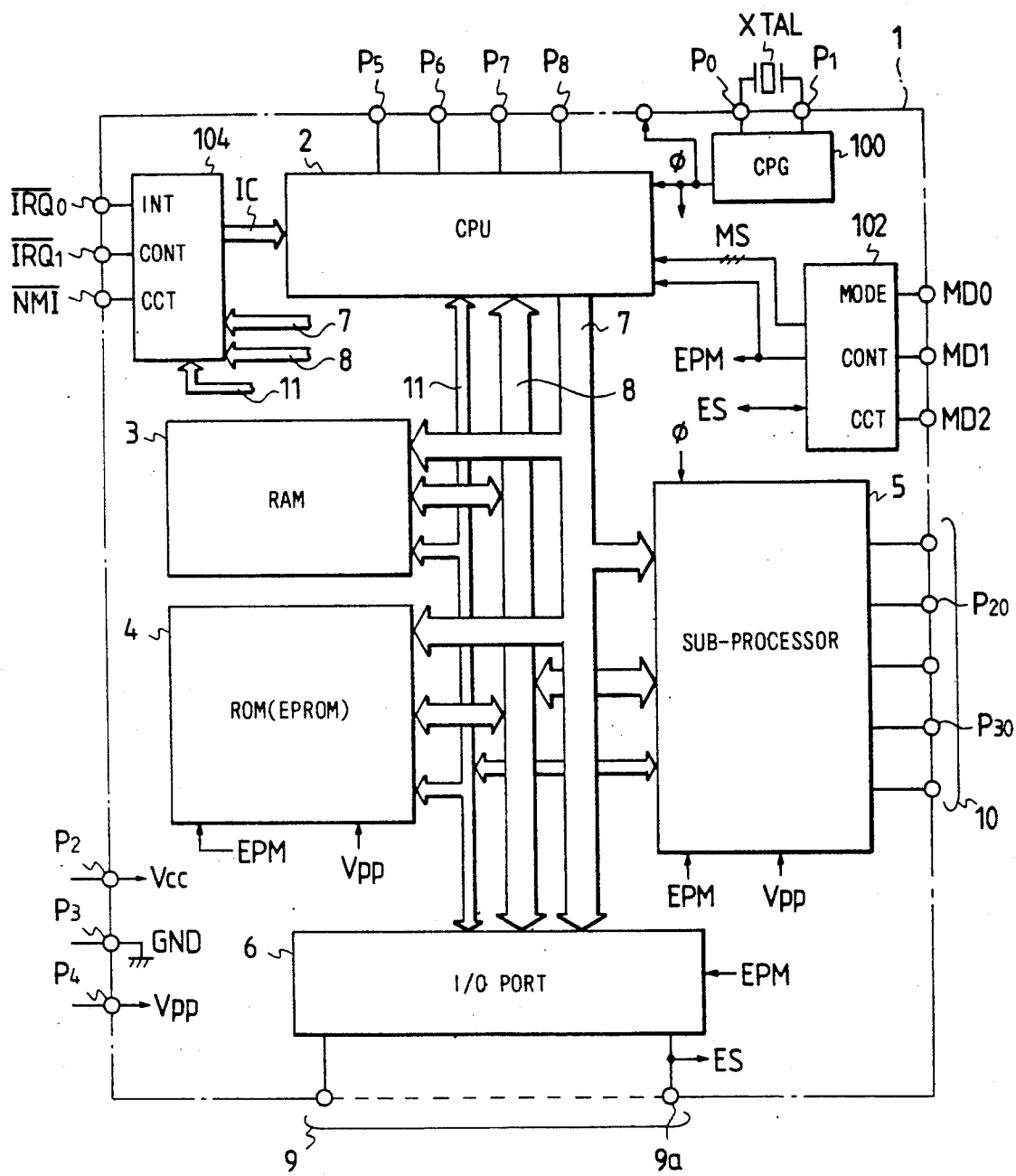
FIG. 1 is a block diagram of an embodiment implementing a microprocessor according to the invention.

FIG. 1 is a diagram showing an embodiment implementing a single chip microprocessor 1 according to the invention. The microprocessor 1 shown in the figure is formed as a single semiconductor chip made of a material such as single crystal silicon using a manufacturing technology known as the CMOS process.

The microprocessor 1 comprises a central processing unit (CPU) 2 for executing microinstructions of an operation program, a random access memory (RAM) unit 3 used as working areas of the CPU 2 or for temporarily storing data, a read-only memory (ROM) unit 4 for storing the microinstructions of the operation program, a sub-processor 5 for implementing peripheral functions by software, a clock pulse generator (CPG) 100 for providing an operation clock $\phi$ to the microprocessor 1, a mode control circuit (MODE CONT CCT) 102 for controlling the operation modes of the microprocessor 1, an interrupt control circuit (INT CONT CCT) 104 for controlling interrupts generated externally and internally, an input/output (I/O) port 6, an address bus 7, a data bus 8, a control bus 11, etc.

Dividing a reference oscillating frequency of typically 20 MHz generated by a crystal oscillator connected across external pins P0 and P1 by 2, the CPG 100 provides a system clock φ with a frequency of 10 MHz to the CPU 2 and the sub-processor 5. The operations of the CPU 2 and the sub-processor 5 are therefore controlled by the system clock φ. It should be noted that the system clock φ is also transmitted to hardware external to the chip of the microprocessor 1 through a clock output pin P5.

Based on the combination of values of signals provided through external pins MD0 to MD2, the mode control circuit 102 determines the operation mode of the CPU 2 which is output as a mode signal (MS). In response to the mode signal (MS), the CPU 2 enters either single chip mode or externally extended mode. In single chip mode, the microprocessor 1 operates as a complete microcomputer system with the CPU 2 being able to access only an address space comprising the RAM unit 3, the ROM unit 4 and on-chip registers embedded in the microprocessor 1. In externally extended mode, on the other hand, the CPU 2 can also access typical ROM and RAM units connected externally to the microprocessor 1 in addition to the embedded RAM unit 3, the embedded ROM unit 4 and the on-chip registers. That is to say, the address space accessible by the CPU 2 operating in external extended mode is extended by off-chip RAM and ROM units. In externally extended mode, the microprocessor 1 shown in FIG. 1 therefore constitutes an extended configuration of the microcomputer system in conjunction with external memory units. Externally extended mode can be minimum mode which supports an address space of 64K bytes or maximum mode supporting an address space of up to 1M bytes.

Depending upon the combination of values of the signals provided through the pins MD0 to MD2, the mode control circuit 102 further outputs another mode signal EPM in response to a signal ES coming from one of a group of external pins a, for example pin a0, connected to the input/output port 6. The mode signal EPM puts the ROM unit 4 embedded in the microprocessor 1 and EPROM or EEPROM units 13 and 62 of the sub-processor 5 in write mode. As will be described later, EPROM or EEPROM means electrically writable read only memory.

The mode signal EPM is supplied to the CPU 2, ROM unit 4, sub-processor 5 and I/O port 6. Receiving the mode signal EPM, the CPU 2 enters a halt state, the ROM unit 4 and the EPROM units of the sub-processor 5 enter write mode and the input/output port 6 enters a state able to execute functions writing code into the EPROM units. Viewed externally, in this state the microprocessor 1 appears merely as an EPROM unit.

The interrupt control circuit 104 is connected to an external pin $\overline{NMI}$ for receiving a non-maskable external interrupt request and external pins $\overline{IRQ0}$ and $\overline{IRQ1}$ for receiving external interrupt requests. Receiving an external interrupt request through the external pins $\overline{NMI}$, $\overline{IRQ0}$ or $\overline{IRQ1}$ or internal interrupt signal output by the sub-processor 5 through the control bus 11, the interrupt control circuit 104 outputs a control signal IC to the CPU 2 for use by the CPU to determine whether an interrupt processing routine associated with the interrupt request is to be executed or not. The interrupt control circuit 104 includes an internal register for setting interrupt priority levels. While the CPU 2 is executing an interrupt processing routine in response to an interrupt request, the interrupt control circuit 104 controls further interrupts on a priority basis. To be more specific, an interrupt request having a priority higher than the one being processed is accepted but a request with a lower priority is not. An address is assigned to the interrupt priority register of the interrupt control circuit 104 for use by the CPU 2 to write data representing interrupt priority levels into the register through the data bus 8.

The input/output port 6 connected to the external pin group a is used as an interface between the microprocessor 1 and external hardware. The input/output port 6 includes an internal data direction register and an internal data register. The data direction register is used for holding data determining the direction of data input or output through the external pin group a. The data direction register receives the data from the CPU 2. In order to write data into the data direction register, the CPU 2 asserts an address assigned to the data direction register on the address bus 7, outputting the data through the data bus 8. A write control signal asserting on the control bus 11 then transfers the data into the data direction register.

In single chip mode, the external pin group a comprises data input, data output and data input/output pins. In externally extended mode, on the other hand, the external pin group a also includes address output pins in addition to the data input, data output and data input/output pins.

The data register aforementioned holds data to be output through the external pin group a. For an example, consider a case in which the CPU 2 outputs data to the data output pins of the external pin group a. In this case, the CPU 2 accesses the data register by asserting an address assigned to the data register on the address bus 7 and at the same time transferring the data to be output to the data register through the data bus 8. On the other hand, when the CPU 2 reads data from the data input pins of the external pin group a or when the CPU 2 outputs an address asserted on the address bus 7 to the address output pins of the external pin group a, the data address register is not used. In this case, the input or output operations are carried out through a buffer circuit instead.

As is described above, the input/output port 6 sets the input/output function of the external pin group a into a state capable of writing code into the ROM unit 4 or the EPROM units of the sub-processor 5 in response to the EPM signal received from the mode control circuit 102. In this state, some pins of the external pin group a function as address input pins, data input/output pins, an output enable signal input pin and a chip enable signal input pin. In this case, the ROM unit 4, for example, is accessed at a memory cell pointed to by an address supplied through the address input pins. Data is then written through the data input/output pins into the memory cell pointed to by the address. In order to verify the write operation, that is, in order to verify whether the data was written correctly into the desired memory cell or not, the contents of the accessed memory cell are output back to the data input/output pins.

The microprocessor 1 includes external pins (P2) and (P4) for receiving a power supply voltage of 5 volts and an EPROM write voltage (Vpp) of 12 volts respectively. The microprocessor 1 also includes an external pin (P3) to be grounded to a potential of 0 volts. When the EPROM unit 4 and the EPROM units of the sub-processor 5 are put in write mode, the write voltage (Vpp) supplied through external pin (P4) is fed to the EPROM unit 4 and the EPROM units of tile subprocessor 5.

A group of external pins 10 connected to the subprocessor 5 are used as an interface between the subprocessor 5 and external hardware.

The CPU 2 outputs control signals such as a read/write control signal (R/$\overline{W}$), an address strobe signal (AS), a data strobe signal (DS), a bus acknowledge signal ($\overline{BACK}$) and a wait control signal ($\overline{WAIT}$) and receives control signals such as a bus request signal ($\overline{BREQ}$) to and from an external system through external pins P5 to P8. That is to say, the above microprocessor 1 appears to have external pins similar to those of a single chip microcomputer manufactured by Hitachi Ltd. such as the one with the model number HD6475328 which is already available in the market. For details of the HD6475328, refer to the first edition of the H81532 HD6457328 HD6435328 Hardware manual published in December 1988 by Hitachi Ltd. The functions of the external pins are particularly described on pages 10 to 20 of the manual.

Figure 11:
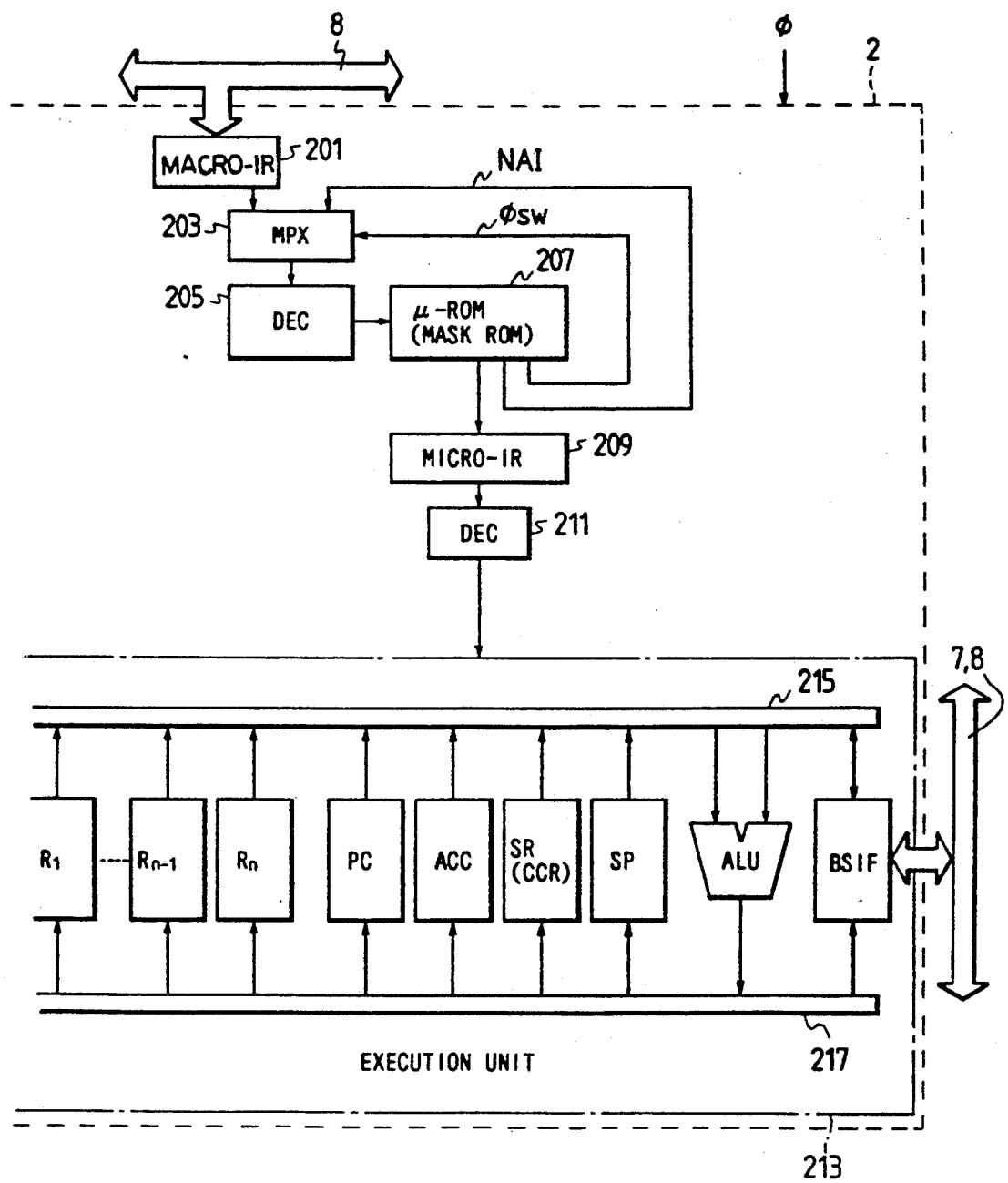
FIG. 11 is a block diagram of the CPU.

A typical configuration of an instruction execution unit of the CPU 2 is shown in FIG. 11.

As shown in the figure, the CPU 2 includes a macroinstruction register (MACRO-IR) 201 for storing a macroinstruction read from the ROM unit 4 through the internal data bus 8. The macroinstruction is then supplied to a macroinstruction decoder 205 through a multiplexer (MPX) 203. Decoding the macroinstruction, the macroinstruction decoder 205 determines a start address at a micro-ROM unit (U-ROM) 207. A microinstruction located at the start address is next read into a microinstruction register (MICRO-IR) 209 which then supplies the microinstruction to a microinstruction decoder 211. The output of the microinstruction decoder 211 is used to control an execution unit 213. The the micro-ROM unit 207 also outputs next address information NAI pointing to a microinstruction to be read in the following step. In addition, the micro-ROM 207 unit provides a timing signal $\phi$ for controlling the multiplexer 203 as well. Driven by the timing signal $\phi$, the multiplexer 203 forwards the next address information (NAI) to the macroinstruction decoder 205. In this way, microinstructions are read from the micro-ROM unit 207 one after another at timings determined by the system clock signal 0, with each microinstruction decoded for controlling the execution unit 213. In this way, for each macroinstruction, a plurality of microinstructions are read in order to execute the operation of the microprocessor 1.

The micro-ROM unit 207 is typically made of mask ROM, a type of memory into which information is stored through photomasks used in semiconductor manufacturing processes. The micro-ROM unit 207 can also be made of EPROM.

The execution unit 213 comprises an arithmetic logic unit (ALU), general registers R1 to Rn, a program counter (PC), an accumulator (ACC), a status register (SR), a stack pointer (SP) and a bus interface circuit (BSIF). Data is transferred to and from the circuits in the execution unit 213 through a write-only bus 217 and a read-only bus 215 respectively.

The arithmetic logic unit (ALU) receives data to be processed from the circuits through the read-only bus 215 and delivers processed data to the circuits through the write-only bus 217.

The program counter (PC) is a 16-bit (or 2-byte) register storing a program address from which a macroinstruction is to be fetched next. The program address is an address at an area of the ROM unit 4. A location at the ROM unit 4 pointed to by the program address contained in the program counter (PC) is accessed in order to output the next macroinstruction stored at the location to the data bus 8. The CPU 2 then fetches the output macroinstruction, storing it into the macroinstruction register 201. The CPU 2 subsequently executes the macroinstruction. As the macroinstruction is read, the contents of the program counter (PC) are incremented by one.

The contents of the status register (SR), a 16-bit (or 2-byte) register, reflect the status of results processed by the arithmetic logic unit (ALU). The status register (SR) includes flags such as negative (N), zero (Z), overflow (V) and carry (C) in addition to three interrupt mask bits. Data indicating the interrupt priority level of an interrupt request currently being processed is supplied by the interrupt control circuit 104 described previously and held in the interrupt mask bits. If, for example, an interrupt request is received from the external pin $\overline{IRQ0}$ while the CPU 2 is executing an interrupt processing routine, the interrupt priority level for the interrupt request from the external pin $\overline{IRQ0}$ is compared with the data held in the interrupt mask bits. If the interrupt priority level of the external pin $\overline{IRQ0}$ is higher, its interrupt request is accepted and an interrupt processing routine associated with the the interrupt request is started as the execution of the current interrupt processing routine is ended. Before an interrupt processing routine is started, the contents of the program counter (PC), the accumulator (ACC), the status register (SR), etc. are saved in a stack area typically at the RAM unit 3. In addition, the contents of the interrupt mask bits are also updated with data representing the interrupt priority level of the interrupt request to be serviced. In order to execute an interrupt processing routine associated with an accepted interrupt request, the start address of the interrupt processing routine is loaded into the program counter (PC).

The stack pointer (SP) is also typically a 2-byte register. The contents of the stack pointer (SP) are a valid address in the stack area at which a stack operation is to be carried out next. As also mentioned above, the stack area can be typically located at the random access memory (RAM) unit 3 at any arbitrary address. For an application which requires that the contents of the stack area be preserved in the event of a power interruption, it is necessary to provide a facility for backing up the RAM allocated for the stack area with batteries.

The accumulator (ACC) is used for temporarily holding an operand or a result produced by the arithmetic logic unit (ALU).

The bus interface circuit (BSIF) is connected to the internal address and data buses 7 and 8. Data is thereby transferred between the dedicated read and write-only buses 215 and 217 of the execution unit 213 and the internal address and data buses 7 and 8.

It should be noted that the actual CPU 2 also includes a variety of control circuits such as a branch control circuit and system control circuit which are easy for a microcomputer engineer to understand even though they are not shown in FIG. 11.

Figure 12:
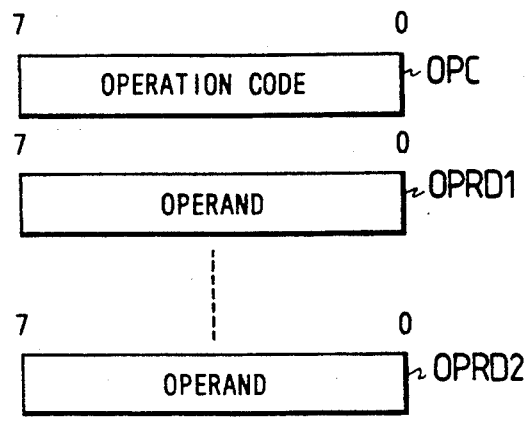
FIG. 12 is a diagram showing a typical macroinstruction.

FIG. 12 is a diagram showing the format of a typical macroinstruction. The format of macroinstructions is not particularly fixed. However, it usually includes a one-byte operation code (OPC) followed by operands OPRD1 and OPRD2 comprising a plurality of bytes. The number of operands is determined by the type of the operation code (OPC). Since the operation code (OPC) is one byte long as is shown in the figure, the number of micro-ROM start addresses determined by the operation code (OPC) is 256.

Figure 13:
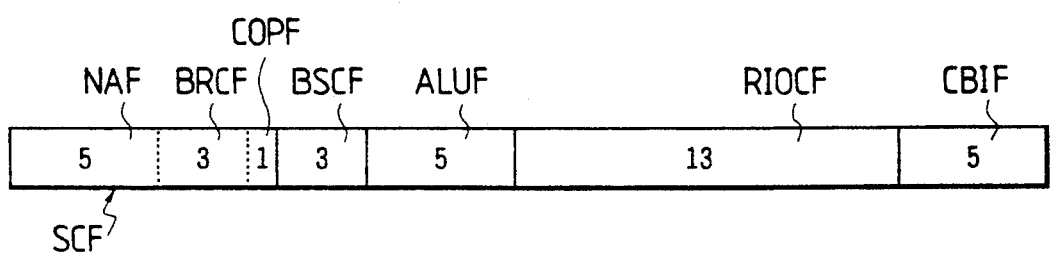
FIG. 13 is a diagram showing a typical microinstruction.

FIG. 13 is a diagram showing the format of a typical microinstruction. The format of microinstructions is not particularly fixed. However, it usually includes a nine-bit sequence control field (SCF), a three-bit bus control field (BSCF) for controlling the internal buses 7 and 8 and the dedicated buses 215 and 217, a five-bit ALU operation designation field (ALUF) for controlling the operation of the ALU, a thirteen-bit register input/output control field (RIOCF) for controlling the input/output operations of a variety of internal registers and a five-bit conditional branch and flag change designation field (CBIF) for controlling conditional branches and the flags of the status register (SR).

The sequence control field (SCF) comprises a five-bit first field, a three-bit operation code branch field (BRCF) and a one-bit control field (COPF). The first field and the operation code branch field constitute a next address field having a total length of 8 bits.

Figure 14:
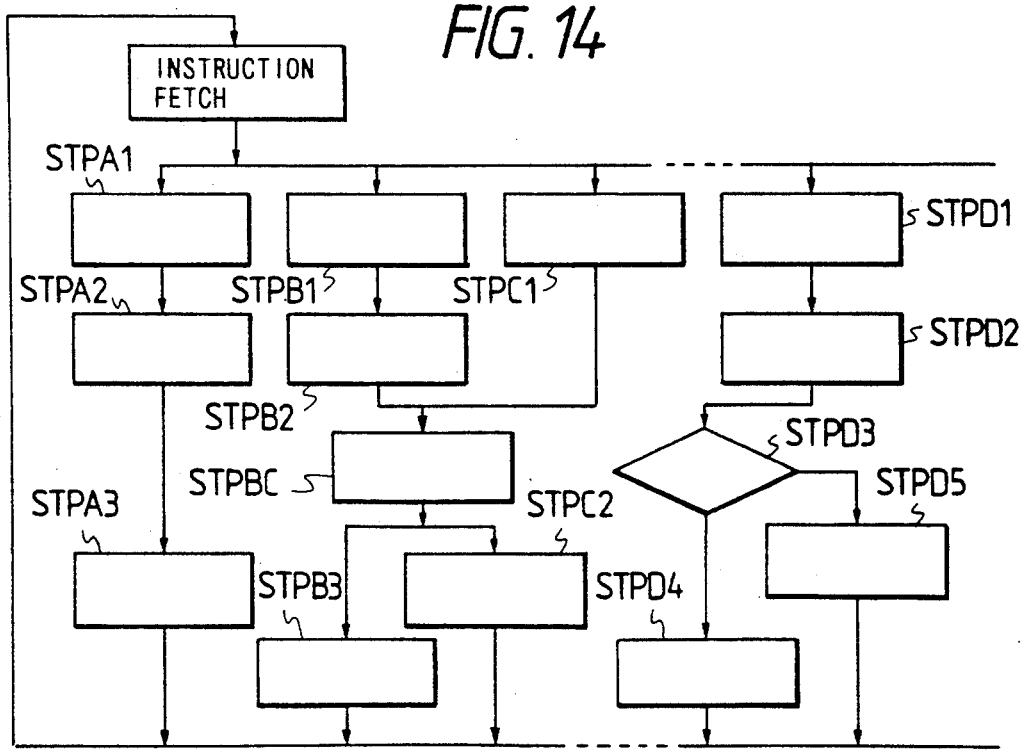
FIG. 14 is a flowchart of a typical microprogram.

FIG. 14 shows a flowchart of a microprogram example.

At a first step STR00 shown in FIG. 14, the operation code (OPC) of a macroinstruction is fetched and loaded into the macroinstruction register (MACRO-IR) 201 shown in FIG. 11. The macroinstruction is then supplied to a macroinstruction decoder 205 through a multiplexer (MPX) 203. Decoding the macroinstruction, the macroinstruction decoder 205 determines a start address at a micro-ROM unit (U-ROM) 207. In this way, one of a plurality of microprocessing flows is selected.

A processing step STPAL shown in FIG. 14 reads a microinstruction stored at the start address in the micro-ROM unit 207. The next address information contained in the microinstruction read by the processing step STPAL leads the microprocessing flow to a processing step STPA2. Similarly, the processing step STPA2 is followed by a next processing step indicated by the next address information read by the processing step STPA2. A microprocessing flow is ended by returning to the processing step STP00 for fetching another macroinstruction after executing the last processing step. In this microprocessing flow, the last processing step is STPA3.

Processing steps STPB1 to STPB3 and STPC1 to STPC3 shown in FIG. 14 are other microprocessing flows which have the same processing step STPBC representing microprocessing common to both the microprocessing flows.

A next address from which a microinstruction is to be fetched after executing the common processing step STPBC is derived in a typical way explained below. It should be noted, however, that the formation of a next address is not particularly limited to the following derivation technique.

The three bits of the operation code branch field (BSCF) in the microinstruction read by the common step STPBC from the micro-ROM unit 207 are set to certain values, for example, '0', '0' and '1' respectively and the control field (COF) is set to a '1'. The control field (COF) set to a '1' means that a macroinstruction is to be utilized in forming a next address.

With the control field (COPF) set to a '1', the multiplexer 203 is controlled so that an eight-bit macroinstruction from the macroinstruction register 201 is selected along with the three bits of the operation code branch field (BRCF). The macroinstruction appended with the three bits is then supplied to the decoder 205. The added three bits are regarded as a kind of page information. The macroinstruction modified by the three bits is used to derive a next address by a common microprocessing step such as STPBC.

Therefore, if the macroinstruction stored in the macroinstruction register 201 indicates the start address of the microprocessing flow beginning with the microprocessing step STPBL, the next address derived by the common microprocessing step STPBC points to a microprocessing step STPB3.

In this embodiment, since the operation code branch field BRCF comprises a plurality of bits, the number of common microprocessing steps allowable in a microprocessing flow is equal to the maximum value representable by the operation code branch field BRCF or the maximum number of pages. To be more specific, assume, for example, that with the three added bits set to '000', the next address is derived into the start address of the microprocessing flow itself. In this case, the destination of the flow after the common microprocessing step can be one of seven addresses represented by the seven remaining values '001' to '111' which can be set in the three added bits.

A conditional branch such as a microprocessing step STPD3 shown in FIG. 14 is processed as follows.

Each bit of the conditional branch and flag change designation field (CBIF) shown in FIG. 13 and the flag data contained by the status register (SR) of the execution unit 213 are supplied to a suitable logic circuit used for modifying a next address output by the micro-ROM unit 207. The modified next address then determines as to which of microprocessing steps STPD4 and STPD5 is to be executed next.

Figure 15:
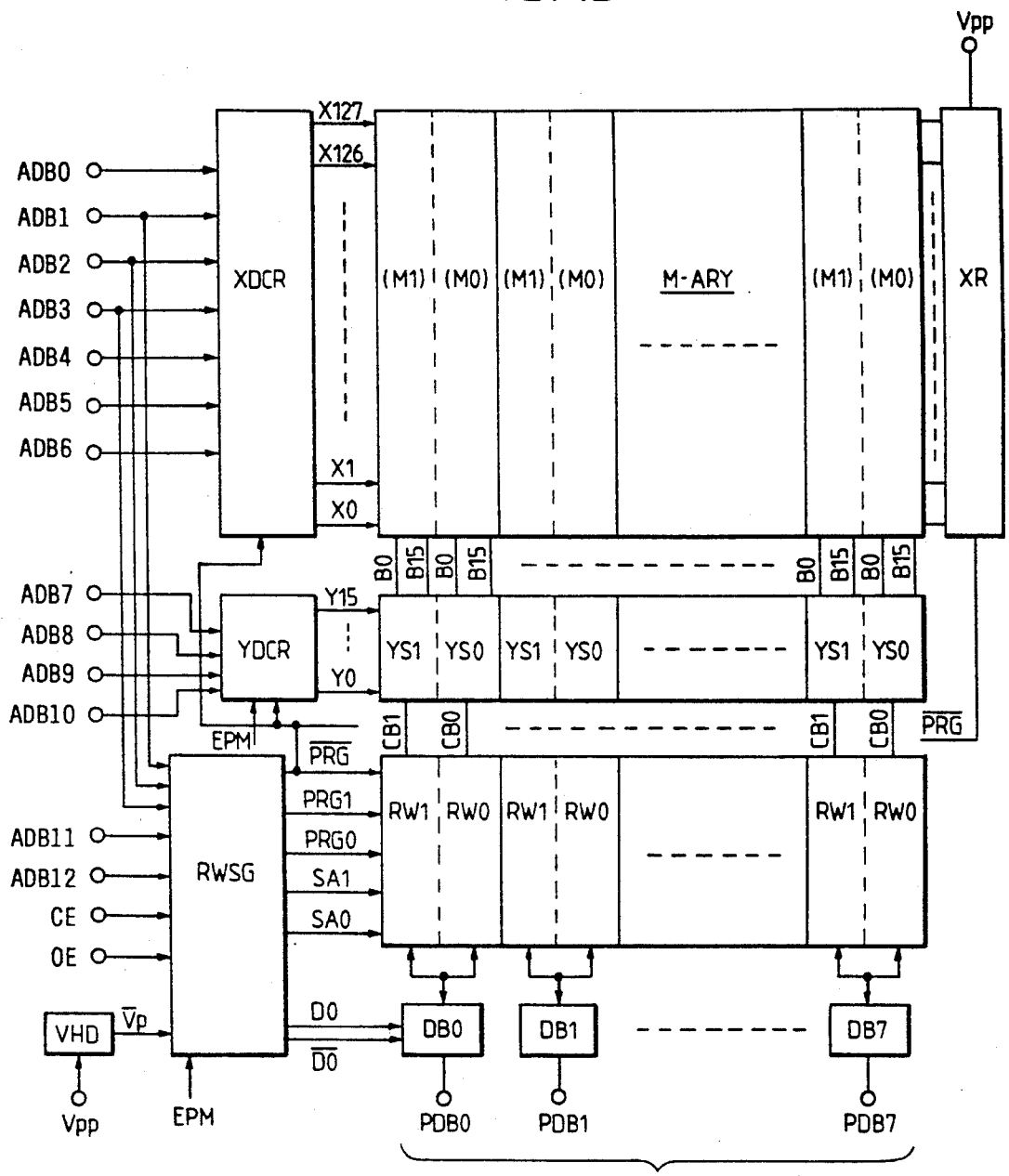
FIG. 15 is the block diagram of the ROM unit.

FIG. 15 is the block diagram of an embodiment implementing the ROM unit 4 described above.

The embodiment is not restricted to a particular configuration. A typical configuration of a memory array (M-ARY) comprises eight memory mats into which the entire bit lines, also known as data lines or digit lines, are divided. As shown in the figure, each mat is further divided by a dashed line into two memory areas M0 and M1. Each of the memory areas M0 and M1 has 16 bit lines B0 to B15. The memory array (M-ARY) is configured to comprise 128 word lines 0 to 127. At each point of intersection between a bit line and a word line, a memory element having a stacked gate structure, to be explained later, is located to provide a storage capacity of $128 \times 16 \times 2 \times 8 = 32768$ bits. The eight memory mats are provided with eight data input/output circuits DB0 to DB7 with each data input/output circuit assigned to a memory mat. Therefore, the EPROM unit employed in this embodiment has a storage capacity of 4096 bytes.

There is no special requirement for an X address decoder (XDCR) which typically receives seven one-bit signals ADB0 to ADB7 from the address bus 7 and decodes them to activate one of 128 select signals X0 to X127 corresponding to the 128 word lines aforementioned.

The word lines of the memory array (M-ARY) require a high select voltage level of 12 volts used when writing data into non-volatile memory elements and a low select voltage level of 5 volts for read operations.

Each word line is thus provided with a high voltage load circuit XR for use in the switching of the select voltage level according to the operation mode.

Column select circuits YS1 and YS0 each select one of bit lines B0 to B15 associated with a memory mat and connect the selected bit lines to common bit lines CB1 and CB0 respectively.

A Y address decoder (YDCR) typically receives four one-bit signals ADB7 to ADB10 from the address bus 7 and decodes them to activate one of 16 select signals Y0 to Y15 corresponding to the 16 bit lines B0 to B15. The 16 select signals Y0 to Y15 are provided to all the column select circuits YS1 and YS0.

Figure 16:
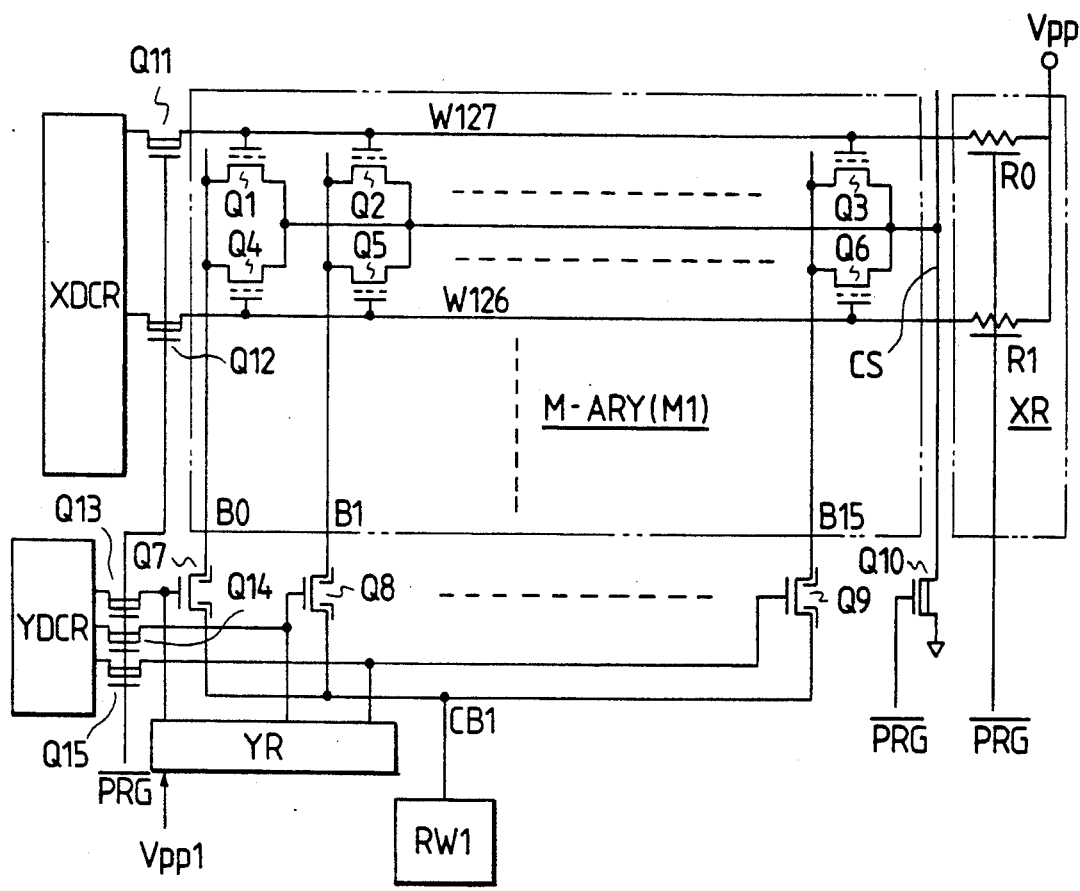
FIG. 16 is a diagram showing circuits employed in the ROM unit shown in FIG. 15.

The 16 select signals Y0 to Y15 also require a high select level voltage and are thus provided with a high voltage load circuit YR as well as is shown in FIG. 16. In addition, the signal EPM from the mode control circuit 102 and a control signal ($\overline{PRG}$) from a read-/write signal generating circuit (RWSG) are furnished to the Y address decoder (YDCR).

The common bit lines CB1 and CB0 associated with the column select circuits YS1 and YS0 are connected to read/write circuits RW1 and RW0 respectively. The read/write circuits RW1 and RW0 each comprise a write amplifier, a read amplifier and a select circuit for selecting one of the two amplifiers. A data input/output circuit (DBn), where n is 0 to 7, is connected to both of the read/write circuits RW1 and RW0 which together constitute a pair. The data input/output circuits DB0 to DB7 input and output data from and to data terminals PDB0 to PDB7 which are connected to the data bus 8.

Receiving address signals ADB11 and ADB12, a chip enable signal (CE), an output enable signal (OE) and a high voltage detecting signal ($\overline{Vp}$), the read/write signal generating circuit (RWSG) identifies the operating mode which is then informed to all the read/write circuits RW1 and RW0 and the data input/output circuits DB0 to DB7 through control signals $\overline{RAG}$, PRG1, PRG0, SA1, SA0, D0 and $\overline{D0}$. The high voltage detecting signal ($\overline{Vp}$) is generated by a high voltage detecting circuit (VHD). When a program voltage of about 12V is supplied to a pin (Vpp), the high voltage detecting signal ($\overline{Vp}$) is turned to a low level.

FIG. 16 is a circuit diagram of an embodiment implementing one memory area M1, a dummy array and their associated peripheral circuitry.

The one memory area M1 shown diagramatically has a configuration comprising MOSFET transistors Q1 to Q6, word lines W127 and W126 and bit lines B0 to B15. Each of the MOSFET transistors Q1 to Q6 has a stacked gate structure comprising control and floating gates and works as a non-volatile memory element. The stacked gate structure transistors arranged on the same row Q1 to Q3 and Q4 to Q6 have their control gates connected to their corresponding word lines W127 and W126 respectively. On the other hand, the stacked gate structure transistors arranged on the same column Q1 and Q4, Q2 and Q5 and Q3 and Q6 have their drains connected to their corresponding bit lines B0, B1 and B15 respectively.

Even though not specifically required, the source line (CS) common to all the stacked gate transistors is typically grounded through a depletion MOSFET transistor Q10 which receives a write signal ($\overline{PRG}$). During a write operation, the control signal ($\overline{PRG}$) turns to a low level, relatively lowering the conductance of the MOSFET transistor Q10. During a read operation, however, the control signal ($\overline{PRG}$) turns to a high level, relatively increasing its conductance.

The X address decoder (XDCR) receives address signals supplied to the memory area M1 and the other memory areas not shown in the figure and decodes them to activate one of the select signals corresponding to the word lines aforementioned. Even though not required specifically, the X address decoder (XDCR) is powered by a power supply having a voltage of 5 volts. Therefore, the X address decoder (XDCR) also generates 5-volt select signals. On the other hand, the memory area M1, or in general the memory array (MARY), requires typically a high voltage level of about 5 volts and a low voltage level of approximately 0 volts for the read operation and a high voltage level approximately equal to the voltage of the high power supply (Vpp) for use in the write operation and a low voltage level of about 0 volts for the write operation. Accordingly, the word lines of the memory array (M-ARY) which are driven by the 5-volt select lines output by the X address decoder (XDCR) have to be converted to the voltage levels required by the memory area M1. In order to bring the word lines of the memory array (M-ARY) to the required voltage levels, depletion MOSFET transistors Q11 and Q12 are introduced on the word lines W127 and W126 respectively. In addition, the write operation's high voltage load circuit (XR) is installed between each word line and the high voltage terminal (Vpp) for the write operation. Resistors R1 and R0 on source, drain and channel areas which are created using a polysilicon layer formed on a feed oxide membrane on the semiconductor base are used in the write operation's high voltage load circuit (XR). The MOSFET transistors used as the registors R1 and R0 as such have their gate electrodes connected to the signal ($\overline{PRG}$). Accordingly, when the signal ($\overline{PRG}$) is turned to a low level in write mode, the MOSFET transistors function as resistive elements having high resistances. In read mode, however, the terminal (Vpp) must appear to supply a low voltage of typically 5 volts. In read mode, therefore, the signal ($\overline{PRG}$) is raised to a high level so as to turn the MOSFET transistors off. In read mode, this configuration thus allows no direct current to flow through unselected word lines connected to the resistors R1 and R0, resulting in reduced power consumption.

The depletion MOSFET transistors Q11 and Q12 have their gates also supplied by the internal control signal ($\overline{PRG}$).

In read mode, the internal control signal ($\overline{PRG}$) is set at a high level of approximately 5 volts. At that time, the depletion MOSFET transistors Q11 and Q12 are put in an 'on' state capable of conducting the 5-volt select signals output by the X address decoder (XDCR). In read mode, therefore, the outputs of the X address, decoder (XDCR) are forwarded to their respective word lines as they are.

In write mode, the internal control signal ($\overline{PRG}$) is turned to a low level of about 0 volts. At that time, the resistors R0 and R1 work as high resistive elements due to the internal control signal ($\overline{PRG}$) being set at the low level. If, for example, the X address decoder (XDCR) sets the select signal X127 corresponding to the word line W127 to an output having a voltage level of approximately 5 volts (the voltage level of the signal selected by the X address decoder), the MOSFET transistor Q11 is put in an 'off' state automatically because the voltage applied to its gate is set at a level lower than that of the voltage applied to its source. At the same time, the word line W127 is raised to a high voltage level approximately equal to that of the high voltage power supply (Vpp) for the write operation by the highly resistive resistor R0. On the other hand, if, for instance, the select signal X126 which corresponds to the word line W126 is not selected by the X address decoder (XDCR), the select signal X126 remains at a low voltage level of about 0 volts, keeping the MOSFET transistor Q12 in the 'on' state as it is. Therefore, the word line W126 is pulled down by the X address decoder (XDCR) to the low voltage level of approximately 0 volts, resulting in a voltage drop from the high voltage power supply (Vpp) across the highly resistive resistor R1.

As shown in FIG. 16, the memory area (M1) is provided with a common bit line (CB1). MOSFET transistors Q7 to Q9 which collectively form a column select circuit YS1 are installed between bit lines (B0) to B15 of the memory area M1 and the common bit line (CB1) provided to the memory area M1.

Decoding supplied address signals, the Y address decoder (YDCR) activates one of select signals Y0 to Y15 in order to select one of the bit lines B0 to B15 of the memory area M1. Like the X address decoder (XDCR), the Y address decoder (YDCR) is driven by a power supply of 5 volts. The 5-volt select signal activated by the Y address decoder (YDCR) is used for controlling, among other things, the column select circuit YS1. On the other hand, in write mode the column select circuit (YS1) and others must be capable of delivering write signals having a voltage level high enough for the write operation. In order to make the column switch MOSFET transistors Q7 to Q9 also capable of turning on and off such high write operation voltage signals as well, depletion MOSFET transistors Q13 to Q15 are provided between the output terminals of the Y address decoder (YDCR) and the gates of the column switch MOSFET transistors Q7 to Q9 or, thus, the column select lines. Like the depletion MOSFET transistors Q11 and Q12, the gates of depletion MOSFET transistors (Q13) to (Q15) are connected to the control signal ($\overline{PRG}$). Although not specially required, a high voltage load circuit (YR) similar to the one described above (XR) is set between the high voltage terminal (Vpp) aforementioned and the column select lines. The common bit line (CB1) described earlier is connected to a read/write circuit RW1.

It should be noted that EPROM with an output of 8 bits is used as the ROM unit 4. However, EPROM with an output of 16 bits can also be used instead. For a microcomputer engineer, such a change in EPROM output is easy to understand.

Figure 17:
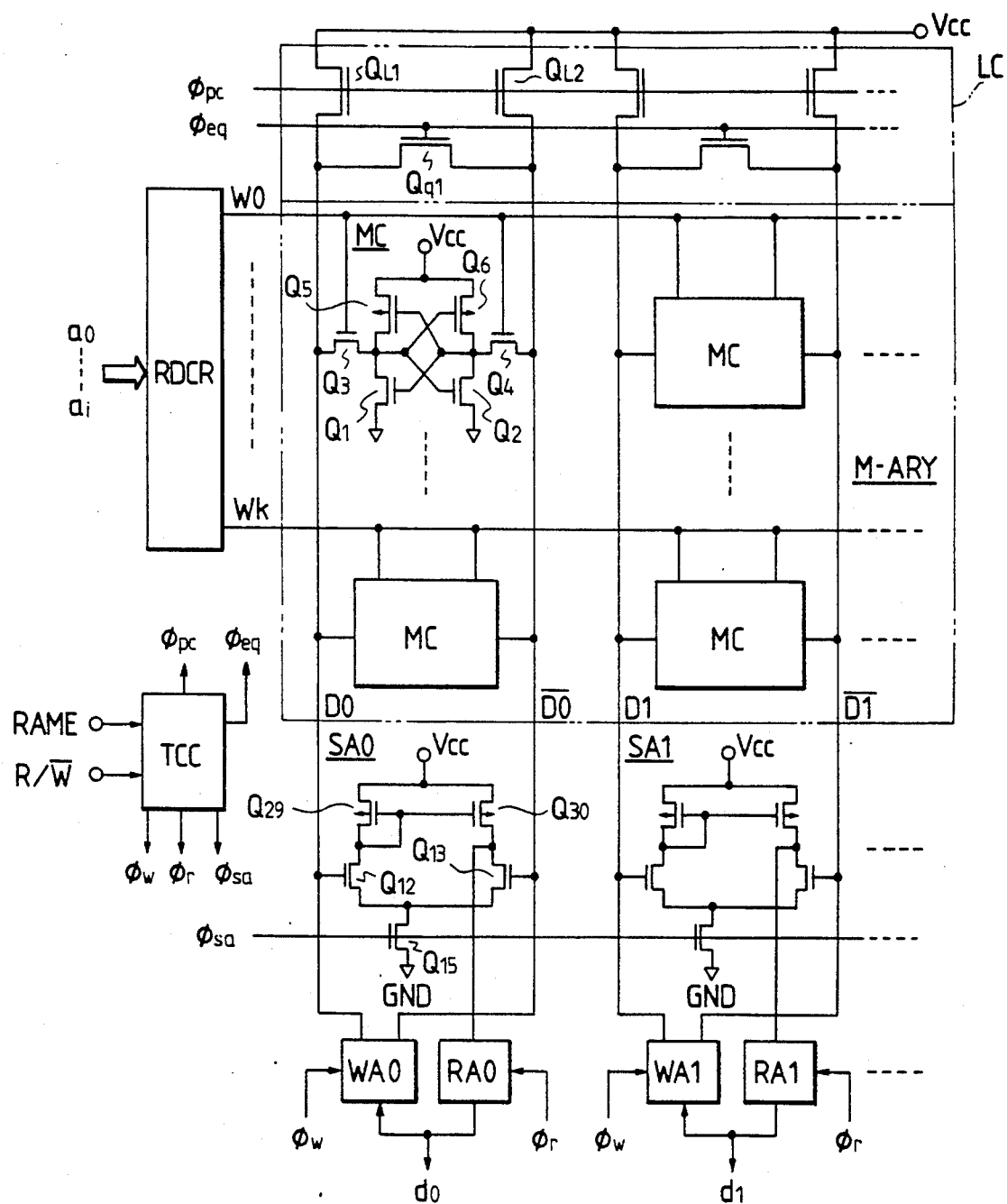
FIG. 17 is a block diagram of the RAM unit.

FIG. 17 is a diagram showing a typical configuration of the RAM unit 3 which comprises a row decoder (RDCR), a plurality of pairs of a data line and its inverse (D0—$\overline{D0}$), (D1—$\overline{D1}$), etc., a plurality of memory cells (MC), sense amplifiers SA0 and SA1, read amplifiers RA0 and RA1, write amplifiers WA0 and WA1, a data line load circuit (LC) and a timing control circuit (TCC). The row decoder (RDCR) decodes address signals a0 to ai supplied by the address bus 7 in order to select one of a plurality of word lines W0 to Wk in the memory array (MARY). Each memory cell (MC) is located so as to connect a word line (such as W0) to a pair of a data line and its inverse (such as D0—$\overline{D0}$). The sense amplifier (such as SA0) connects a data line (D0 in this case) and its inverse $\overline{D0}$ which constitute a pair. The read amplifier (such as RA0) transmits an output signal (d0 in this case) to the data bus 8 in response to the output of the corresponding sense amplifier SA0. The write amplifier (such as WA0) drives the corresponding pair of a data line and its inverse (D0—$\overline{D0}$) in response to a data bit coming from the data bus 8. The data line load circuit (LC) is placed between the pairs of data lines and their inverses (D0—$\overline{D0}$), (D1—$\overline{D1}$), etc. and a power supply terminal (Vcc). The timing control circuit (TCC) is used for generating timing signals controlling the operation of the RAM unit 3.

Each memory cell (MC) includes a flip-flop functioning as a data storage circuit and N-channel transfer MOSFET transistors Q3 and Q4 placed between a pair of input/output terminals of the flip-flop and a pair of a data line and its inverse. The flip-flop comprises a first inverter comprising a P-channel MOSFET transistor Q5 and an N-channel MOSFET transistor Q1 and a second inverter comprising a P-channel MOSFET transistor Q6 and an N-channel MOSFET transistor Q2. The input and output of the first inverter are respectively connected to the output and input of the second inverter. The gate electrodes of the transfer MOSFET transistors Q3 and Q4 are connected to a data line (such as D0) and its inverse $\overline{D0}$.

The data line load circuit (LC) includes N-channel precharge MOSFET transistors Q11 and Q12 located between the power supply terminal (Vcc) and each pair of a data line and its inverse (such as D0—$\overline{D0}$). The data line load circuit (LC) includes also N-channel equalize MOSFET transistors each of which (such as Qq1) is placed across a pair of a data line and its inverse (such as D0—$\overline{D0}$). The N-channel precharge MOSFET transistors QL1 and QL2 are put in a conductive state by a high voltage level timing signal $\phi pc$ supplied to their gates. Similarly, the N-channel equalize MOSFET transistors (Qq1) are put in a conductive state by a high voltage level timing signal ($\phi eq$) supplied to their gates.

Each sense amplifier (such as SA0) comprises N-channel differential paired MOSFET transistors Q12 and Q13 the gates of which are connected across a pair of a data line and its inverse (D0—$\overline{D0}$) and N-channel load MOSFET transistors Q29 and Q30 connected between the drains of the MOSFET transistors Q12 and Q13 and the power supply terminal (Vcc). An N-channel current source MOSFET transistor Q15 is wired between the sources of the MOSFET transistors Q12 and Q13 and a ground potential terminal (GND) for supplying drive current to the sense amplifier SA0. The N-channel current source MOSFET transistor Q15 is put in a conducting state by a high voltage level timing signal ($\phi sa$) provided to its gate.

Receiving a read/write signal (R/$\overline{W}$) and a RAM select signal (RAME) provided by the CPU 2 through the control bus 11, the timing control circuit (TCC) outputs a variety of timing signals ($\phi pc$), ($\phi eq$), ($\phi w$), ($\phi r$) and ($\phi sa$).

When the RAM unit 3 is not selected by resetting the RAM select signal to a low voltage level (RAME='L'), the timing signal $\phi pc$ is raised to a high voltage level. However, when the RAM unit 3 is selected by the RAM select signal set to a high voltage level (RAME='H'), the timing signal ($\phi Pc$) is pulled down a low voltage level. The timing signal ($\phi eq$) is raised to a high voltage level for a predetermined period of time after the RAM unit 3 is selected and is reset to a low voltage level afterwards. The timing signals ($\phi sa$) and ($\phi r$) are set to a high voltage level for a predetermined period of time when the RAM unit 3 is selected and the the read/write signal (R/W̄) is set to a high voltage level. As a result, data of the selected memory cell (MC) is output to the associated pair of a data line and its inverse (D0—D̄0 for example). The data is amplified by the associated sense amplifier SA0 activated by the timing signal (φsa) set at a high voltage level and transmitted to the data bus 8 through the associated read amplifier RA0 which is activated by the timing signal (φr) set at a high voltage level. The timing signal (φw) is set to a high voltage level when the RAM unit 3 is selected and the read/write signal (R/W̄) is set to a low voltage level. In this state, a bit of data is transferred from the data bus 8 to the pair of a data line and its inverse (D0—D̄0 for example) associated with a selected memory cell (MC) through the associated write amplifier WA0 which is activated by the timing signal (φw) set at a high voltage level. The data bit is finally written into the selected memory cell (MC).

The RAM unit 3 is configured so that when a word line is selected, a total of typically 16 memory cells (MC) are arranged. Accordingly, 16 pairs of read and write amplifiers are required. In addition, as many 16-bit (2-byte) registers as word lines are laid out.

The sub-processor 5 is a typical means for implementing peripheral functions in the microprocessor 1. The configuration of the sub-processor 5 includes electrically writable non-volatile memory elements. The time required to define or modify part or all of peripheral functions to be implemented is determined by the write access time of the non-volatile memory elements.

Figure 2:
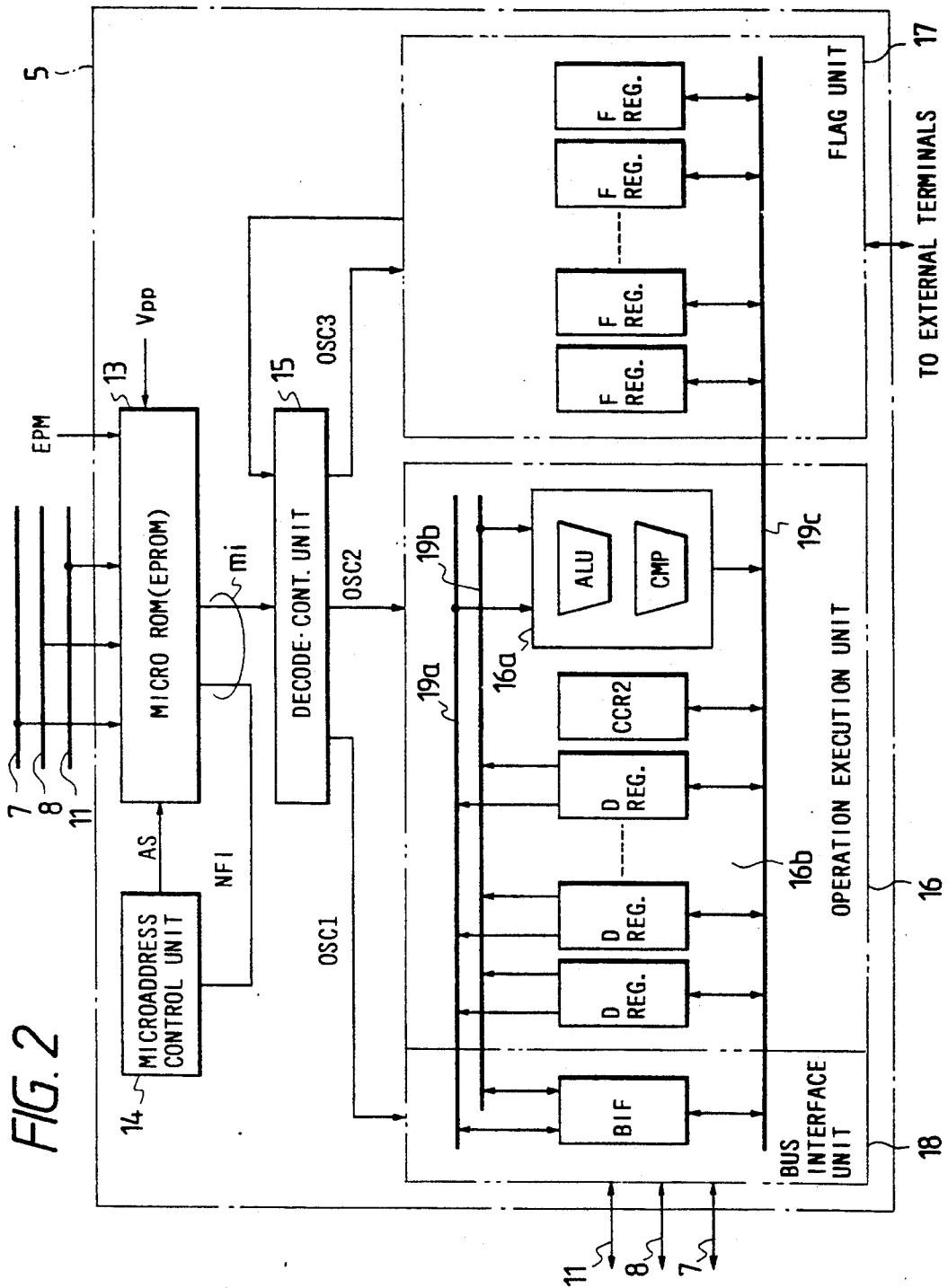
FIG. 2 is a block diagram of a sub-processor functioning as a typical means for implementing peripheral functions.

FIG. 2 is a diagram showing a typical configuration of the sub-processor 5.

Even though not specially so required, the configuration includes a micro-ROM unit 13, a microaddress control unit 14, a decode control unit 15, an operation execution unit 16, a flag unit 17 and a bus interface unit 18.

The micro-ROM unit 13 is used for storing a microprogram which allows peripheral functions to be implemented by the sub-processor 5 such as the timer function, the counter function and the serial communication function to be set as variables. The micro-ROM unit 13 can be EPROM (Electrically Programmable Read-Only Memory) made of electrically erasable and writable MNOS (Metal Nitride Oxide Semiconductor) or floating gate non-volatile memory elements or EPROM (Electrically Programmable Read-Only Memory) made of electrically writable floating gate or stacked gate non-volatile memory elements which are erasable by ultraviolet rays. The microprogram stored in the micro-ROM unit 13 is used for defining peripheral functions of the sub-processor 5. The micro-ROM unit 13 is connected to the address bus 7, the data bus 8 and the control bus 11 when an EPROM write mode signal (EPM) is activated.

The microaddress control unit 14 generates an address signal (AS) for sequentially reading microinstructions stored in the micro-ROM unit 13 in accordance with a predetermined procedure. Addresses are generated by the microaddress control unit 14 so as to read a predetermined sequence of microinstructions. An address from which a next microinstruction is to be fetched is specified by next address field information (NFI) designated by a next address field (NF) of the microinstruction read immediately before. A microinstruction (mi) read from the micro-ROM unit 13 by the address signal (AS) output by the microaddresscontrol unit 14 is decoded by the decode control unit 15 which outputs control signals OSC1 to OSC3 used for controlling the operations of the bus interface unit 18, the flag unit 17 and the operation execution unit 16.

The operation execution unit 16 includes arithmetic circuits 16a comprising an arithmetic logic unit (ALU), a comparator, a shifter, etc. and a group of registers 16b comprising a plurality of data registers (DREG), a condition code register CCR2, etc. The operation execution unit 16 selects data registers (DREG) as well as controls input/output operations and processings in accordance with the control signal OSC2 provided by the decode control unit 15 in order to execute comparison between the contents of two data registers (DREG), capture operations, processings for serial communication operations, etc. The condition code register (CCR) includes condition flags C and Z representing respectively a carry and a zero result output by the arithmetic circuits 16a. Information required for processings can also be obtained from the RAM unit 3 and flag registers (FREG) of the flag unit 17. Processing results produced by the operation execution unit 16 are provided to, among other things, the CPU 2 through a bus interface circuit (BIF) of the bus interface unit 18, the address bus 7, the data bus 8 and the control bus 11. In addition, when it is necessary to exercise influence over external events according to processing results, they are transmitted to external hardware through the flag resisters (FREG) of the flag unit 17. Moreover, the flag unit 17 also includes an interrupt flag that indicates whether or not interrupts against the CPU 2 are enabled. With the interrupt flag set, the sub-processor 5 may generate an internal interrupt informed to the CPU 2 through the control bus 11 depending upon processing results produced by the arithmetic circuits 16a.

Inputs to the arithmetic circuits 16a are routed to the data registers (DREG) and the flag registers (FLAG) through the bus interface circuit (BIF) and dedicated buses 19a and 19b whereas outputs are transmitted out of the data registers (DREG) and the flag registers (FLAG) via a dedicated bus 19c and the bus interface circuit (BIF).

The sub-processor 5 may implement peripheral functions such as a pulse input/output function or communication control function for controlling a timer, a counter or pulse width. In the case of such functions, the flag unit 17 can be directly connected to the external pin group 10 so as to allow edges of external pulses and external events to be detected and output pulses to be controlled for exercising influence over external events as well. In this way, the performance of the external functions is enhanced.

Figures 3B, 4:
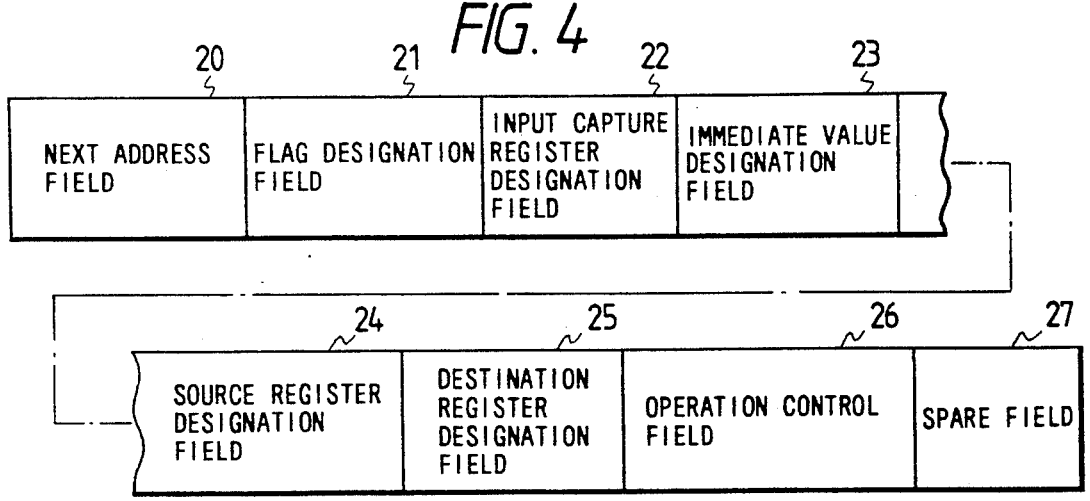
FIG. 3B is a table explaining typical microinstructions controlling memory access operations used by the sub-processor.
FIG. 4 is a diagram showing the format of a typical microinstruction used by the sub-processor.

FIGS. 3A and 3B show typical microinstructions (mi) that can be executed on the sub-processor 5. The microinstructions (mi) are classified into a category of microinstructions (mi) for ALU operations and a category of microinstructions (mi) for memory access operations shown in FIGS. 3A and 3B respectively.

The functional category for ALU operations includes 11 general purpose microinstructions (mi) and 4 timer microinstructions (mi). The following are general purpose microinstructions (mi):

MOV transfers the contents of a source register (Rs) or an immediate constant (IMM) to a destination register (Rd).

ADD adds the contents of a source register (Rs) or an immediate constant (Imm) to the contents of a destination register (Rd) and stores the result in the destination register (Rd).

SUB subtracts the contents of a source register (Rs) or an immediate constant from the contents of a destination register (Rd) and stores the result in the destination register (Rd).

CMP compares the contents of a destination register (Rd) with the contents of a source register (Rs) or an immediate constant (Imm).

AND computes the logical product of the contents of a destination register (Rd) and the contents of a source register (Rs) or an immediate constant (Imm) and stores the result in the destination register (Rd).

OR computes the logical sum of the contents of a destination register (Rd) and the contents of a source register (Rs) or an immediate constant (Imm) and stores the result in the destination register (Rd).

EOR computes the exclusive logical sum of the contents of a destination register (Rd) and the contents of a source register (Rs) or an immediate constant (Imm) and stores the result in the destination register (Rd).

LSL shifts the contents of a source register (Rs) to the left and stores the shifted result in a destination register (Rd).

LSR shifts the contents of a source register (Rs) to the right and stores the shifted result in a destination register (Rd).

NOP performs no operation.

TST computes the logical product of the contents of a destination register (Rd) and the contents of a source register (Rs) or an immediate constant (Imm).

Except for the MOV and NOP microinstructions (mi), the condition flags are effected by processing results.

The following are timer microinstructions (mi):

INCCLR increments the contents of a destination register (Rd) and then compares the incremented contents with the contents of a source register (Rs). If the incremented contents are equal to the contents of the source register (Rs), the destination register (Rd) is cleared.

INCCMP merely increments the contents of a destination register (Rd) and then compares the incremented contents with the contents of a source register (Rs). The result of the comparison is reflected in the condition flag Z.

DECCMP merely decrements the contents of a destination register (Rd) and then compares the decremented contents with the contents of a source register (Rs). The result of the comparison is reflected in the condition flag Z.

DECLD decrements the contents of a destination register (Rd) and then compares the decremented contents with zero. If the decremented contents are equal to zero, the contents of a source register (Rs) are loaded to the destination register (Rd).

The functional category for memory access operations includes the following microinstructions (Mi):

WRSET transfers write data contained in a source register (Rs) or an immediate constant to a data buffer (BIF) in the bus interface unit 18.

WRSTART transfers a write address contained in a source register (Rs) or an immediate constant to an address buffer (BIF) in the bus interface unit 18 and then starts a write bus cycle.

RDSTART transfers a read address contained in a source register (Rs) or an immediate constant to an address buffer (BIF) in the bus interface unit 18 and then starts a read bus cycle.

RDGET transfers read data from the data buffer (BIF) in the bus interface unit 18 to a destination register (Rd).

REFRESH transfers a refresh address contained in a source register (Rs) or an immediate constant to an address buffer (BIF) in the bus interface unit 18 and then starts a refresh bus cycle.

By executing the microinstructions (mi) shown in FIGS. 3A, 3B and 4 in a desired sequence, the sub-processor 5 can implement desired peripheral functions.

FIG. 4 is a diagram showing the format of a typical microinstruction (mi) read from the micro-ROM unit 13.

Even though not specifically so required, the microinstruction (mi) is 64 bits long, comprising a next address field 20, a flag designation field 21, an input capture register designation field 22, an immediate value designation field 23, a source register designation field 24, a destination register designation field, an operation control field 26 and a spare field 27. The flag designation field is used for specifying information on selection of a register of the flag unit 17 or a latch circuit and information for controlling input/output operations. The source register designation field 24 is used for specifying a source register (Rs) whereas the destination register designation field 25 is used for specifying a destination register (Rd).

As is described above, the format of the microinstruction (mi) includes the flag destination field 21 for controlling input/output operations of the flag unit 17 which is directly connected to the external pin group 10. Therefore, when the sub-processor 5 is used to implement peripheral functions of timers, counters and input/output facilities such as pulse width controllers or communication control functions, pulse input/output operations can be controlled in every execution cycle of microinstructions (mi). In other words, information can be directly transmitted or received to or from the external pin group 10 by executing a microinstruction (mi). It is thus possible to increase the speed of the pulse input/output control or enhance resolution on pulses for controlling input/output operations.

A microprogram stored in the micro-ROM unit 13 is a sequence of microinstructions (mi) described above executed by the sub-processor 5 for implementing required peripheral functions.

FIG. 5 shows a typical microprogram implementing a pulse width modulation (PWM) timer. Reference numerals 30, 31 and 32 denote a program heading, functional assignments of registers and flags and a control procedure respectively. The # mark used in the microprogram indicates an immediate constant.

A microprogram defining a peripheral function to be implemented by the sub-processor 5 such as the one shown in FIG. 5 is coded and then written into the micro-ROM unit 13 by a write apparatus such as an EPROM writer.

Figure 6:
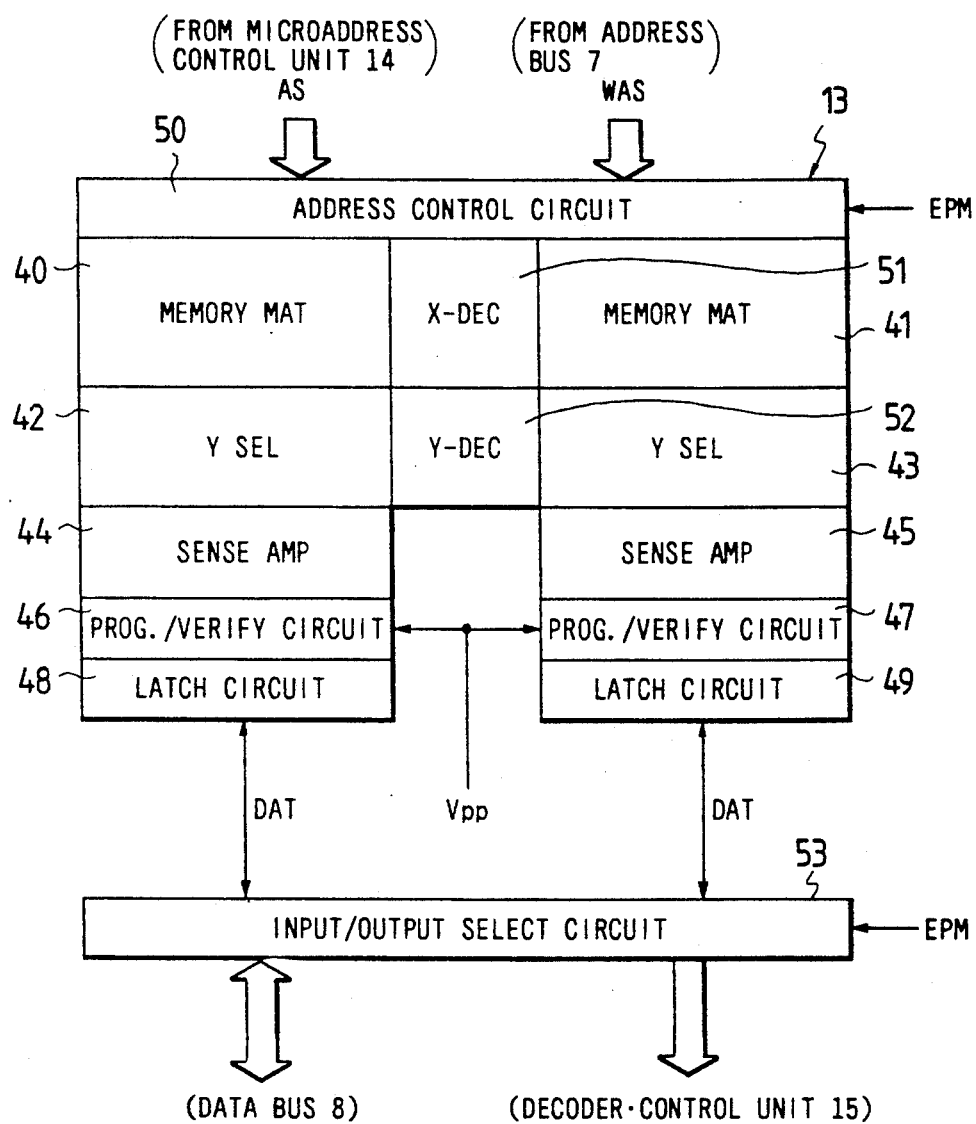
FIG. 6 is the block diagram of a typical ROW unit employed in the sub-processor.

FIG. 6 is a typical block diagram of the micro-ROM unit 13. As shown in the figure, the micro-ROM unit 13 includes a memory mat 40 for high order 32 bits and a memory mat 41 for low order 32 bits. Pairs of Y selectors 42 and 43, sense amplifiers 44 and 45, program/verify circuits 46 and 47 and data input/output latch circuits 48 and 49 are provided with one in each pair assigned to one of the memory mats 40 and 41. An address control circuit 50, an X address decoder 51, a Y address decoder 52 and an input/output select circuit 53 are common to both the memory mats 40 and 41.

The address signal (AS) output by the microaddress control circuit 14 described previously and a write address signal (WAS) provided by the address bus 7 are fed to the address control circuit 50 which also receives the EPM signal from the mode control circuit 102. When the EPM signal is raised to a high voltage level, the write address signal (WAS) is forwarded to the X and Y address decoders 51 and 52. On the other hand, if the EPM signal is pulled down to a low voltage level, the address signal (AS) received from the microaddress control circuit 14 is forwarded to the X and Y address decoders 51 and 52. The write address signal (WAS) and the address signal (AS) are decoded by the X and Y address decoders 51 and 52. The result of the decoding selects a word line in each of the memory mats 40 and 41. At the same time, the selected word lines each determine the corresponding 32 bits of memory cells through the Y selectors 42 and 43. In the case of a read operation, data of the selected memory cells is amplified by the sense amplifiers 44 and 45 before being provided to the decode/control unit 15 described previously through the input/output latch circuits 48 and 49 and the input/output select circuit 53. In the case of a write operation, write data (DAT) given to the input/output latch circuits 48 and 49 via the input/output select circuit 53 is written into the selected memory cells through the program/verify circuits 46 and 47. A verify operation is then carried out after the data has been written into the selected memory cells. A high voltage (Vpp) required in a write operation is supplied externally to the program/verify circuits 46 and 47.

The input/output select circuit 53 is controlled by the EPM signal. To be more specific, if the EPM signal is raised to a high voltage level, the input/output select circuit 53 connects the data bus 8 to the data input/output latch circuits 48 and 49. With the EPM signal set to a low voltage level, however, the input/output select circuit 53 links the input/output latch circuits 48 and 49 to the decode/control unit 15.

The write address signal (WAS) and the transfer of write data can also be controlled by the CPU 2 through the data bus 8 and the address bus 7. None the less, it is recommended that the address input terminals and the data input/output terminals of the micro-ROM unit 13 be directly connected to the external pin group 9 when the high voltage (Vpp) for the write operation is supplied to the microprocessor 1 and the EPM signal is raised to a high voltage level by the mode control circuit 102 to set the sub-processor 5 in program mode such is the case with this embodiment. In this case, the microprocessor 1 appears to function as a unit comprising only electrically writable non-volatile memory. By mounting the microprocessor 1 on a writing apparatus such as an EPROM writer, a microprogram can thus be written thereto.

It should be noted that in the case of a data bus 8 with a bus width of 16 bits, the input/output select circuit 53 provides 16-bit data to the input/output latch circuit 48 and 49 during a write operation. At that time, the X and Y address decoders 51 and 52 thus select 16 memory cells simultaneously using the write address signal (WAS) provided through the address control signal 50. During a read operation, however, the X and Y address decoders 51 and 52 select 64 memory cells at a time using the address signal (AS) which is provided by the address control circuit 50 driven by the EPM signal set at a low voltage level. Since the program/ verify circuits 46 and 47 shown in FIG. 6 work like the high voltage load circuits (XR) and (YR) shown in FIGS. 15 and 16, the micro-ROM unit 13 can be configured into a structure almost identical with the ROM unit 4 of FIG. 1 the details of which are shown in FIGS. 15 and 16.

Figure 7A:
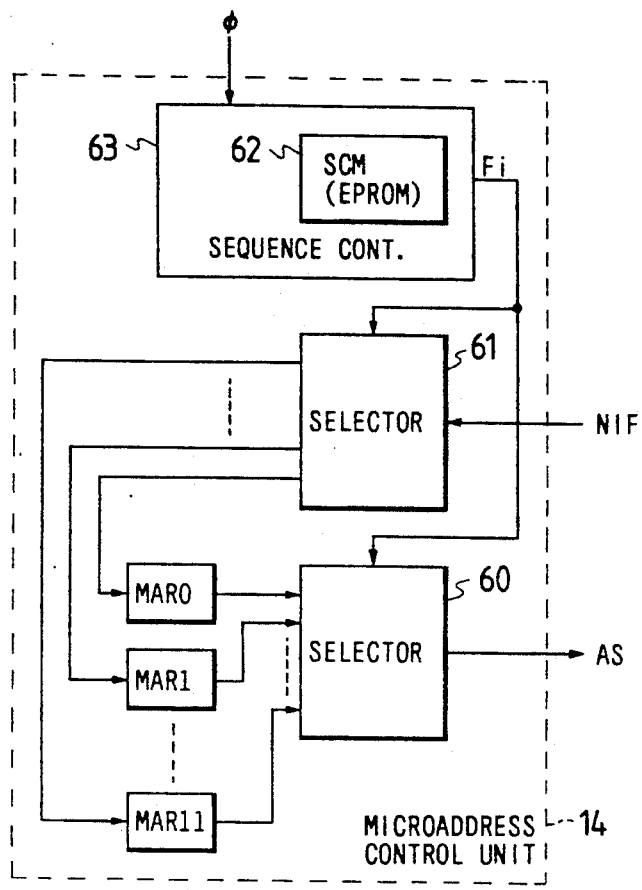
FIG. 7A is the block diagram of a typical microaddress control circuit employed in the sub-processor.

FIG. 7A is a diagram showing a typical example of the microaddress control circuit 14 described earlier. The microaddress control circuit 14 allows peripheral functions or controlling portions of a specific peripheral function defined by a microprogram stored in the micro-ROM unit 13 to be concurrently executed on a time-division basis. The micro address control circuit 14 includes typically 12 microaddress registers MAR0 to MAR11, selectors 60 and 61 and a sequence control circuit 63 having a sequence control memory (SCM) unit 62. The selector 60 is used for selecting one of the outputs of the microaddress registers MAR0 to MAR11 and feeding the selected output to the micro-ROM unit 13 as the address signal (AS). The selector 61 is used for selecting one of the microaddress registers MAR0 to MAR11 and loading next address information output by the micro-ROM unit 13 to the selected microaddress register. The SCM unit 62 provides information for selecting one of the outputs the microaddress registers MAR0 to MAR11 to the selector 60 and information for selecting one of the microaddress registers MAR0 to MAR11 to the selector 61. Like the micro-ROM unit 13, the SCM unit 62 is made of electrically writable non-volatile memory elements such as EPROM. The SCM unit 62 is used for storing sequence control information according to which any arbitrary one of the microaddress registers MAR0 to MAR11 is selected. Pieces of the stored sequence control information are read one after another cyclically at timings synchronized with execution cycles of microinstructions. A circuit for controlling the conditional branch of a microinstruction can be further provided between the selector 60 and the micro-ROM unit 13. Note that such a circuit is not shown in the figure.

Let, for example, peripheral functions defined by the microprogram stored in the micro-ROM unit 13 be those of a timer and a counter. In order for the sub-processor 5 to execute the two types of control tasks concurrently, designation of addresses of a sequence of microinstructions executing the first control task, i.e. the timer's function, is assigned to the microaddress register MART whereas designation of addresses of a sequence of microinstructions executing the second control task, i.e. the counter's function is assigned to the microaddress register MAR2. The non-volatile SCM unit 62 contains information used for selecting the microaddress resisters MART and MAR2 alternately so as to allocate time slices or time slots for execution of the microinstructions associated with the individual functions. As a result, the selector 60 is controlled by the output of the sequence control circuit 63 so that the contents of the microaddress registers MART and MAR2 are alternately supplied to the micro-ROM unit 13. In this way, the contents of each of the microaddress registers MART and MAR2 are output every other microinstruction execution. As the contents of either of the microaddress registers MART and MAR2 are provided to the micro-ROM unit 13, a microinstruction is read from an address in the micro-ROM unit 13 indicated by the contents of the microaddress register MART or MAH2. At the same time, the selector 61 is also controlled by the output of the sequence control circuit 63 so that the next address information contained in microinstructions read from the micro-ROM unit 13 is loaded alternately to the microaddress resisters MART and MAR2 through the selector 61. To be more specific, the selector 61 is controlled by the output of the sequence control circuit 63 so that the next address information contained in a microinstruction read from an address indicated by the contents of the microaddress register MART is loaded to the microaddress register MART whereas the next address information contained in a microinstruction read from an address indicated by the contents of the microaddress register MAR2 is loaded to the microaddress register MAR2. Accordingly, the sub-processor 5 executes microinstructions for the first and second control tasks alternately with microinstructions pertaining to a particular control task fetched every other microinstruction execution cycle.

As a result the sub-processor 5 outputs a pulse signal through a pin P30 of the external pin group 10 by executing the counter function while outputting pulses with a duty cycle of 50% to a pin (P20) of the external pin group 10 by executing the timer function.

While the sub-processor 5 is executing microinstructions, the flag registers (F REG) of the flag unit 17 are set or reset by the operation execution unit 16.

In the example described above, the sub-processor 5 executes microinstructions of the first and second control tasks alternately with microinstructions pertaining to a particular one of the two control tasks fetched every other microinstruction execution cycle. None te less, implementation of peripheral functions is not limited to such an application. For example, microinstructions for implementing three different tasks, e.g. a counter, a timer and a serial communication facility, can be executed one after another on a round robin basis every microinstruction execution cycle. As another application example, two identical tasks such as the functions of two similar counters can also be executed concurrently as well.

In either case, the microprocessor user can arbitrarily determine the operation of the sub-processor 5 by defining the tasks and types of peripheral functions as a microprogram stored in the micro-ROM unit 13 and a sequence of the execution of the peripheral functions as information stored in the SCM unit 62.

Even though not explicitly shown in FIG. 7A, like the micro-ROM unit 13 shown in FIG. 6, the SCM unit 62 is also connected to the address bus 7, the data bus 8 and the control bus 11 and receives the EPM signal provided by the mode control circuit 102 as well. In write mode which is indicated by the EPM signal set at a high voltage level, the SCM unit 62 receives a write operation high voltage of typically 12 volts through an external pin (P4). Since a typical circuit configuration implementing the SCM unit 62 is similar to that of the ROM unit 4 shown in FIG. 1, its explanation is omitted. For details of such a circuit, refer to FIGS. 15 and 16.

Figure 7C:
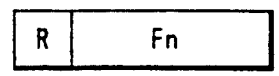
FIG. 7C is a diagram showing the format of typical information stored in the sequence memory.
Figure 7D:
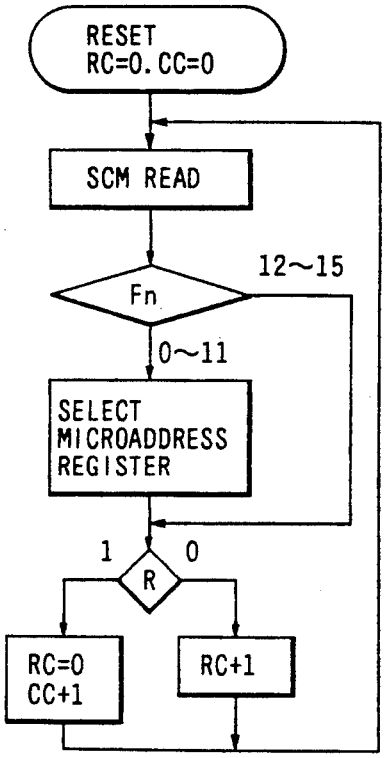
FIG. 7D is the operation flowchart of the sequence memory.
Figure 7B:
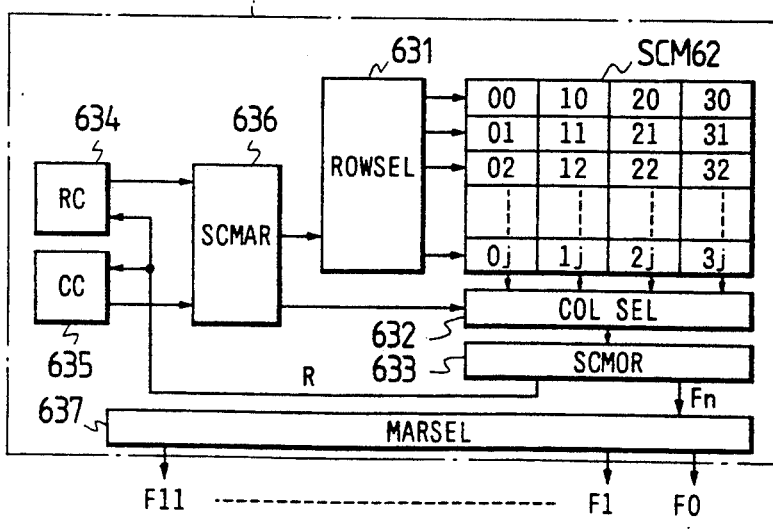
FIG. 7B is the block diagram of a sequence memory unit.

FIG. 7B is an example of the sequence control circuit 63 which works as follows.

The SCM unit 62 is typically configured as a matrix (00,. . .,3j−1) comprising j rows and 4 columns. Each matrix element typically comprises 5 bits of memory cells. A row select circuit (R0WSEL) 631 is provided for selecting a row among a plurality of the rows in the matrix. A column select circuit (COLSEL) 632 is provided for selecting a column among a plurality of the columns in the matrix. For example, the row select circuit (R0WSEL) 631 selects a row comprising a plurality of matrix elements "01", "11", "21" and "31". The column select circuit (COLSEL) 632 then selects a matrix element, for instance, "11" from the selected row. Data stored in memory cells corresponding to the selected matrix element "11" is finally provided to a sequence control memory output register (SCMOR) 633.

The R0WSEL 631 and COLSEL 632 select a row and a column respectively indicated by a row address and a column address provided by a sequence control memory address register (SCMAR) 636 which receives the row address from a row address counter (RC) 634 and the column address from a column address counter (CC) 636.

A bit (R) of the data output to the SCMOR 633 is furnished to the RC 634 and the CC 635 whereas the other four bits (Fn) are fed to a microaddress select circuit (MARSEL) 637. Receiving the four bits (Fn), the MARSEL 637 outputs select signals (Fi), where i =0 to 11, to the selectors 60 and 61 for use in selecting one of the microaddress resisters MAR0 to MAR11.

FIG. 7C shows the format of the five-bit data stored in each memory matrix element. As shown in the figure, the format comprises a one-bit return bit field R and a four-bit function number designation field Fn.

If the return bit R is set to a "1", the contents of the RC 634 are incremented by 1 and the contents of the CC are kept as they are. With the return bit R cleared to a "0", however, the RC 634 is cleared and the CC 635 is incremented by 1.

The function number designation field Fn contains numerical information for specifying one of the microaddress registers MAR0 to MAR11. Since in this embodiment the field Fn is four bits long, it can specify up to 16 microaddress registers. As shown in FIG. 7A, however, the number of microaddress registers is only 12. Accordingly, specifying a number in the range 12 to 15 in the function number designation field Fn causes the selector 60 to select no microaddress register. As a result, the micro-ROM 13 of the sub-processor 5 is not accessed and the sub-processor 5 performs no peripheral function, entering a functionally halted state.

FIG. 7D is a diagram showing the operation flow of the sequence control circuit 63.

The operation is started by putting the RC 634 and CC 635 in a reset state in which the contents of the RC 634 and CC 635 are cleared to zeros. In this state, data corresponding to the matrix element "00" is read. The contents of the function number destination field Fn contained in the read data is input to the MARSEL 637 which determines whether the value of the field Fn is in the range 0 to 11 or 12 to 15.

If the value of the field Fn is in the range 0 to 11, the MARSEL 637 selects one of the microaddress registers MAR0 to MAR11 which is assigned a number corresponding to the value of the field Fn by activating one of select signals F0 to F11. Subsequently, the value of the return bit R is evaluated. Let, for example, the value of the filed Pn be unity. In this case, the select signal F1 is raised to a high voltage level with the others F2 to F11 being kept low. If the value of the field Fn is in the range 12 to 15, however, the operation flow continues to the step evaluating the return bit R, skipping the step to select one of the microaddress registers MAR0 to MAR11.

As is described earlier, if the return bit R is set to a "1", the contents of the RC 634 are incremented by 1 and the contents of the CC are kept as they are. With the return bit R cleared to a "0", however, the RC 634 is cleared and the CC 635 is incremented by 1.

Afterwards, the operation flow is repeated by executing the step accessing the SCM unit 62 using the updated contents of the RC 634 and CC 635 which were either incremented, cleared or kept as they are according to the value of the return bit R.

In this way, the sub-processor 5 executes desired peripheral functions in accordance with information on the order of execution stored in the SCM unit 62 and a program stored in the micro-ROM unit 13.

In this invention, the circuit configuration shown in FIG. 7A is not an absolute requirement. A general circuit configuration allowing no concurrent execution will also be acceptable. In addition, when the address control circuit 14 is adopted, it is desirable to configure the non-volatile SCM unit 62 so that the control to write information thereto can be done in the same way as the micro-ROM unit 13.

Information to be stored in the SCM unit 62 and a microprogram in the micro-ROM unit 13 of the sub-processor 5, which allows implementable peripheral functions to be selected, all depend upon the configuration of a system applying the microprocessor 1. It is assumed therefore that the specification of the application system is not yet determined at the time the microprocessor 1 is delivered by the manufacturer to the user or the user wants to freely use the peripheral functions of the microprocessor 1 in a way different from application system to application system. In this case, it is desirable for the manufacturer to ship the microprocessor 1 with no information defining peripheral functions stored in the micro-ROM unit 13 and no information on the sequence of task execution written on the SCM unit 62 of the sub-processor 5.

Figure 18:
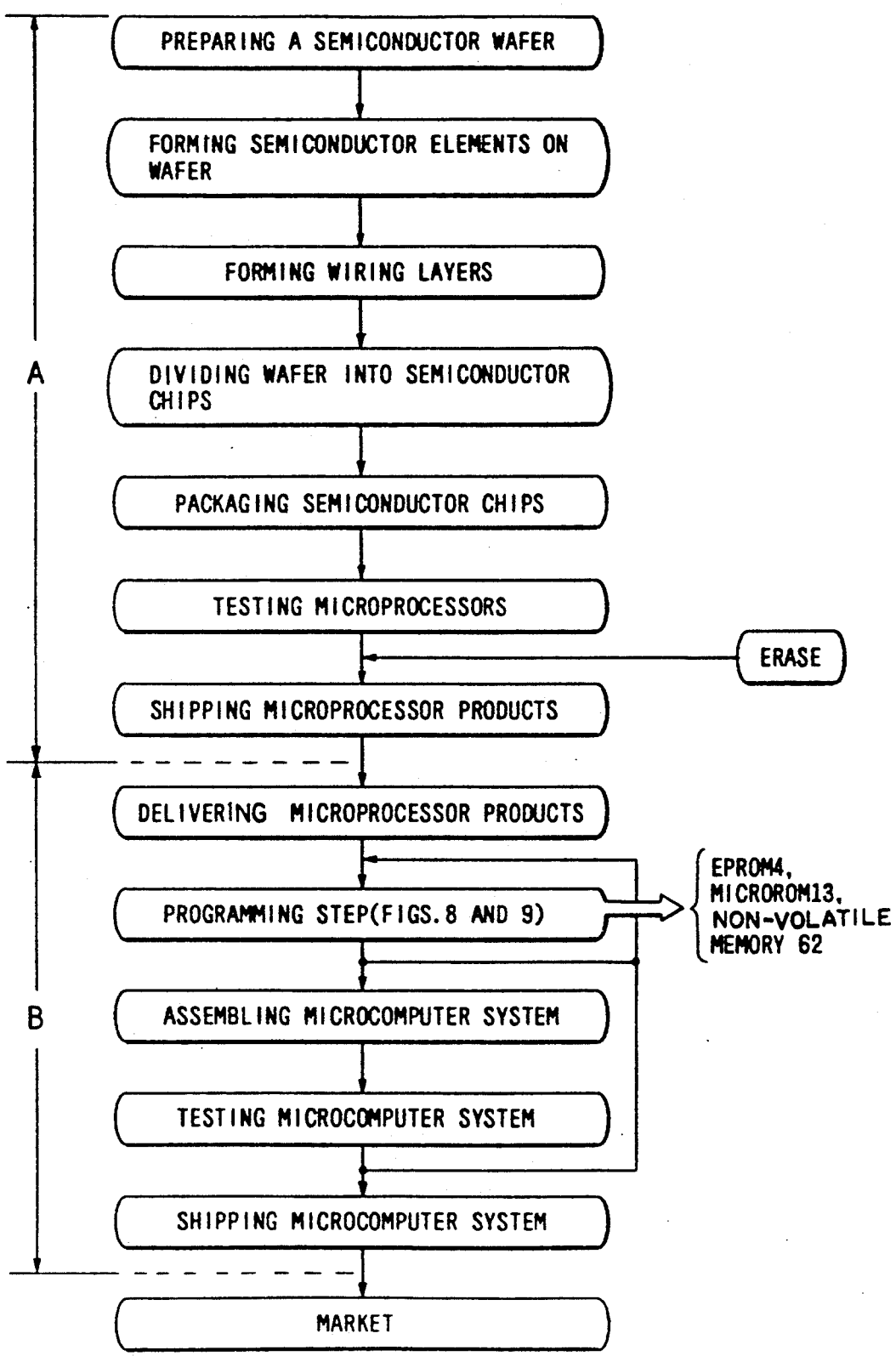
FIG. 18 is a flowchart showing a sequence of processes handling the microprocessor, from manufacturing to shipping to the market place.

FIG. 18 is a flow of major processes of the microprocessor 1 according to the invention, from manufacturing to market delivery. An A portion of the figure shows processes performed by the semiconductor manufacturer whereas a B portion shows those carried out by the system manufacturer or the microprocessor user.

As shown in the A portion of FIG. 18, the semiconductor manufacturer first prepares a piece of semiconductor wafer and then forms semiconductor elements constituting a plurality of microprocessors 1 on the main surface of the semiconductor water using a known semiconductor manufacturing method. Subsequently, a process forming wiring layers is performed in order to create wires electrically connecting the semiconductor elements to each other. Afterwards, a process dividing the wafer into semiconductor chips is carried out in order to produce the individual microprocessors 1 created on the surface of the wafer. Each chip cut out off the wafer is then sealed in a ceramic or resin package. After that, a process testing the functions of each microprocessor 1 is done prior to product shipping in order to discriminate inferior products from those of good quality. Only microprocessors 1 of good quality passing the functional tests are finally shipped to the user. It should be noted that because of the functional tests, any information stored in the ROM unit 4, the micro-ROM unit 13 and the non-volatile sequence control memory unit 62 of the microprocessor 1 is erased.

The microprocessor 1 is then delivered to the system manufacturer or the microprocessor user as indicated by transition from the portion (A) to (B) of the operation flow. In order to put desired functions in the the microprocessor 1, the user programs the ROM unit 4, the micro-ROM unit 13 and the non-volatile sequence control memory unit 62. The system manufacturer then assembles an application system, incorporating the programmed microprocessor 1 therein. Subsequently, the application system is tested before being finally shipped to the end user.

Only application systems determined by the tests to be products of good quality are shipped to the market place. If a functional change is deemed necessary by the test process, the microprocessor 1 is returned to the programming process to be reprogrammed. It should be noted that a semiconductor manufacturer may produce the microprocessor 1 with peripheral functions set therein in advance. None the less, the microprocessor 1 produced as such does not in essence deviate from the gist of the invention.

Next a method for setting peripheral functions in the microprocessor 1 described above is explained.

First, in order to reduce the user's work load to set peripheral functions in the microprocessor 1, it is desirable to provide information for defining general functions implementable by the sub-processor 5 in advance as a library. For example, microprograms implementing timer, counter, PWM and serial communication (ASCI) functions or others are each converted into microcode and then cataloged in an information library which is provided to the user through manuals describing such microcode, storage media such as floppy disks or online services. It should be noted, however, that the source of such an information library is not necessarily the manufacturer of the microprocessor 1. The user himself, another system manufacturer or a design house may also provide such a library as well.

Figure 8:
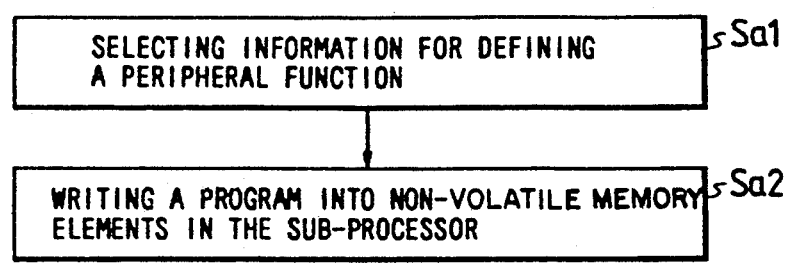
FIG. 8 is a flowchart showing the principle of operations setting peripheral functions into the embodiment implementing the microprocessor.

The method for defining peripheral functions in the microprocessor 1 by the use of a library containing information on peripheral function definitions is shown in FIG. 8 as an operation flow. As shown in the figure, in a step Sa1, desired information is selected from the library. Based on the selected information, the non-volatile memory elements 13 and 62 of the sub-processor 5 are then programmed in a step Sa2. The step Sa1 in which desired information is selected is carried out dependently upon the way the library of information on peripheral function definitions is provided or upon the form of the library. In the case of a library provided in storage media, for example, desired information is selected by properly choosing correct storage media or locating a right area in the storage media. The step Sa2 for programming the non-volatile memory elements 13 and 62 of the sub-processor 5 is accomplished by use of a writing apparatus such as an EPROM writer. This programming step Sa2 also depends upon the form of the library of information on peripheral function definitions. In the case of microcode described in a manual, for example, the non-volatile memory elements 13 and 62 of the sub-processor 5 are programmed by entering the microcode to the writing apparatus via a keyboard. As for storage media such as a floppy disk and an online service, the non-volatile memory elements 13 and 62 of the sub-processor 5 are programmed by entering the microcode to the writing apparatus through an external interface thereof.

The next description explains how a work station or personal computer system which is referred to hereafter simply as a computer system (a generic term used only for the sake of convenience) can be used to accomplish with ease the method for defining peripheral functions in the microprocessor 1 described above.

Figure 9:
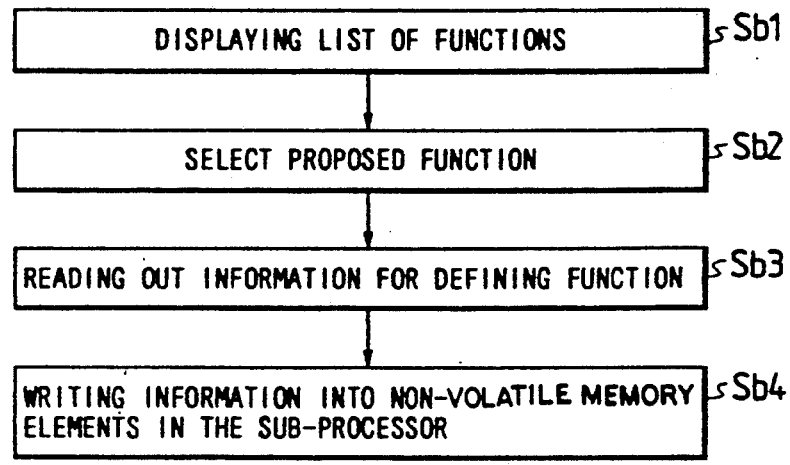
FIG. 9 is a flowchart showing a method used by the embodiment for setting peripheral functions through a computer system.
Figure 10:
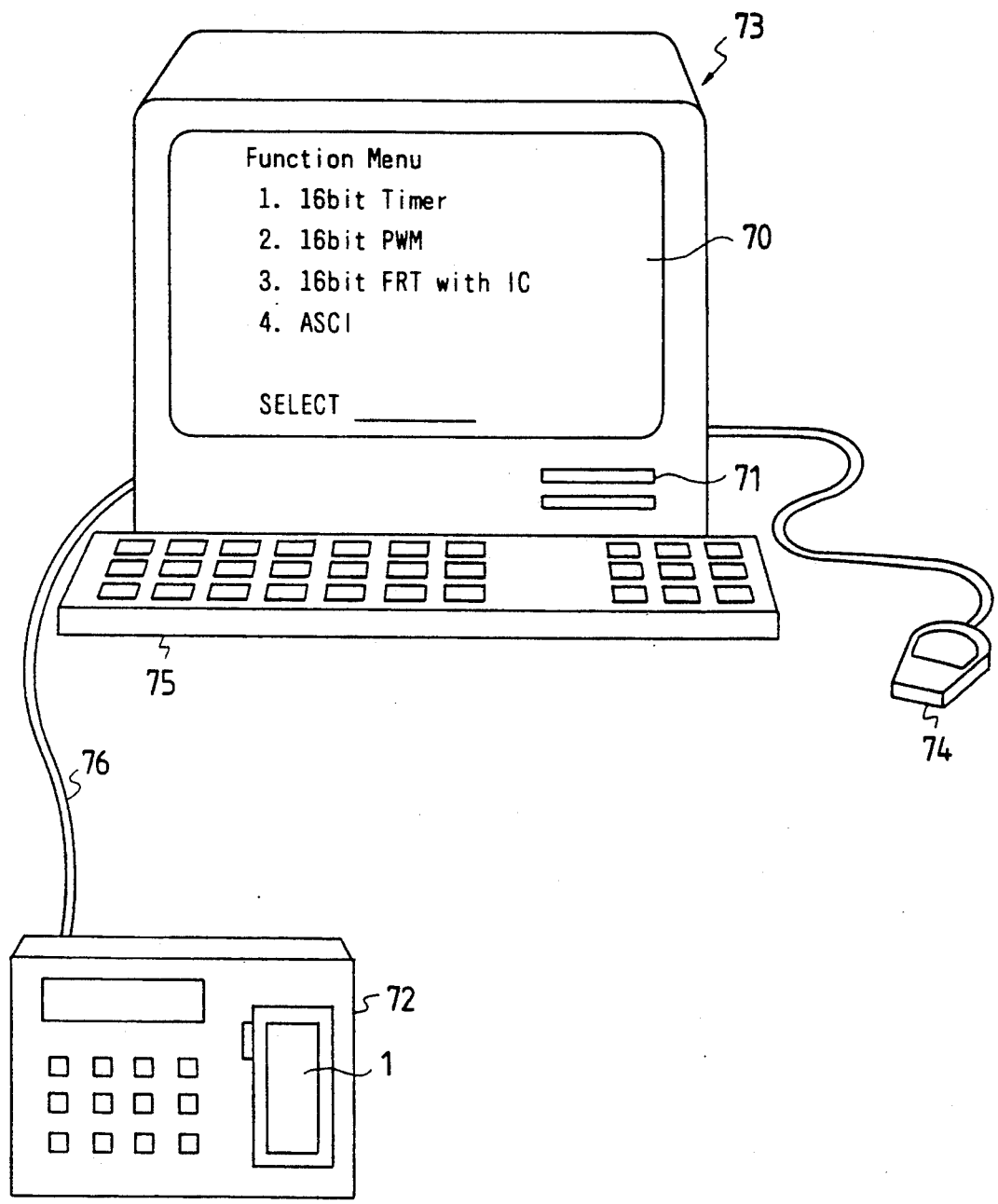
FIG. 10 is a diagram showing the configuration of a typical system adopting the method shown in FIG. 9.

FIG. 9 shows a typical procedure for using a computer system to accomplish the above method. FIG. 10 is a diagram showing the configuration of hardware for carrying out processings in accordance with the procedure of FIG. 9. In a step Sb1 of the procedure shown in FIG. 9, a menu of facilities included in the information for setting peripheral functions provided in advance as a library is displayed on a Cathode Ray Tube (CRT) screen 70 of the computer system. In the following step Sb2, a desired facility is selected from the menu using a mouse 74 or a keyboard 75 attached to the computer system. Then, in a step Sb3, information for defining functions corresponding to the selected item from the menu is retrieved from storage media 71 of the computer system and transmitted to a writing apparatus 72 such as an EPROM writer for programming the information into the non-volatile memory elements 13 and 62 of the sub-processor 5 embedded in the microprocessor 1 as shown in the last step Sb4. The sequence of processings shown in FIG. 9 are executed in accordance with a software program of the computer system. Reference numeral 73 shown in FIG. 10 denotes the computer unit itself whereas numeral 76 is an interface cable connecting the computer unit 73 to the writing apparatus 72 such as an EPROM writer.

If a debugging result indicates that it is necessary to modify a peripheral function after it has been once set in the microprocessor 1 by the method described above, modified bit patterns are written to the non-volatile memory elements 13 and 62 of the microprocessor 1 using the same method. In this way, the microprocessor 1 containing the modified peripheral function can thus be obtained. In the case of a microprocessor 1 with the micro-ROM unit 13 and the sequence control memory unit 62 therein made of EPROM, the microprocessor 1 is sealed in a package having an ultraviolet ray erasure window. Information stored in the microprocessor 1 can thus be erased by an ultraviolet ray applied to the window, allowing a modified bit pattern to be written to the micro-ROM unit 13 and the sequence control memory unit 62. As for the microprocessor 1 having its micro-ROM unit 13 and sequence control memory unit 62 made of EEPROM, information stored therein can be changed electrically.

Effects of the embodiment described so far are listed as follows:

(1) Peripheral functions are specified by information stored in the non-volatile memory elements 13 and 62. The time to define or change the peripheral functions to be implemented by the sub-processor 5 is determined only by the time to write the information into the non-volatile memory elements 13 and 62. On the other hand, in the case of a microcomputer made by a conventional technique such as the standard-cell method, peripheral functions to be implemented can only be defined or changed through creation or modification of a master pattern by the microcomputer manufacturer. In comparison to such a microcomputer, the microprocessor 1 allows peripheral functions to be defined or altered as desired by the user in a considerably shorter period of time. Here also, it can be assumed that most of the processing to determine peripheral functions is performed by writing information into the non-volatile memory elements. In this case, however, even a partial change in wiring Pattern constituting only a portion of logically decisive elements still resorts to a manufacturing process entailing an excess time so that the total time to implement the peripheral functions is considerably increased.

(2) The above effect allows the user to implement on-chip peripheral functions which are embedded with the microprocessor 1 in a single chip with ease in a short period of time.

(3) Logic for generating an operation control procedure for peripheral functions to be implemented is provided in non-volatile memory elements in order to define the peripheral functions. To put it in more detail, peripheral functions implementable in the microprocessor 1 can be selected in accordance with tasks performed by a microprogram written in the micro-ROM unit 13. As a result, the generality of the microprocessor 1 is improved and, to a greater extent, the user can thus utilize the microprocessor 1 in his own way.

(4) The microprocessor 1 provided by the invention is superior in that information for defining peripheral functions can be generated easily at a high speed due to the fact that peripheral functions implementable by the sub-processor 5 are defined by a microprogram. Operation control signals can also be generated by a wired logic configuration utilizing PLDs oil PLAS. In this case, however, complex gate logic is required in the configuration. Accordingly, the logic design for defining peripheral elements inevitably requires much time and, in addition, the increased number of gate stages also introduces time delays in the operation.

(5) With the sub-processor 5, peripheral functions including pulse input/output facilities such as timers, counters and pulse width controllers, and communication control facilities can be selected. Functional characteristics of peripheral facilities include capabilities of detecting as well as exercising influence over external events. In order to provide peripheral facilities with such capabilities, the information designation field 21 for controlling input/output operations on the flag unit 17, which is directly connected to the external pin group 10, is included in each microinstruction for use in writing a microprogram. Accordingly, the speed to control input/output pulses through the flag unit 17 can be increased or the resolution on the controlled input/output pulses can be enhanced.

(6) The microaddress control circuit 14 is adopted in order to run a microprogram stored in the micro-ROM unit 13 in such a way that peripheral functions or control tasks of a specific peripheral function are executed on a time-division basis, appearing to work concurrently. Accordingly, the sub-processor 5 allows a plurality of peripheral functions of different types to be be executed simultaneously on a time-division basis. As a result, the sub-processor 5 can be made versatile and the cost-performance can further be improved.

(7) At the time the microprocessor 1 is shipped by the manufacturer, the sub-processor 5 contains no information defining peripheral functions. Setting the sub-processor 5 in such a state assures the user that peripheral functions can be set freely regardless of the types of the non-volatile memory elements included in the sub-processor 5. With non-volatile memory elements unerasable electrically, for example, no ultraviolet ray erasure window is required and even if such a window is provided on the microprocessor chip, no erase operation is necessary. As for non-volatile memory elements which can be electrically erased and rewritten, the state of the sub-processor 5 prevents undesired information irrelevant to the peripheral functions from being left in the nonvolatile memory elements as it is. In case an application system using the microprocessor 1 is not yet determined by the delivery time, the user can therefore keep the microprocessor 1 in stock without incurring any risk. In addition, the user can freely use peripheral functions required by an application system with ease in a manner different from system to system. This feature of the microprocessor 1 further allows the user, to a greater extent, to use the microprocessor 1 in his own way.

(8) When setting peripheral functions of the microprocessor 1 provided by the invention for an application system utilizing the microprocessor 1, a methodology is adopted so as to allow the user to select desired data from a library provided in advance containing information defining functions which can be implemented by the sub-processor 5. The methodology eliminates the necessity for the user to develop information for setting peripheral functions by himself, saving the user the time that would be otherwise required for such development. The methodology thus reduces the user's work loads to set the peripheral functions.

(9) A menu of functions included in the information provided in advance as a library is displayed on the screen 70 of a computer system. Information defining a peripheral function corresponding to an item selected from the menu of functions is then read from the storage media 71 of the computer system. Subsequently, the read information is transmitted from the computer system to the writing apparatus 72 in which the nonvolatile memory elements of the sub-processor 5 are programmed. The use of a work station or a personal computer as a computer system specially supports the development methodology, further reducing as well as simplifying the user's work loads to set the peripheral functions.

The invention invented by the inventor has been described in concrete terms through an embodiment. None the less, embodiments according to the invention are not limited to that explained so far. It is needless to say that the cited embodiment can have a variety of variations which are in the scope of the invention not deviating the gists of the invention.

For example, a sub-processor controlled by a microprogram in the embodiment is described as a typical means for implementing peripheral functions. None the less, the scope of the invention is not limited to such a sub-processor. Instead, a programmable logic array can also be configured by using non-volatile memory elements. Also, the non-volatile memory elements do not have to be EPROM or EEPROM but they can be non-volatile RAM or include even volatile memory elements. In addition, the information for setting peripheral functions provided as a library is not necessarily information for defining common functions to be put to a wide use. The information can also be a special one.

An application of the invention invented by the inventor to the general purpose microprocessor with a microprogrammed sub-processor embedded therein, a field of applications which serves as the background of the invention, has been explained. None the less, the scope of the invention is not limited to such an application. The invention can also be applied widely to a variety of LSIs for data processing which also display intelligent performances of the microprocessor as well.

Effects resulting from representative innovations according to the invention disclosed in this specification are explained briefly as follows.

Peripheral functions are defined by information stored in non-volatile memory elements contained in a peripheral function implementing means. The time required for defining or modifying the peripheral functions to be implemented by the peripheral function implementing means is thus determined by the time to write the information into the non-volatile memory elements. Accordingly, the peripheral functions embedded in the microprocessor can be freely set in an extremely short period of time. As a result, the microprocessor user can implement the peripheral functions embedded with the microprocessor in a single chip with ease in a short period of time.

Peripheral functions are defined by providing the non-volatile memory elements with logic generating an operation control procedure for implementing the peripheral functions. A variety of peripheral functions different from each other can thus be selected arbitrarily in accordance with the definition. Accordingly, the generality of the microprocessor is improved in the sense that it includes selectable embedded peripheral functions. As a result, to a greater extent, the user can further utilize the microprocessor in his own way.

The fact that implementable peripheral functions are defined by a microprogram has an effort of readily attaining an easier and faster generation of information defining the peripheral functions than a wired logic configuration employing PLDS, PLAs or others.

The peripheral function implementing means allows peripheral functions including pulse input/output facilities such as timers, counters and pulse width controllers, and communication control facilities to be selected. By the way, functional characteristics of the peripheral facilities include capabilities of detecting as well as exercising influence over external events. In order to provide the peripheral facilities with such capabilities, an information designation field for controlling input/output operations on a flag unit, which is directly connected to external pins, is included in each microinstruction for use in writing a microprogram. As a result, the speed to control input/output pulses through the flag unit can be increased or the resolution on the controlled input/output pulses can be enhanced.

A microprogram is executed in such a way that peripheral functions or control tasks of a specific peripheral function are run on a time-division basis, appearing to work concurrently. With a single peripheral function implementing means, a plurality of peripheral functions of various types can thus be executed simultaneously and concurrently on a time-division basis. As a result, the microprocessor can be made versatile and its cost-performance can be improved further.

At the time the microprocessor is shipped by the manufacturer or before it is incorporated in an application system, the peripheral function implementing means contains no information defining peripheral functions. Setting the means in such a state assures the user that peripheral functions can be set freely regardless of the types of the non-volatile memory elements included in the means. In case an application system using the microprocessor is not yet determined by the delivery time, the user can therefore keep the microprocessor in stock without incurring any risk. In addition, the user can freely use peripheral functions required by an application system with ease in a manner different from system to system. As a result, in this respect, the user can, to a greater extent, utilize the microprocessor in his own way.

When setting peripheral functions of the microprocessor provided by the invention for an application system utilizing the microprocessor, a methodology is adopted so as to allow the user to select desired data from a library provided in advance containing information defining functions which can be implemented by the peripheral function implementing means. The methodology eliminates the necessity for the user to develop information for setting peripheral functions by himself, saving the user the time that would be otherwise required for such development. The methodology thus has an effect of reducing the user's work loads to set the peripheral functions.

A menu of functions included in the information provided in advance as a library is displayed on the screen of a computer system. Information defining a peripheral function corresponding to an item selected from the menu of functions is then read from the storage media of the computer system. Subsequently, the read information is transmitted from the computer system to a writing apparatus in which the non-volatile memory elements of the peripheral function implementing means are programmed. The use of a work station or a personal computer as a computer system supports the programming method. As a result, the user's work loads to set the peripheral functions are further reduced as well as simplified.

A plurality of other embodiments implementing the the sub-processor 5 shown in FIG. 1 are described below. These embodiments are effective for enhancing the generality of the sub-processor 5 and reducing its power consumption.

The other embodiments according to the invention are described by referring to diagrams associated with them as follows.

Figure 19:
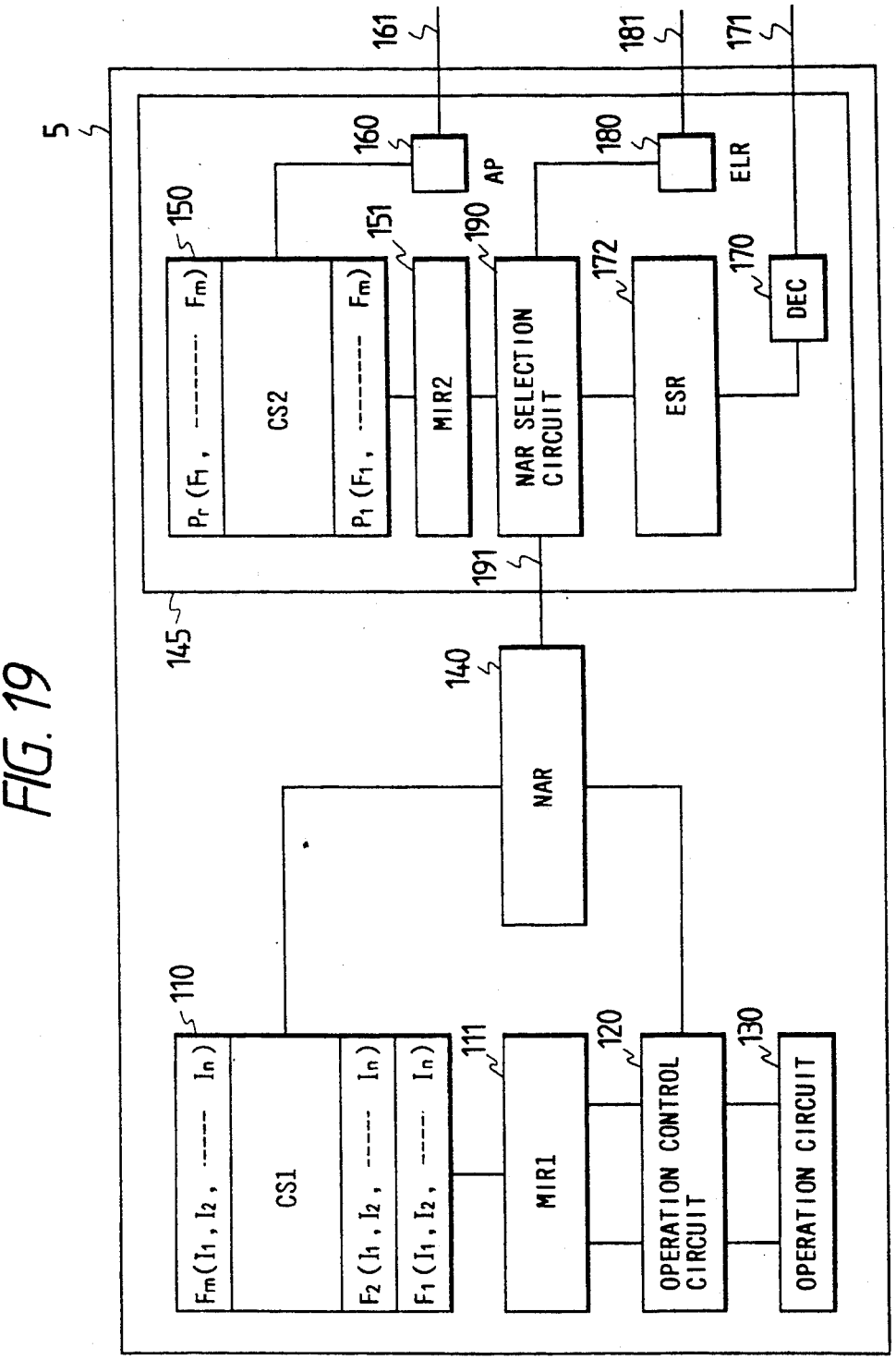
FIG. 19 is a block diagram of an embodiment implementing a sub-processor according to the invention.

FIG. 19 is the block diagram of another embodiment implementing the sub-processor 5 shown in FIG. 1.

Reference numeral 110 shown in FIG. 19 denotes a first control memory unit CS1 for storing a microprogram. Reference numeral 111 is a microinstruction register MIR1 for temporarily storing a microinstruction of the microprogram stored in the first control memory unit 110. Reference numerals 120 and 130 denote an operation control circuit and an operation circuit respectively. Reference numeral 140 is a group of registers NAR for storing addresses at the control memory unit 110 from which next microinstructions are to be fetched. Reference numeral 145 denotes a means for selecting an address register by outputting an address register select signal 191. The address register selecting means 145 comprises components indicated by the following reference numerals. Reference numeral 150 is a second control memory unit CS2 for storing a plurality of address register selection orders. The second control memory unit CS2 150 is made of writable non-volatile memory elements. Reference numeral 151 is a microinstruction register MIR2 for temporarily storing data read from the second control memory unit 150. Reference numeral 160 denotes a means AP for selecting one of a plurality of the address register selection orders stored in the second control memory unit CS2 150 in response to an external signal 161. Reference numeral 170 is a decoder (DEC) for decoding an external signal 171 which is used for selecting an address register. Reference numeral 172 denotes a register ESR for temporarily storing a decoding result output by the decoder 170. Reference numeral 180 is a register ELR for temporarily storing the value of an external signal 181 which is used for indicating that an external command to select an address register has a higher priority than a command to select an address register originated from the second control memory 150. Based on the command to select an address register originated from the second control memory 150, the external command to select an address register indicated by the external signal 171 and the priority specified by the external signal 181, an address register selecting circuit 190 determines an address register to be selected, outputting the address register select signal 191.

By referring to FIG. 19, the operation of the sub-processor 5 is described as follow.

The operation control circuit 120 controls the operation circuit 130 by decoding the contents of the microinstruction register 111. At the same time, the control memory unit 110 generates an address of the microprogram containing a microinstruction to be executed next and outputs the address to one of the next address register 140. The operation control circuit 120 then reads the address from one of the next address registers 140 and fetches a next microinstruction stored at the address from the control memory unit 110, controlling the entire sub-processor 5. The multiple next address registers 140 are each assigned to a unique task. The address register selecting means 145 selects one of the next registers 140 from or to which an address is read or stored. By selecting a next address register every machine clock on a time-division basis, it is possible to make the tasks assigned to the next address registers 140 appear to run concurrently.

FIG. 20 is a detailed circuit diagram of the address register selecting means 145 shown in FIG. 19 and used for explaining its operation. As shown in FIG. 20, the next address registers 140 comprise five registers R1 to R5 which are respectively selected by control signals 191-1 to 191-5 being set to a '1'. Let us assume that the external signal 181 set to a '1' is currently received. The outputs of OR gates 193-1 to 193-5 are then all set to a '1' without regard to requests from the second control memory unit 150 which are stored in the microinstruction register MIR2. Accordingly, only a command to select an address register indicated by the external signal 171 is effective. On the contrary, when the external signal 181 set to a '0' is received, logical products of the requests from the second control memory unit 150 and the command to select an address register indicated by the external signal 171 are taken by AND gates 192-1 to 192-5 in order to select one of the address registers 140. As a result, it is possible to select eventually one of some address registers specified by the second control memory unit 150 by the external signal 171. In this case, the external signal 171 can be a signal provided by the CPU 1 to explicitly select an address register or a signal responding to an external event. With the outputs of the AND gates 192-1 to 192-5 all set to a '0', the NAR circuit 190 selects none of the address registers 140, specifying a so-called NOP (no operation). In such a case, the requests by a microinstruction fetched from the second control memory unit 150 become invalid.

The above description explains how address register selecting signals 191-1 to 191-5 are controlled by a microprogram stored in the second control memory unit 150 which represents an address register selection order or, thus, a task execution order. The following description explains how an execution order of a plurality of tasks is specified by using a program development apparatus and how the specification of the execution order is converted into code to be stored in the second control memory unit 150 through an embodiment.

Table 1 shows an example of a programming language for describing a task execution order input to a program development apparatus of the microprocessor.

TABLE 1

Format of language describing task execution orders

| Field 1 | Field 2 | Field 3 |
| --- | --- | --- |

1. Field 1: Label Designation Field (Omissible)
2. Field 2: Task Designation Field (Unomissible)
   (1) ( ) type
       Tasks enclosed in the parentheses are to be executed sequentially.
   (2) SQ ( ) type
       Tasks enclosed in the parentheses are to be executed sequentially by turns every cycle.
   (3) EV ( ) type
       One of the tasks enclosed in the parentheses is to be selected by the external signal.
3. Field 3: Branch Destination Field (Omissible) having the following format:
   BR (Branch Destination Label Name)

Note) One or more blanks and a comma are used as delimiters between fields and between tasks respectively.

Field 1 shown in Table 1 is a label designation field for specifying the name of a label which typically comprises up to eight alphanumeric characters with the first character being the capital 'L' of the alphabet. The label designated by Field 1 may be specified by Field 3 as a branch destination. Field 2 is a task designation field used for specifying tasks to be executed. If it is desired to execute tasks simply one after another, the tasks are enclosed in parentheses with a comma used as a delimiter between any two of them. For example, if tasks T1, T2 and T3 are to be executed sequentially, Field 2 is described as '(T1, T2, T3)'. If it is desired to execute the multiple tasks enclosed in the parentheses '( )' one by one switching them every program cycle, the parentheses '( )' are preceded by the capitals 'SQ' of the alphabet like for example 'SQ (T1, T2, T3)'. If it is desired to select one of a plurality of tasks by the external signal 171, the parentheses '( )' are preceded by the capitals 'EV' of the alphabet like for example 'EV (T1, T2, T3)'. The NOP (No Operation) specification is represented by enclosing a blank in parentheses: '( )'. Field 3 is a branch designation field for specifying a branch destination. A branch destination is specified by enclosing the name of a label in parentheses which are preceded by the capitals 'BR' of the alphabet. The label is assigned to the branch destination by Field 1. It should be noted that Fields 1 and 3 are optional and thus omissible. Lets us call a description of Fields 1, 2 and 3 a task selection. A program (a sequence of task selections) returns to the first task selection if Field 3 of the last task selection specifies Field 1 of the first task selection. The program thus forms a loop of task selections. In such a loop, a particular task specified by Field 2 of a task selection is selected repeatedly. A task can be written in such a way that after executing the last microinstruction of the task, the task automatically returns to its first microinstruction. By writing a task in this way, specifying the task in a program loop will cause the task to be executed repeatedly.

FIG. 21 shows examples of programs written in the language described in Table 1. Four program examples are shown in the figure. Notations T1 to T5 used in FIG. 21 each denote a task which comprises one or more microinstructions. A task typically corresponds to a peripheral function such as the function of a timer or the function of a communication facility.

Figure 22:
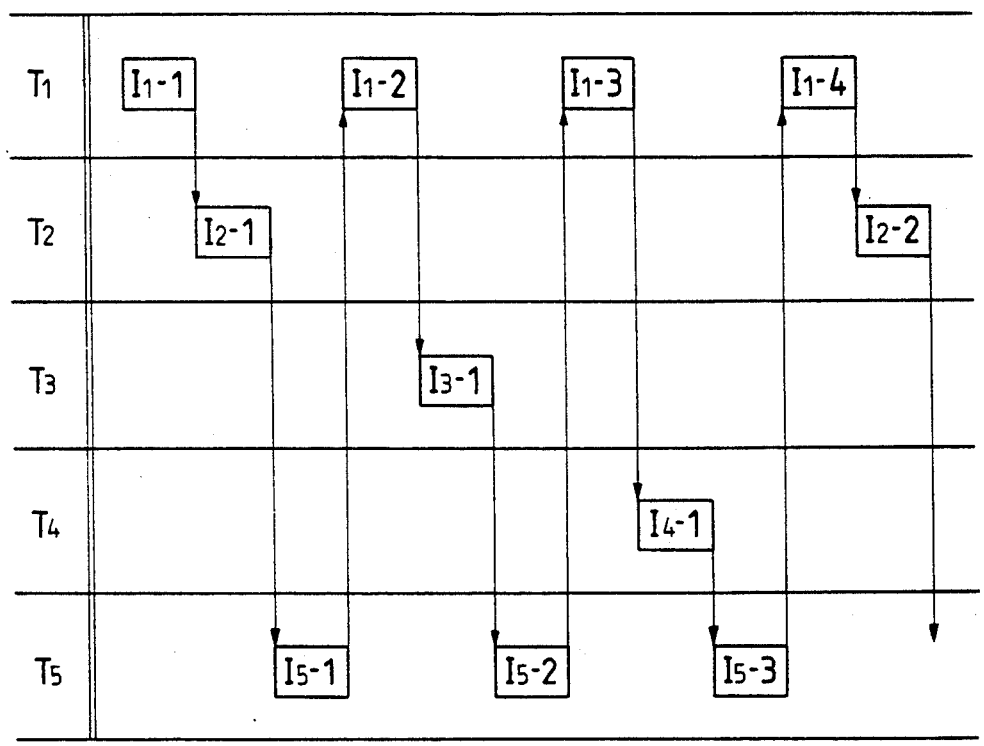
FIG. 22 is a timechart of operations executed by one of the program examples shown in FIG. 21.

FIG. 22 is a timechart of a sequence of task selections described by the third program example shown in FIG. 21.

Tasks Ti, where i=1 to 5, shown in FIG. 22 each comprise Ni microinstructions Ii-j, where j=1 to Ni. It is obvious from the figure that the tasks T1 to T5 appear to run concurrently. It is also clear that the tasks T2, T3 and T4 are executed only once for every three executions of the tasks T1 and T5. Accordingly, the tasks T1 and T5 are run at an execution speed of one third of the other tasks. In this way, a plurality of tasks can be run concurrently on a time-division basis at different execution speeds in an order of execution specified by the program described in Table 1.

Figure 23:
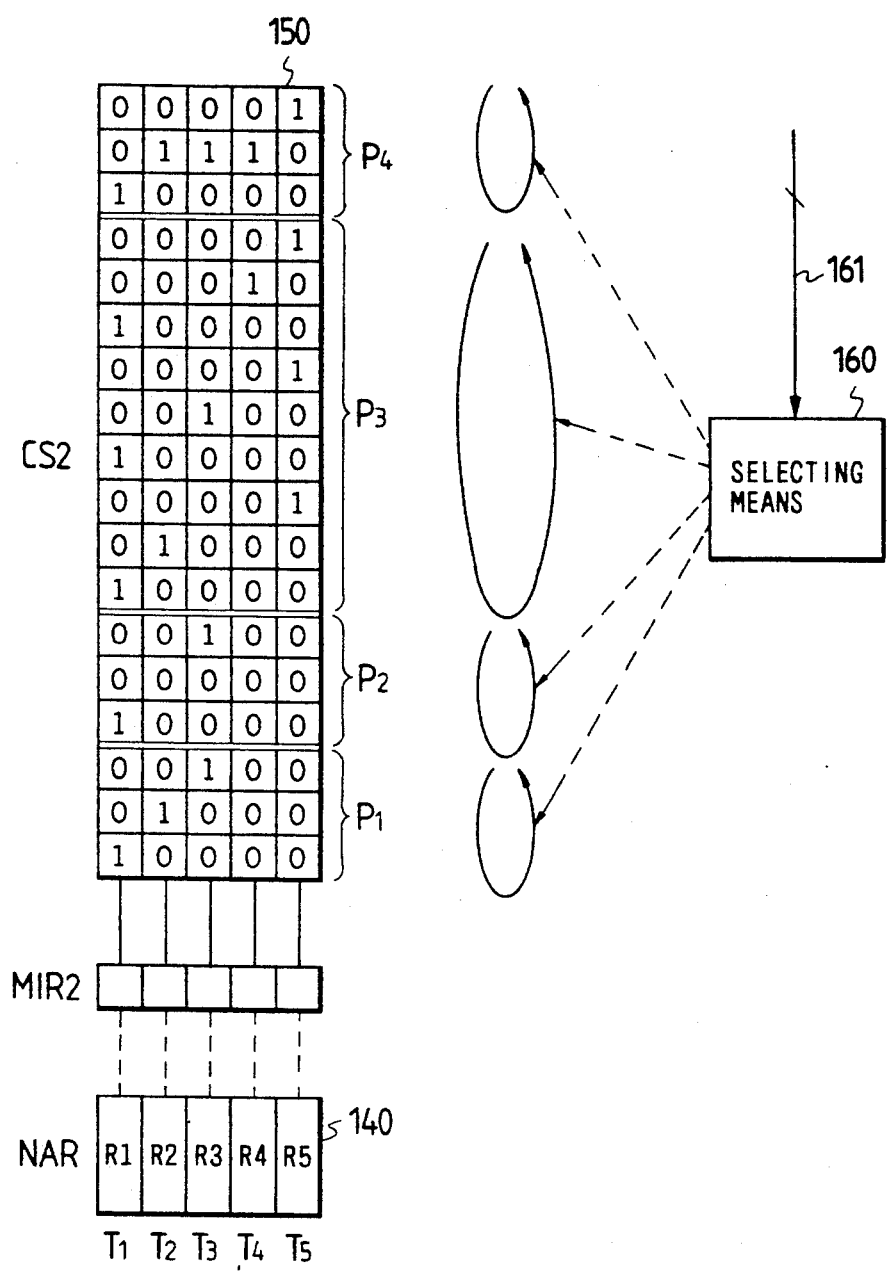
FIG. 23 is a diagram showing memory codes controlling the program examples of FIG. 21.

The programs shown in FIG. 21 are translated into code known as machine language programs by the program development apparatus for the microprocessor 1. FIG. 23 is an embodiment of the code as it is stored in the second control memory unit 150.

Every bit stored in the second control memory unit 150 denotes one of the microaddress registers (NAR) 140 which are each associated with a task. Accordingly, each bit denotes a task. A task selection in a program is translated by the program development apparatus into a row of bits shown in FIG. 23. Each row comprises bits which, from left to right, correspond to the tasks T1 to T5. A bit set to a '1' selects its corresponding task and a reset bit indicates that its task is not selected. Accordingly, a row having all the bits reset to zeros corresponds to the NOP specification. If a task is to be selected by the external signal 171, the row specifying the task selection includes a plurality of bits with a value of '1'. The means (AP) 160 for selecting one of a plurality of programs (or a plurality of address register selection orders) is further equipped with a means for switching a range in which an address pointer to the second control memory unit 150 can be varied. The range is switched from one to another by this means in response to the external signal 161. The four programs stored in the second control memory unit 150 can thus be selected freely. That is to say, the task execution order can be switched from one to another continuously without halting the operation of the sub-processor 5.

The above description assumes that each address register is associated with a unique task. If the correspondence of an address register to a task is not taken into consideration, the specification of task execution orders described so far can be considered merely as a specification of address register selection orders.

Figure 24:
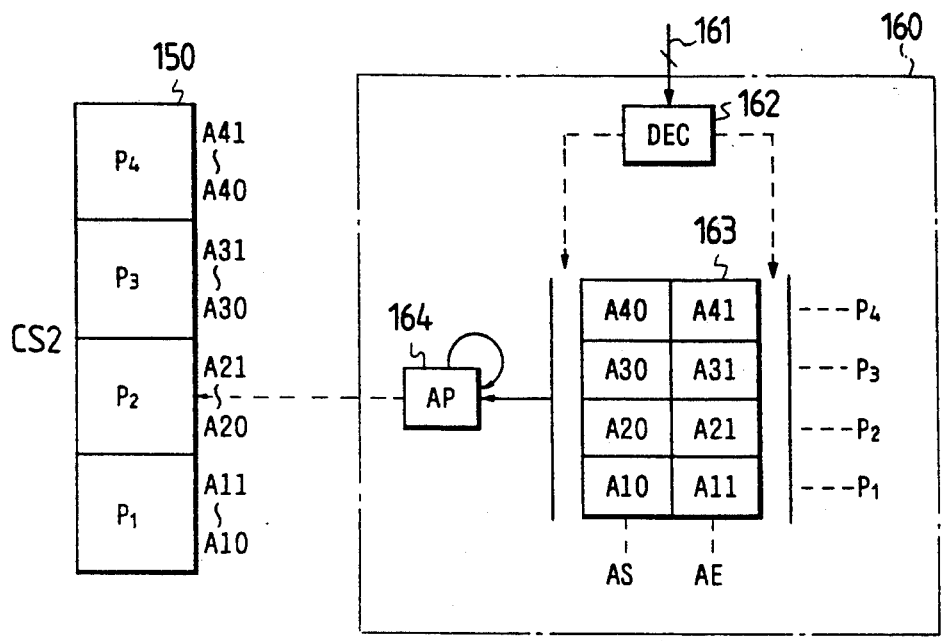
FIG. 24 is a diagram showing an embodiment implementing a means for selecting an address register selection order of FIG. 23.

FIG. 24 is a diagram of an embodiment of the means (AP) 160 for selecting one of a plurality of address register selection orders shown in FIG. 23.

Reference numeral 163 shown in FIG. 24 is a group of address registers each associated with a program stored in the second control memory unit 150. To be more specific, each one of four address registers in the group 163 corresponds to one of the four programs P1 to P4, storing the start address AS and the end address AE of the corresponding program. A decoder denoted by reference numeral 162 decodes the task execution order switching signal 161 in order to select one of the four address registers. An address pointer AP denoted by reference numeral 164 determines an address from which a next task selection is to be fetched from the second control memory unit 150. The determination of the address is based on the start address AS and the end address AE of the selected address register and the present contents of the AP 164. That is to say, if the current address contained in the AP 164 is equal to or greater than the start address AS but less than the end address EA, a next address is obtained by incrementing the current contents by one. Otherwise, the start address AS is used as a next address. By changing the value of the task execution order switching signal 161, the start address AS and the end address AE read from the address register group 163 are thus changed too. As a result, the address pointer (AP) 164 now begins with the start address AS of another program, allowing the previous program to be replaced by the other one without interrupting the operation of the sub-processor 5. By keeping the value of the task execution order switching signal 161 fixed, it is thus possible to execute only a specific program the address range of which is determined by the start address AS and the end address AE of the address register selected by the task execution order switching signal 161.

In the example described above, the means for selecting an address register selection order 160 is provided with the register group 163 for use in a method of switching the address range of the variable address pointer in response to the external signal 161. As another alternative, the means for selecting an address register selection order 160 can also be configured to comprise a programmable device such as an EPROM or RAM unit for prestoring the switching of the range of the variable address pointer as a program.

In the embodiment described so far, the second control memory unit 150 is separated from the first control memory unit 110 for storing a microprogram.

Figure 25:
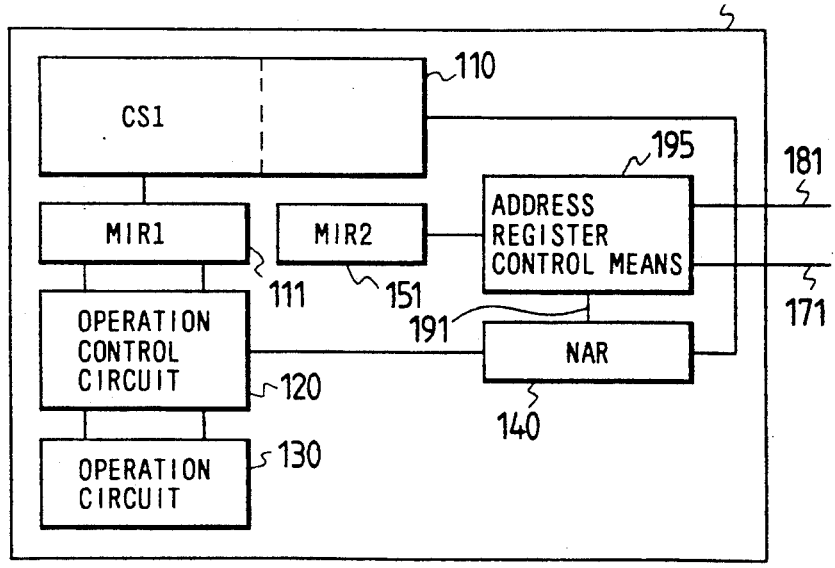
FIG. 25 is a block diagram of another embodiment implementing a sub-processor according to the invention.

FIG. 25 is a block diagram of another embodiment implementing the sub-processor 5. In this embodiment, task execution orders are also stored in a first control memory unit 110.

Reference numeral 110 shown in FIG. 25 denotes the first control memory unit for storing a microprogram and task execution orders. The first control memory unit 110 is made of rewritable non-memory elements. Reference numeral 111 is a microinstruction register MIR1 for temporarily storing a microinstruction of the microprogram stored in the first control memory unit 110. Reference numerals 120 and 130 denote an operation control circuit and an operation circuit respectively. Reference numeral 140 is a group of registers NAR for storing addresses at the control memory unit 110 from which next microinstructions are to be fetched. Reference numeral 151 is a microinstruction register MIR2 for temporarily storing an address register select command read from the first control memory unit 110. Reference numeral 171 is an external signal for selecting one of address registers specified by an address register select command. Reference numeral 181 is an external signal used for indicating that the external signal 171 to select an address register has a higher priority than an address register select command read from the first control memory unit 110. Reference numeral 195 denotes a means for selecting an address register by outputting an address register select signal 191. Based on an address register select command read from the first control memory unit 110, the external command to select an address register indicated by the external signal 171 and the priority specified by the external signal 181, the address register control means 195 determines an address register to be selected, outputting the address register select signal 191.

Figure 26:
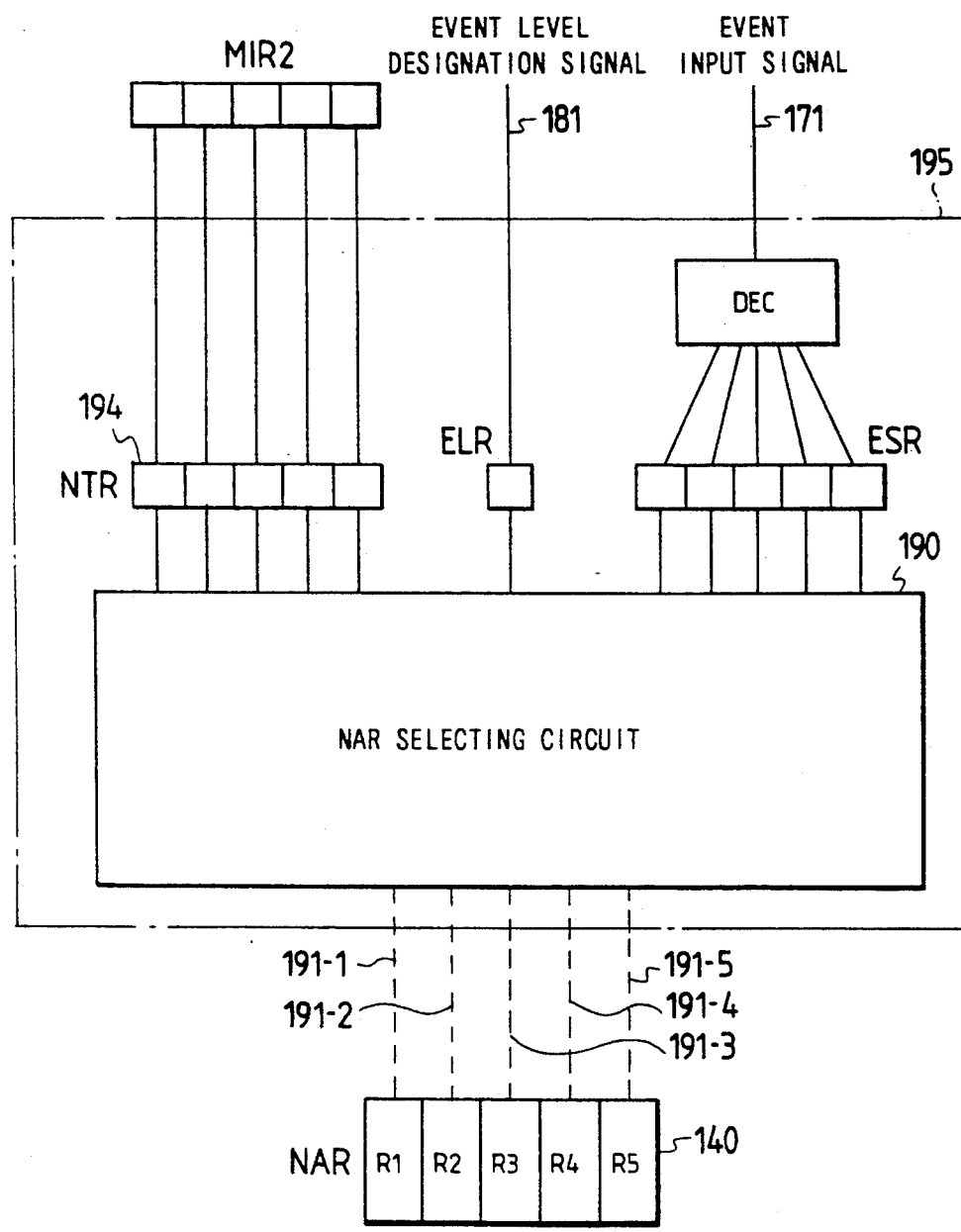
FIG. 26 is a detailed diagram of a circuit employed in an address register control means shown in FIG. 25.

FIG. 26 is the detailed circuit diagram of the address register control means 195 shown in FIG. 25. The configuration shown in FIG. 26 is entirely the same as FIG. 20 except that the former includes a next task register (NTR) 194 inserted between the MIR2 151 and a NAR selecting circuit 190. The next task register (NTR) 194 is required because with the first control memory unit 110 used as a shared storage means for storing also task execution orders (or address register select commands), the MIR2 151 is updated at the same time as the MIR1 111. If the MIR2 151 is directly connected to the NAR selecting circuit 190, one of the NAR 140 will have been selected before a next address is transferred from the MIR1 to the NAR 140. As a result, the next address is not transferred to an address register associated with the current task but, instead, to the selected address register which is associated to a next task. The NTR 194 is used for solving this problem.

Figure 27:
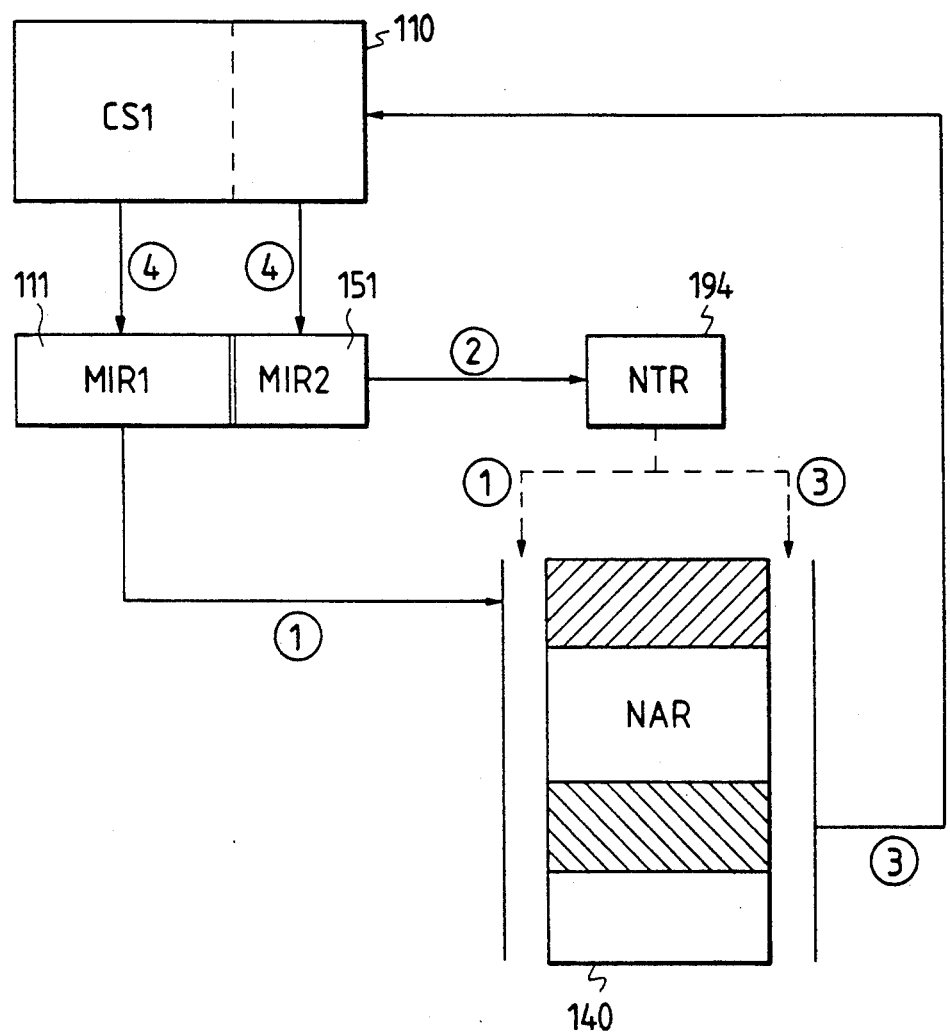
FIG. 27 is a diagram explaining operations to store and read address information using a next address register.
Figure 28:
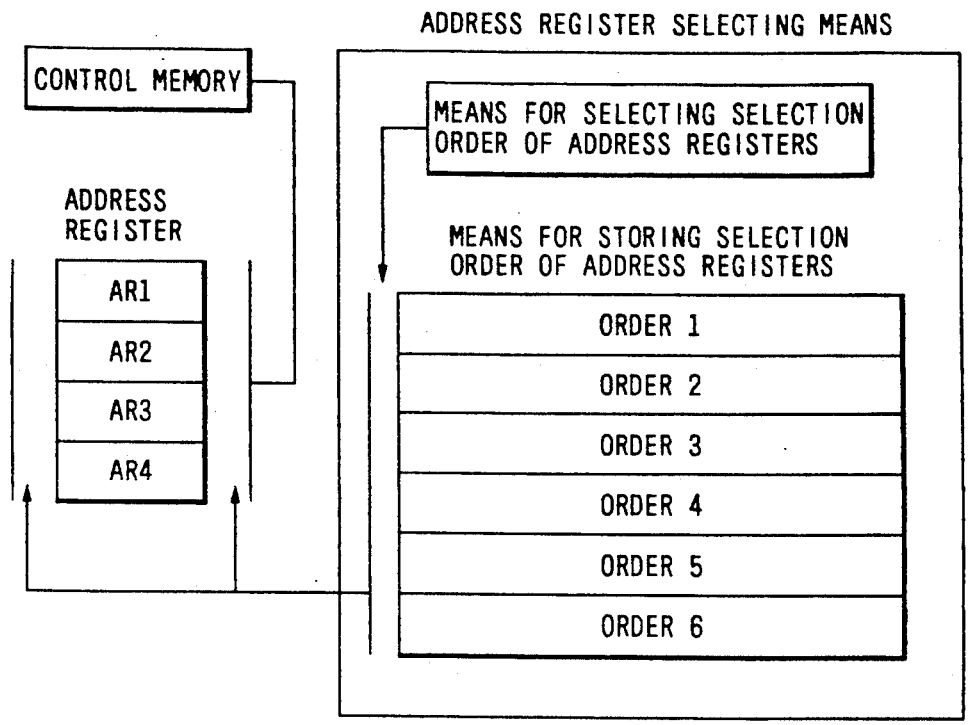
FIGS. 28 to 34 are diagrams explaining the general concepts of the invention.
Figure 29:
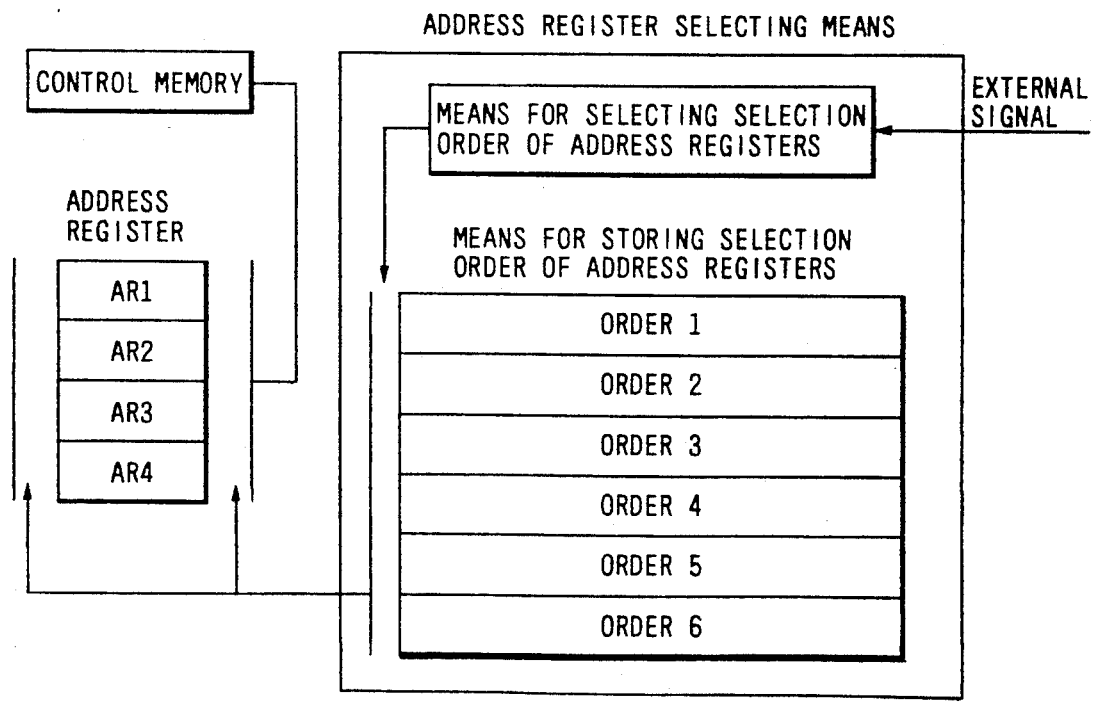
Figure 30:
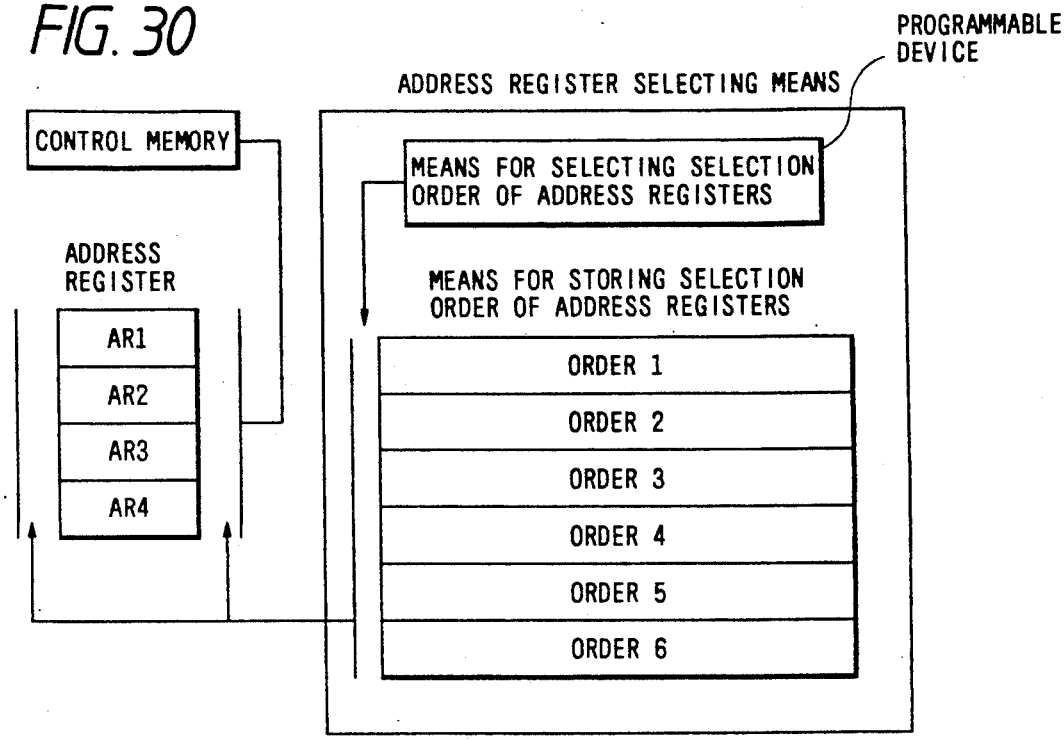
Figure 31:
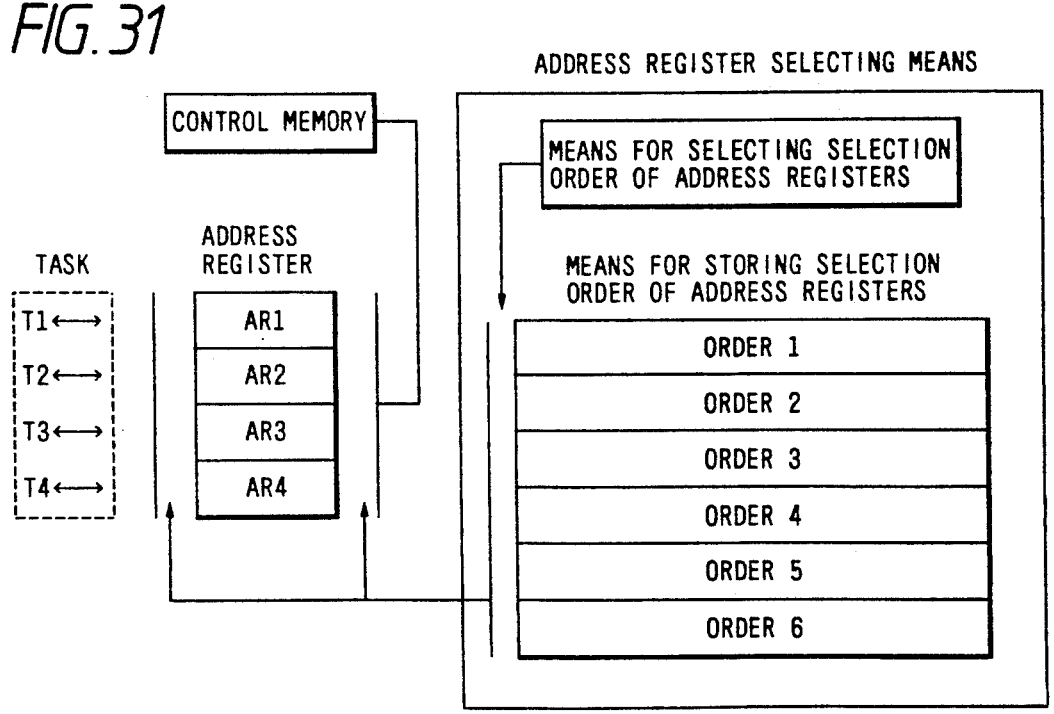
Figure 32:
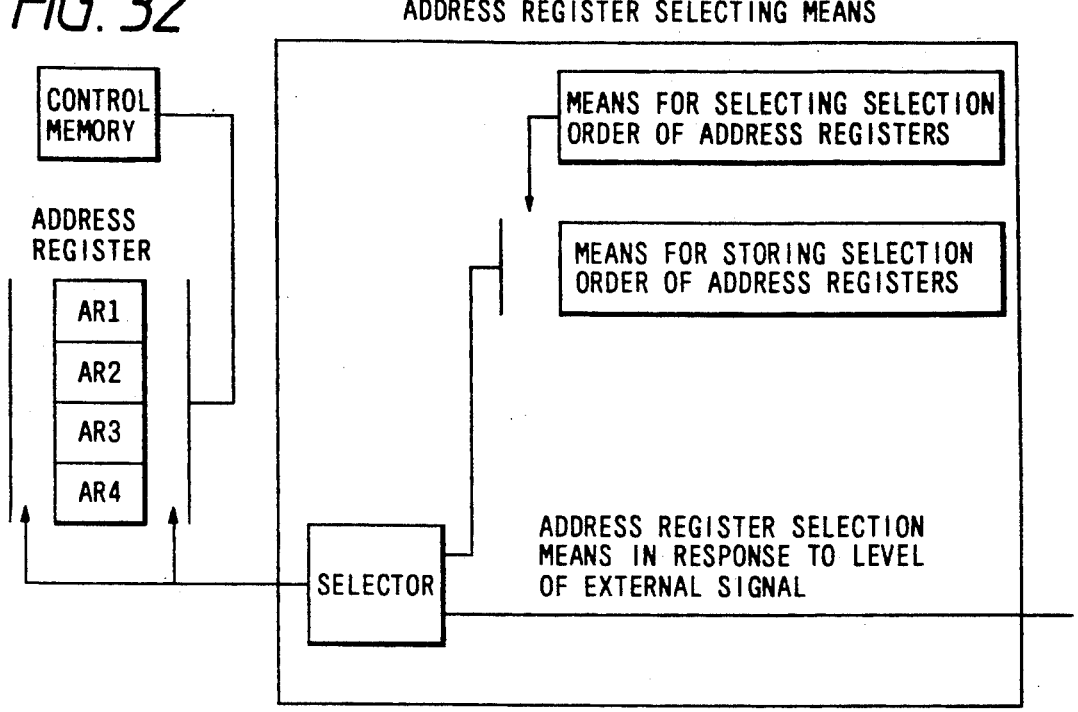
Figure 33:
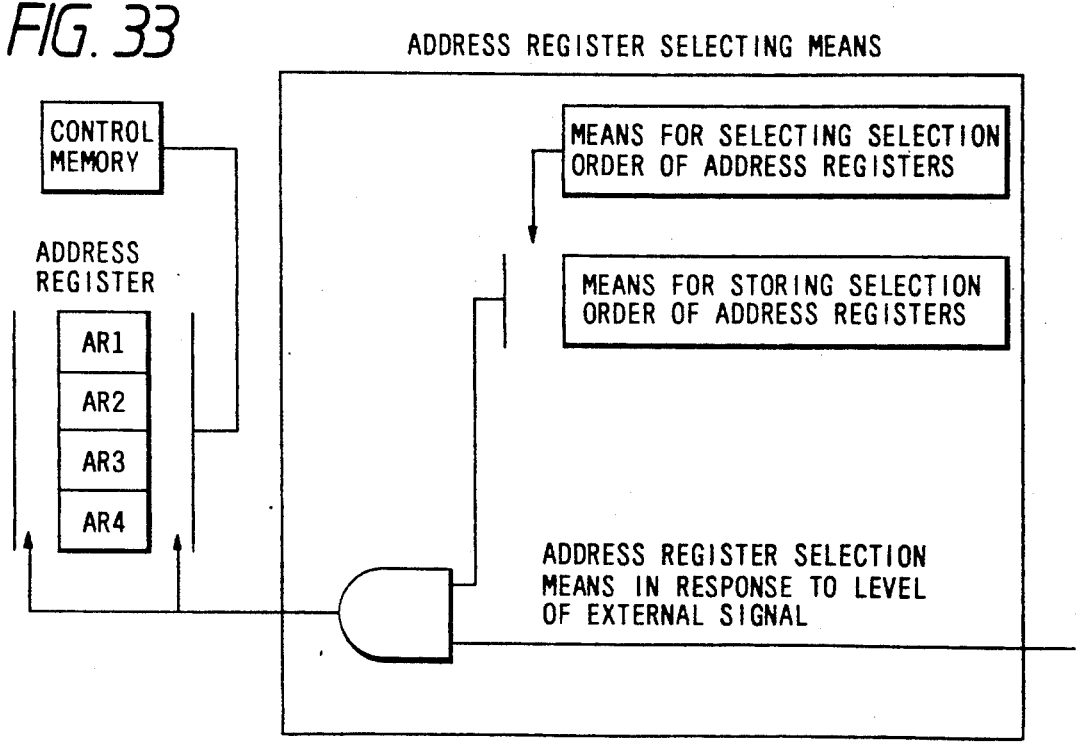
Figure 34:
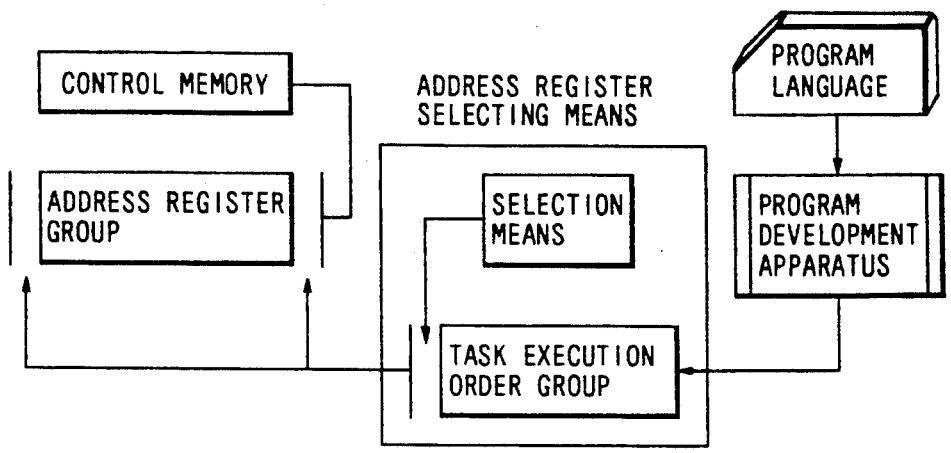

The use of the NTR 194 for selecting a right address register from the NAR 140 to which an address is transferred from the MIR1 111 and for selecting a right address register from which an address is read and provided to the control memory unit 110 is explained by referring to FIG. 27 as follows.

A next address and a next-address register select command are loaded from the control memory unit 110 to the MIR1 111 and MIR2 151 respectively in accordance with the following flow of operations.

(1) An address is transferred from the MIRI 111 to an address register in the NAR 140 selected by the present address register select command currently stored in the NTR 194.

(2) A next address register select command is transferred from the MIR2 151 to the NTR 194, replacing the present address register select command.

(3) An address is read from an address register in the NAR 140 selected by the next address register select command transferred from the MIR2 151 to the NTR 194 in operation (2) above. The address is provided to the control memory unit 110 for reading a microinstruction and an address register select command.

(4) The microinstruction and the address register select command read from the control memory unit 110 in operation (3) are used for updating the MIR1 111 and MIR2 151 respectively.

As such, the NTR 194 is introduced as a solution to the above problem.

The program language for describing task execution orders to be stored in the second control memory unit 150 described previously through the program development apparatus of the microprocessor 1 is also applicable to the common control memory unit 110. It is thus not necessary to repeat the description of the program language here.

As is described above, the invention allows a plurality of tasks to be executed in a desired order and a plurality of task execution orders to be switched from one to another with ease in order to cope with a variety of applications, requiring no changes in hardware design. As a result, the invention allows a plurality of tasks to be concurrently executed on a time-division basis with ease.

Still another embodiment of the invention is described by referring to diagrams as follows.

Figure 35:
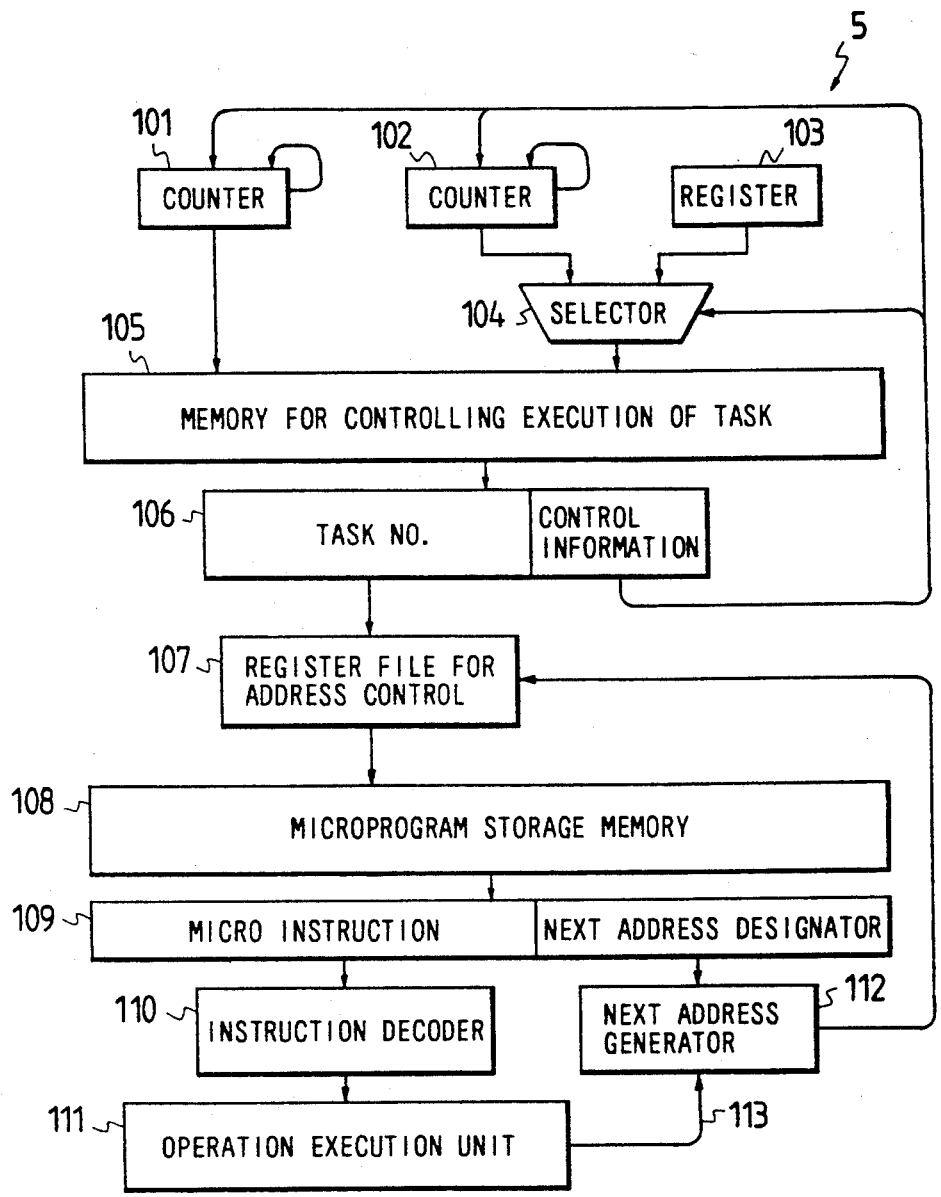
FIG. 35 is a block diagram of still another embodiment of the sub-processor shown in FIG. 1 allowing a plurality of tasks to be executed sequentially on a time-division basis, appearing to run concurrently.

FIG. 35 is the block diagram of still another embodiment of the sub-processor 5 shown in FIG. 1 which allows a plurality of tasks to be executed concurrently on a time-division basis. Reference numeral 106 is a memory unit for controlling execution of tasks. Each task is assigned a task identification number. The memory unit 105 is used for storing task identification numbers and information controlling the execution of a plurality of tasks. Reference numeral 106 is a register for temporarily storing a task identification number and a piece of information controlling the execution of tasks read from the memory unit 105. Based on the task identification number stored in the register 106, the corresponding task is selected. The control information stored in the register 106 is used to read a next task identification number and a next piece of information controlling the execution of tasks from the memory unit 105. In this ways, a plurality of tasks are selectively executed one after another. The format of data stored in the memory unit 105 is described in detail by referring to FIG. 36 later.

As shown in FIG. 35, an address for reading data from the memory unit 105 is generated as a combination of the contents of a first counter 101 with those of a second counter 102 or a register 103. In this embodiment, a selector 194 is used for selecting either the second counter 102 or the register 103. In conjunction with the contents of the first counter 101, the contents of either the second counter 102 or the register 103 are used for generating a read address which is then provided to the memory unit 105. Control information read from the memory unit 105 is, in turn, used for resetting the first counter 101, counting the second counter 102 up and controlling the selector 104. The format of the control information is described later in detail by referring to FIG. 36.

Reference numeral 107 is a register file comprising a plurality of registers each of which is associated with a task. Each register in the register file 107 is used for holding a microaddress in a microprogram storage memory unit 108 which is used for storing a microprogram describing sequences of microinstructions for the tasks. Based on the task identification number stored in the register 106, a register in the register file 107 is selected. A microaddress is then output from the selected register. The principle of operation of the register file 107 is described later in detail by referring to FIG. 37.

A microinstruction of a task in execution read from the microprogram storage memory unit 108 is once loaded to a microinstruction register 109 before being decoded by a microinstruction decoder 110 for use in controlling an operation execution unit 111. Reference numeral 112 is a next address generator for generating an address in the microprogram storage memory unit 108 from which a next microinstruction is to be fetched. The generation of such an address is based on a processing result 113 output by the operation execution unit 111 and a next address designator specified by a next address designation field of the microinstruction held in the microinstruction register 109. The generated address is fed back to a register in the register file 107 which corresponds to the task in execution. The address routed back to the register file 107 is used later when the task's turn for reexecution comes again, that is, when the task is selected again for reexecution.

By referring to FIG. 36, the format of data stored in the task execution control memory unit 105 and the operation thereof are described as follows.

Figure 36:
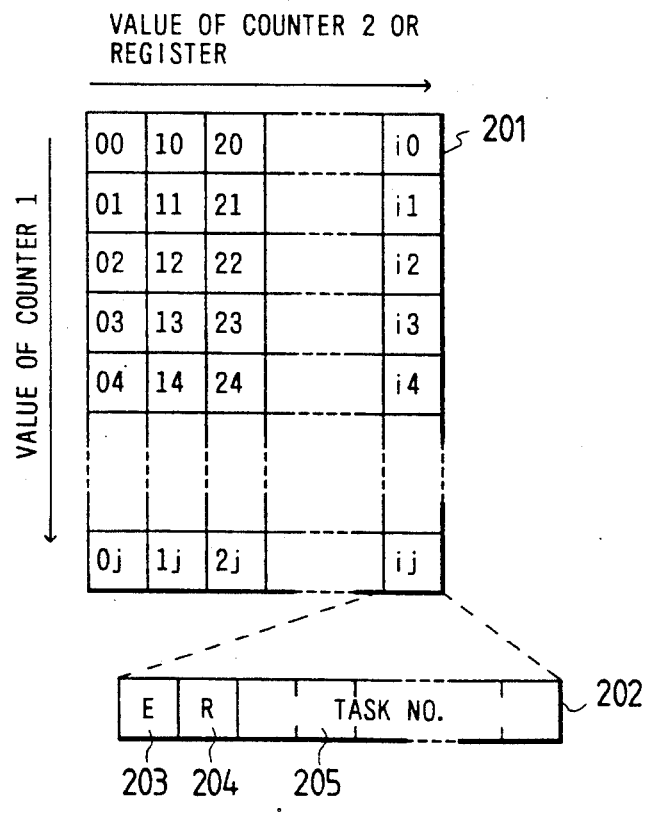
FIG. 36 is a diagram showing a task control matrix and the data specification of each of its elements.

Reference numeral 201 shown in FIG. 36 denotes a task control matrix with the contents of the first counter 101 used as its row address and the contents of the second counter 102 or the register 103 used as its column address. The element of the task control matrix 201 represents a unit in which data is read from the task execution control memory unit 105. A data unit comprises a task identification number and a piece of control information. Reference number 202 is the format of the data unit stored in each matrix element. A task identification number is stored in a task number field 205 comprising n bits and the control information is stored in a one-bit R control field 204 and a one-bit E control field 203. Up to m tasks can be represented by the task number field 205.

When read date has the R control bit 204 set to a '1', the first counter 101 is reset to a zero while the second counter 102 is incremented by one. With the R control bit reset to a '0', however, the first counter 101 is incremented by one and the second counter 102 is kept at its present value.

When read data has the E control bit 203 set to a '1', the contents of the register 103 are selected as a column address of the task control matrix 201. With the R control bit reset to a '0', however, the contents of the second counter 102 are used as a column address of the task control matrix 201.

When the sub-processor 5 is reset, both the first counter 101 and the second counter 102 are initialized by resetting both of them to zeros.

Therefore, with, both the R control bit 204 and the E control bit 203 cleared to zeros at initialization, data is read from the task control matrix 201, starting with the element on the first column and the first row. Then, only the row number is incremented while the column number is kept at its present value which is zero. As a result, data is read sequentially from the following matrix elements: 00, 01, 02 and so on, representing a sequence of tasks selected for execution. If the data read from each matrix element has the R control bit 204 and E control bit 203 reset to zeros, the read operation is continued downward along the first column. As the data of the matrix element 0, j on the last row is read, the operation is repeated by returning to the matrix element 0, 0 on the first row.

If data read from a matrix element on any row of the first column has its R control bit 204 set to a '1', the read operation is continued to the matrix element on the top row of the next column on the right, i.e. the matrix element 10 on the first row of the second column, because the first counter 101 is reset to a zero while the second counter 102 is incremented by one. Data is then read downward along the second column from the following matrix elements: 10, 11, 12 and so on.

In addition, if data read from any row on the second column has its E control bit 203 set to a '1', the contents of the register 103 are selected as a column address of data to be read next. By preloading a desired value to the register 103, it is therefore possible to read a next data from a matrix element on the next row of a desired column designated by the register 103. It should be noted, however, that the E control bit 203 has an effect only on the column address of the next data only. That is to say, if the E control bit 203 of the next data is not a '1', the subsequent column address is again determined by the contents of the second counter 102. Accordingly, a sequence of tasks selected for execution can be temporarily interrupted by another sequence of selected tasks without initializing the interrupted one.

In this embodiment, the first counter 101 is used as a row address common to the second counter 102 and the register 103. Accordingly, it is possible to impose certain conditions on the selection of tasks for execution even if the row address is changed at any arbitrary time as is described above.

For example, let us consider a case in which a task shall not be selected for execution twice in a row in two consecutive read operations due to a restriction imposed by pipeline execution of tasks. In order not to violate the restriction, the same task identification number shall not be stored in two matrix elements of two adjacent rows or any two rows between the first row and a row containing a matrix element with the R control bit set to a '1'. By setting the task control matrix 201 in accordance with this arrangement, a task will not be selected for execution twice in a row in two consecutive read operations even if the column address is changed at any arbitrary time.

Let us consider another case in which a first task and a second task among a plurality of tasks shall be executed alternately. That is to say, the first task shall not be reexecuted before executing the second task and the second task shall not be reexecuted before executing the first task. In this case, the task control matrix 201 must be arranged as follows. When storing the identification numbers of the first and second task on a column, these numbers must be arranged so that scanning the column repeatedly finds the task identification numbers to be stored alternately, even though the task identification number of either the first or second task may not be located on every other row. That is to say, in the course of scanning, the task identification number of the first task must not be found again before the task identification number of the second task is found and the task identification number of the second task must not be found again before the task identification number of the first task is found. As is described above, however, a column may be switched to another by the R or E control bit or both set to a '1', causing the scanning to be switched from the column to the other. Also in this case, the switched scanning must find the task identification numbers to be also stored alternately. In this arrangement, the task identification numbers of the first and second tasks never coexist on the same row. By arranging the task identification numbers of the first and second tasks in this way, the two tasks are always selected for execution alternately even if the column address is changed at any arbitrary time.

Figure 37:
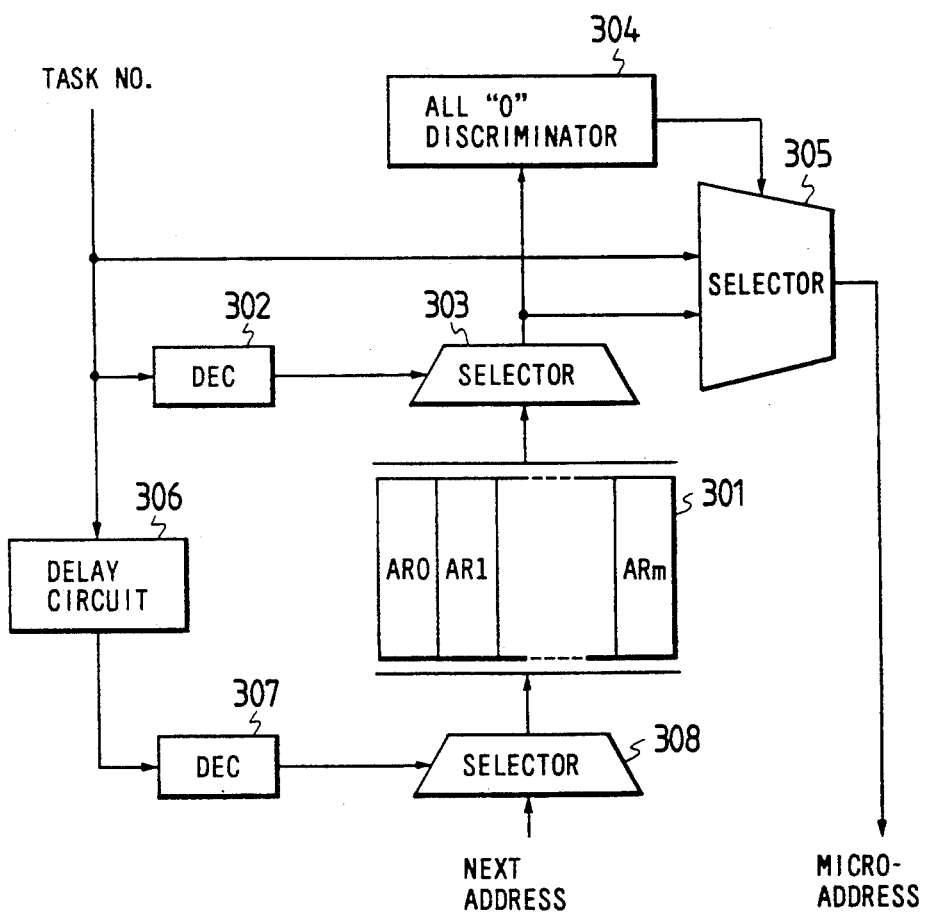
FIG. 37 is a detailed block diagram of a register file for address management.

FIG. 37 is a block diagram for explaining the detailed principle of operation of the address management register file 107 shown in FIG. 35.

Reference numeral 301 is a plurality of address registers each of them is used for storing a microaddress of a particular task. Each address register comprises as many bits as required for accessing the microprogram storage memory unit 108 shown in FIG. 35. The number of tasks to be controlled cannot exceed the number of address registers in the register file 107.

A task identification number stored in the task read register 106 shown in FIG. 35 is decoded by a decoder 302 which outputs the decoded result to a selector 303. The decoded result is used by the selector 303 to select one of the address registers in the address management register file 107. A microaddress in the microprogram storage memory unit 108 of a task corresponding to the task identification number is then read from the selected register. Some time later, a next microaddress of the same task is to be written to the same selected address register. In the meantime, the task identification number is held and delayed by a delay circuit 306 until the next microaddress becomes available for the selected address register. By the time the next microaddress becomes available, the delayed task identification number has been decoded by a decoder 307 and the decoded result is used by a selector 308 to identify the same selected address register to which the next microaddress is written.

As shown in FIG. 37, the selector 303 reads the contents of a selected address register, forwarding the read data which is presumably a microaddress to a selector 305 and an all-zero discrimination circuit 304 for controlling the selector 305. If a zero is provided to the discrimination circuit 304, the selector 305 outputs a task identification number as a microaddress. However data other than a zero input to the discrimination circuit 304 causes the selector 305 to forward the non-zero data received from the selector 303 as its output. As is described above, the non-zero value is a microaddress read from an address register 301 selected by the task identification number.

It should be noted that when the microprocessor 1 is reset, all the address registers 301 are initialized to zeros. Accordingly, at power-on the selector 305 transmits a task identification number, as it is, to be used as a microaddress.

For that reason, the start microaddress of a task is used as its identification number so that upon reset a task is executed, beginning with a microinstruction stored at its start microaddress. It is also apparent that specifying a zero as a next microaddress in the course of the execution of a task will also cause the task to return to its start microaddress. This also means that it is possible to make a task return to its start microaddress at any arbitrary time during its execution.

Figure 38:
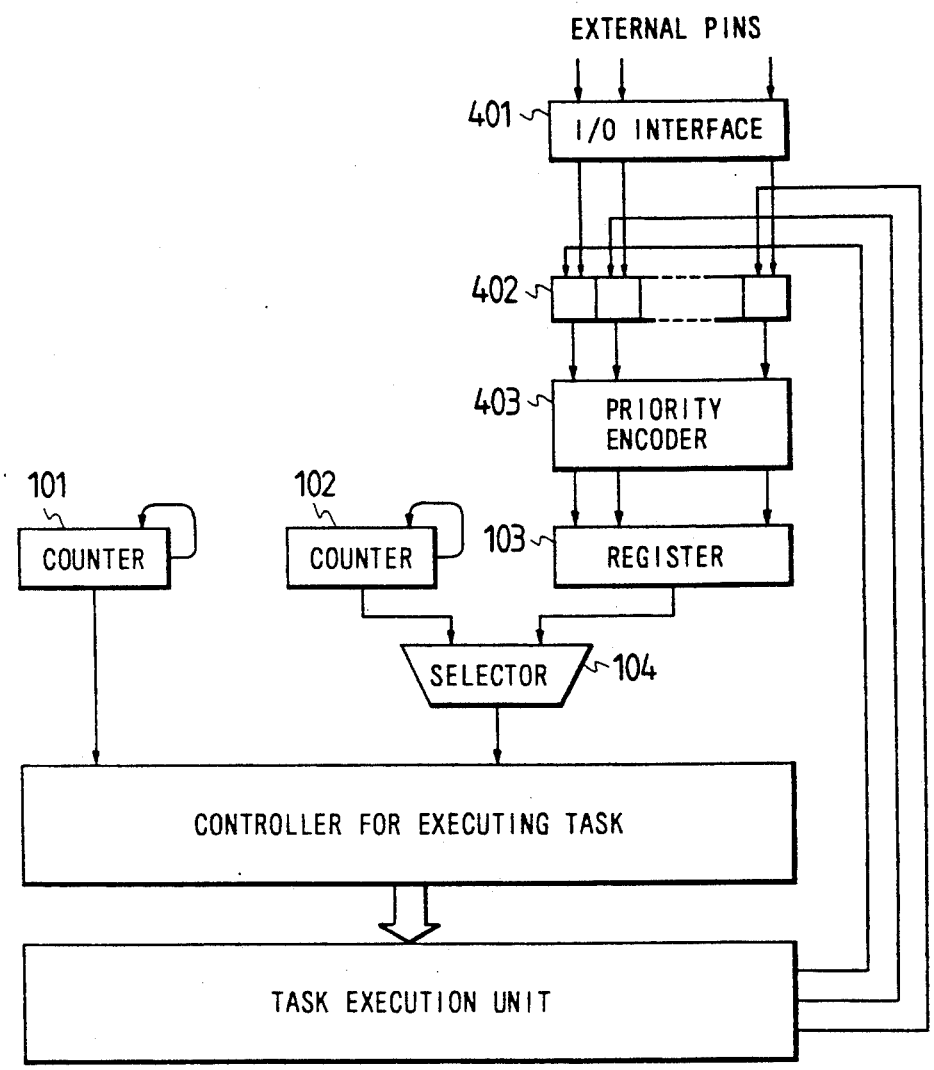
FIG. 38 is a diagram showing a means for modifying the task execution sequence by using external pins.

By referring to FIG. 38, a method of setting the register 103 shown in FIG. 35 is next described.

Reference numeral 401 shown in FIG. 38 is an input/output interface unit for interfacing with external signals coming from hardware outside the chip. The interface unit 401 controls timings of the external signals and input specifications of external events such as edge detection. The external signals received through the input/output interface unit 401 are written to a bit data storage register 402 which is capable of controlling data in bit units. The signals are then stored into the register 103 through a priority encoder 403.

The priority encoder 403 is a circuit for assigning a priority level to each bit in the bit data storage register so that a column address only for the bit having the highest priority is generated, preventing more than one bit from being selected for column address generation.

In addition, bits can also be set in the bit data storage register 402 by the microprocessor 1 itself through the task execution unit as shown in FIG. 38. In this way, the contents of the register 103 can be changed dynamically in accordance with events occurring both internally and externally to the chip. The capability of responding to events is called an event driven function. The event driven function allows the controller for executing task to dynamically select a task execution sequence in response to an internal or external event. This function even allows an internal event to clear conditions set by external events, setting new values.

As such, by including memory for storing task execution orders in a sub-processor for executing a plurality of tasks according to the invention, a microcomputer embedding the sub-processor can select a task execution order and change the selection dynamically without modifying the contents of the memory.

A still further embodiment implementing the sub-processor 5 according to the invention is described by referring to diagrams as follows.

Figure 39:
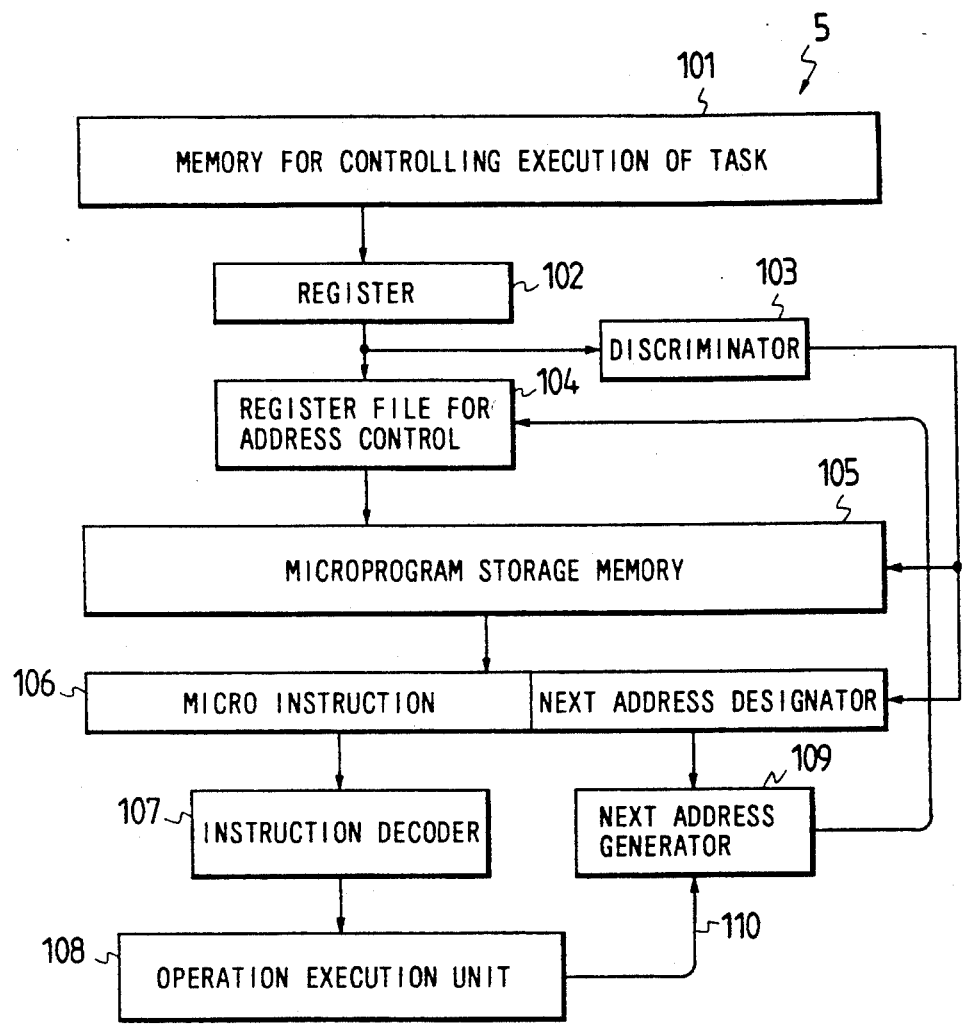
FIG. 39 is a block diagram of a microcomputer allowing a plurality of tasks to be executed sequentially on a time-division basis, appearing to run concurrently.

FIG. 39 is the block diagram of the other embodiment implementing the sub-processor 5 that allows a plurality of tasks to be sequentially executed on a time-division basis so as to appear to run concurrently.

Task execution orders are stored in a memory unit 101 for controlling execution of tasks shown in FIG. 3. Each task is assigned a task identification number. Tasks are selectively executed one after another. A task is selected for execution whenever its identification number is loaded to a register 102.

A register file 104 for address management comprises a plurality of registers which are each associated with a task. Each register is used for holding a microaddress of the associated task's microprogram stored in a microprogram storage memory unit 105. One of the registers in the register file 104 is selected in accordance with the task identification number stored in the register 102. The microaddress held by the selected register is then output to the microprogram storage memory unit 105 in order to fetch a microinstruction of the task associated with the selected register. The principle of operation of the register file 104 is described in detail later by referring to FIG. 40.

The microinstruction of the task in execution read from the microprogram storage memory unit 105 is loaded to a microinstruction register 106. The microinstruction is then decoded by an instruction decoder 107 before being eventually executed by an operation execution unit 108.

Reference numeral 109 is a next-address generator for generating an address from which a microinstruction is to be read next. The generation of the address is based on a processing result 110 produced by the operation execution unit 108 and a value specified in a next-address designation field of the microinstruction stored in the register 106.

The address generated by the next-address generator 109 is fed back to the address management register file 104, being written to the register therein which corresponds to the task in execution. This address is later provided to the microprogram storage memory 105 when the task's turn for execution comes again, that is, when the task is reselected for execution.

The task identification number stored in the task execution control memory unit 101 comprises n bits for identifying m different tasks. Task identification numbers are stored in the task execution control memory unit 101 orderly in accordance with a task execution sequence. The n-bit task identification numbers include at least a task null code, a piece of special information for identifying a null task. The task null code is recognized by a discriminator 103. In the event of a task null code, the operation to read the microprogram storage memory unit 105 is temporarily halted, entering a wait state which consumes little current. At the same time, the output of the microinstruction register 106 is nullified for a predetermined period of time. During the nullified period, the nullified output of the microinstruction register 106 does not allow any changes in internal status such as changes in register contents to occur. That is to say, execution of microinstructions after the end of the nullified period gives effectively the same results as if the nullified period had not existed.

The principle of operation of the address management register file 104 shown in FIG. 39 is described in detail by referring to FIG. 40 as follows.

Reference numeral 201 is a plurality of address registers each of them is used for storing a microaddress of a particular task. Each address register comprises as many bits as required for accessing the microprogram storage memory unit 105 shown in FIG. 39. The number of tasks to be controlled cannot exceed the number of address registers in the register file 104.

A task identification number stored in the task read register 102 shown in FIG. 39 is decoded by a decoder 202 which outputs the decoded result to a selector 203. The decoded result is used by the selector 203 to select one of the address registers in the address management register file 104. A microaddress in the microprogram storage memory unit 105 of a task corresponding to the task identification number is then read from the selected register. Some time later, a next microaddress of the same task is to be written to the same selected address register. In the meantime, the task identification number is held and delayed by a delay circuit 206 until the next microaddress becomes available for the selected address register. By the time the next microaddress becomes available, the delayed task identification number has been decoded by a decoder 207 and the decoded result is used by a selector 208 to identify the same selected address register to which the next microaddress is written.

Figure 40:
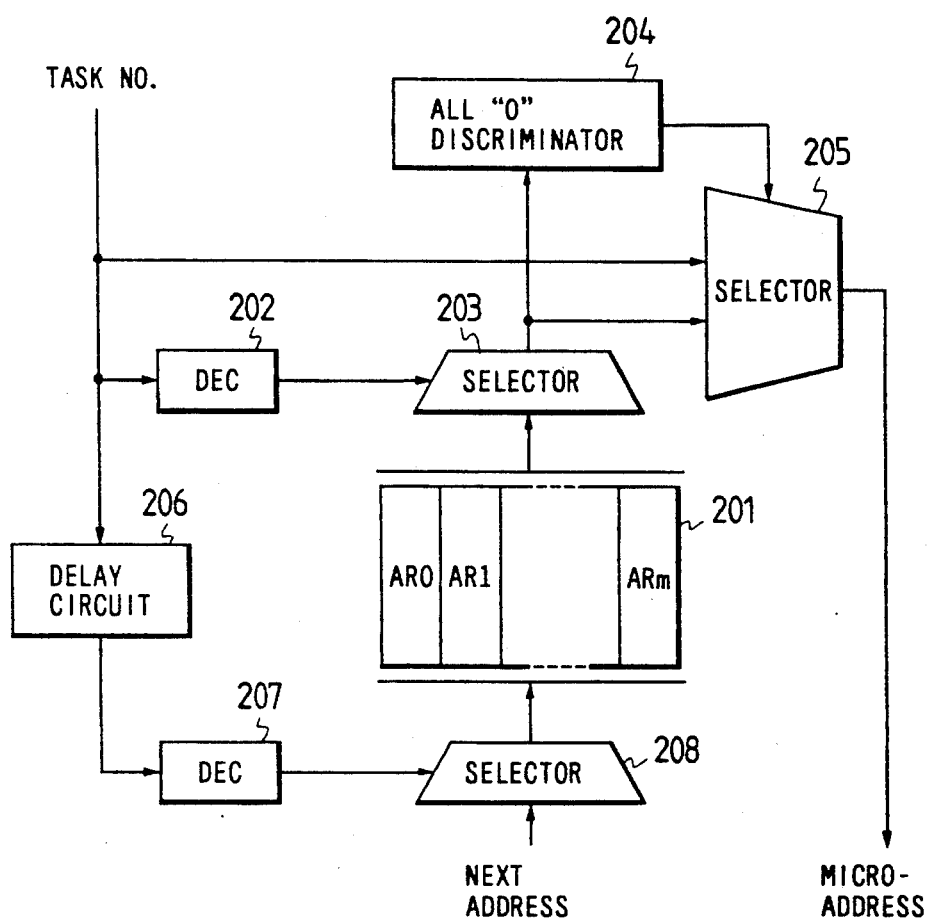
FIG. 40 is a block diagram showing details of a register file for address management.

As shown in FIG. 40, the selector 203 reads the contents of a selected address register, forwarding the read data which is presumably a microaddress to a selector 205 and an all-zero discriminator 204 for controlling the selector 205. If an all-zero value is provided to the discriminator 204, the selector 205 outputs a task identification number as a microaddress. However, data other than zero input to the all-zero discriminator 204 causes the selector 205 to forward the non-zero data received from the selector 203 as its output. As is described above, the non-zero value is a microaddress read from an address register 201 selected by the task identification number.

It should be noted that when the microprocessor 1 is reset, all the address registers 201 are initialized to zeros. Accordingly, at power-on the selector 205 transmits a task identification number, as it is, to be used as a microaddress. For that reason, the start microaddress of a task is used as its identification number so that upon reset a task is executed, beginning with a microinstruction stored at its start microaddress.

The following description explains how the address management register file 104 operates in case the register 102 shown in FIG. 39 contains the null task data described earlier.

To begin with, the task null code is assigned a unique non-zero value which is different from any other task identification numbers. Accordingly, the write selector 208 does not select any register in the address management register file 106, causing their contents to remain unchanged during a required period of time.

In order to prevent the output of the read selector 203 from entering a high impedance state, the decoder 202 selects one of the registers in the file 201, causing the read selector 203 to output a microaddress. At that time, however, since the read operation on the microprogram storage memory unit 105 shown in FIG. 39 is being halted, the read selector 203 can output any microaddress without affecting the operation.

Figure 41:
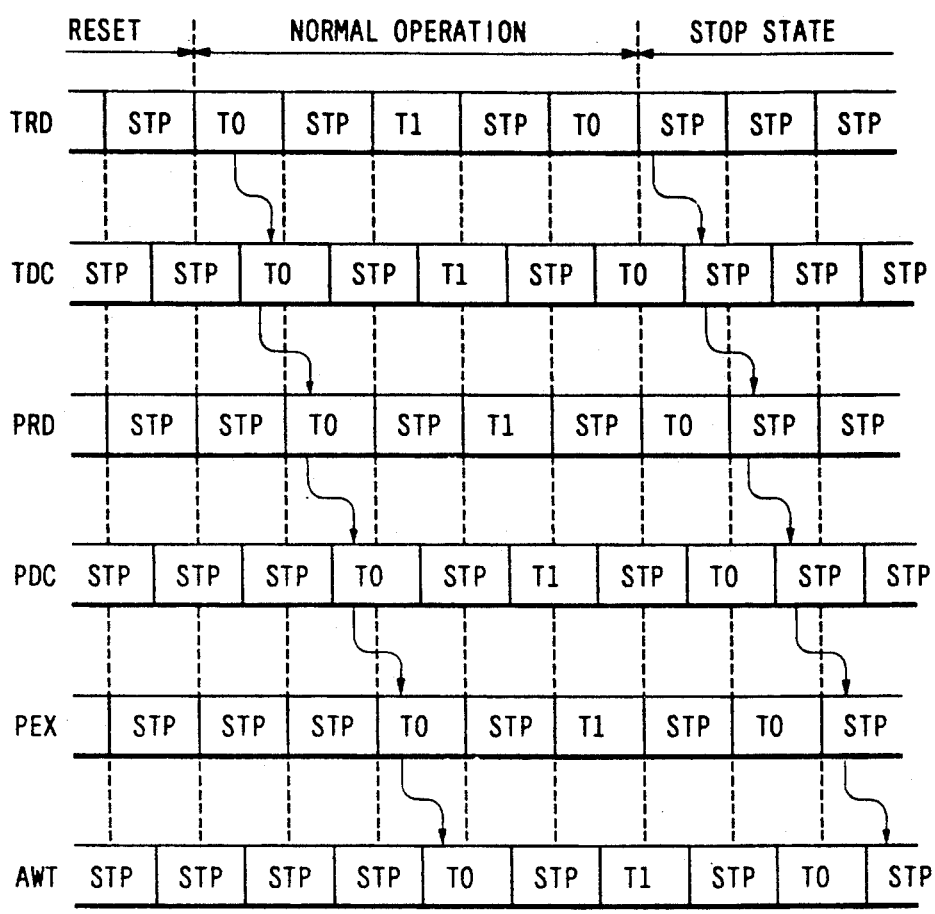
FIG. 41 is a timing diagram of pipeline control.

Next, an example of a task execution sequence and pipeline control is explained by referring to FIG. 41. The execution pipeline comprises the following six stages: execution task read (TRD), execution task decode (TDC), program read (PRD), program decode (PDC), program execute (PEX) and next address write (AWT).

The above abbreviations enclosed in parentheses are used in the description that follows as the names of the stages. While referring to the configurations of the sub-processor 5 shown in FIGS. 39 and 40, the operation of each execution pipeline stage and relations among the stages are explained.

At the TRD stage, a task identification number is read from the task execution control memory unit 101 shown in FIG. 39 and written to the task identification number read register 102.

At the TDC stage, the task identification number is decoded by the decoder 202 shown in FIG. 40. A decoded result is output to the read selector 203 for selecting one of the registers in the file 201 and reading data from the selected register. The read data is subsequently output as a microaddress of the corresponding task through the all-zero discriminator 204 and the selector 205. It should be noted that the contents of the register 102 are also output to the discriminator 103 as shown in FIG. 39 in order to determine whether they are indeed a task identification number or just the task null code.

If the contents of the register 102 are determined to be a task identification code, at the PRD stage, a microinstruction at the microaddress output at the TDC stage is read from the microprogram storage memory unit 105 shown in FIG. 39 and stored into the microinstruction read register 106. In the case of the task null code, however, no read operation is carried out and the output of the microinstruction read register 106 is nullified as is described before.

At the PDC stage, the microinstruction stored in the microinstruction read register 106 is decoded by the instruction decoder 107.

At the PEX stage, the microinstruction is executed by the operation execution unit 108 in accordance with the decoded result obtained at the PDC stage.

At the AWT stage, the next-address generator 106 generates an address from which a microinstruction is to be read next. The generation of the address is based on a processing result 110 produced by the operation execution unit 108 and a value specified in a next-address designation field of the microinstruction stored in the register 106. The address generated by the next-address generator 109 is fed back to the address management register file 104 through the write selector 208 shown in FIG. 40, being written to the register therein which corresponds to the task in execution. This address is later provided to the microprogram storage memory 105 when the task's turn for execution comes again, that is, when the task is reselected for execution.

While the operations at the three stages PRD, PDC and PEX are being performed, the task identification number read at the TRD stage is held and delayed by the delay circuit 206.

As described previously, when the microprocessor 1 is reset, all the registers in the file 201 are cleared. However, instead of clearing the registers, the task identification number read register 102 shown in FIG. 39 can be forcibly loaded with the task null code in order to set all the pipeline stages after TRD into a halt state. In this way, the pipeline control can prevent a malfunction from occurring after the microprocessor exits the reset state, resuming its operation correctly.

Even during a normal operation, the task identification number read register 102 shown in FIG. 39 can be forced to output the task null data as well in order to temporarily halt the execution of tasks at any time for an arbitrary period. In this way, the pipeline execution can be put in a functionally halted state continuously without destroying information remaining at TDC and the subsequent stages. That is to say, the sub-processor 5 can be put in a temporary halt state while retaining its internal status. As the sub-processor 5 exits the temporary halt state, the pipeline execution also undergoes a transition from the temporarily halted state to a normally operational state in an orderly manner, resuming the operations based on the task information left in each pipeline stage at the time the sub-processor 5 entered the temporary halted state. The operation is thus restarted like the resumption following a reset state.

Figure 42A:
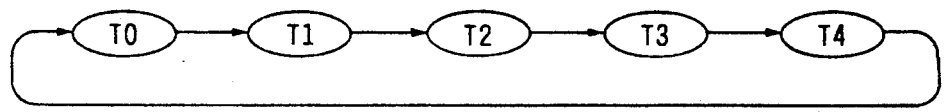
FIGS. 42A–42B are diagrams showing task execution example.
Figure 42B:
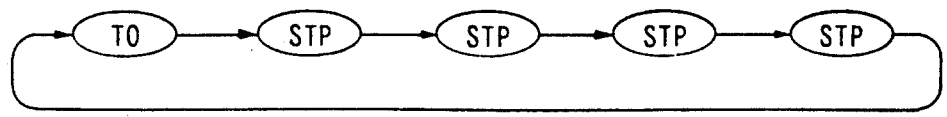

FIGS. 42A–42B show examples of task execution sequences.

FIG. 42A is an example in which tasks T0, T1, T2, T3 and T4 are executed one after another in the shown order, repeating the execution sequence. As shown in FIG. 42A, each time slot in the sequence is utilized to execute one of the tasks, accessing the microprogram storage memory unit 105 shown in FIG. 39 and fetching a microinstruction therefrom without regard to the contents of the task's microprogram.

Among the time slots shown in FIG. 42B, it is only on time slot T0 that a task, T0 in this example, is executed. During the other time slots, the sub-processor 5 is in a functionally halted state denoted by STP in the figure. Accordingly, the number of accesses to the microprogram storage memory unit 105 shown in FIG. 39 is reduced to one fifth of the task execution sequence shown in FIG. 42A. As a result, the amount of current required for reading the microprogram storage memory unit 105 is also decreased to one fifth.

Figure 43:
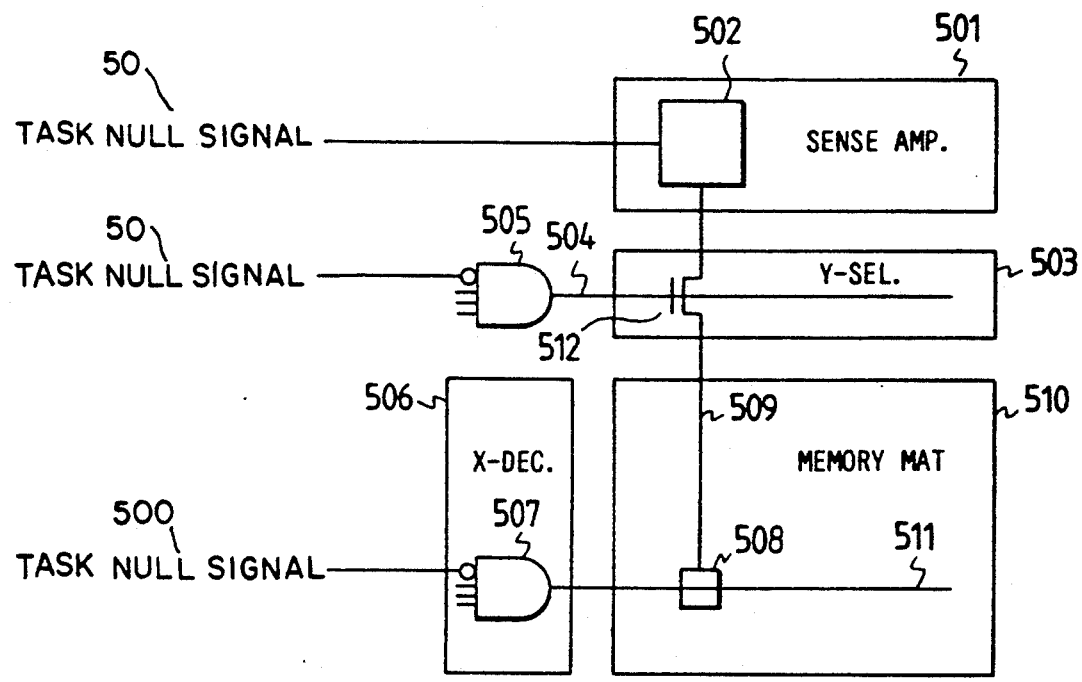
FIG. 43 is a diagram showing a means for reducing the current required in an operation to read a memory unit for storing microprograms.

Next, a means for reducing current required for accessing the microprogram storage memory unit 105 in a functionally halted state is described with FIG. 43 used as a reference. There are several embodiments for actually implementing the current reducing means as is apparent from the following description. FIG. 43 shows these embodiments collectively. It should be noted, however, that since one of these embodiments is at least good enough for reducing the current, it is not necessary to implement all of them.

In a first embodiment, a task null signal 500 which indicates a detected task null code is used for excluding memory cell 508 of a memory mat 510 from selection. To be more specific, the task null signal 500 is used by an AND gate 507 of an X address decoder 506 to deselect a word line 511. Accordingly, the current that would otherwise flow through the memory cell 508 during a read operation can be eliminated.

In a second embodiment, the task null signal 500 is applied to an AND gate 505 of a Y address decoder for turning a Y switch 512 off. By doing so, a data line 509 connected to a memory cell selected by the word line 511 is electrically cut off from a sense amplifier 501. Accordingly, the current that would otherwise flow through the memory cells 508 during a read operation can be eliminated.

In a third embodiment, the task null signal 500 is applied to the sense amplifier 502 so as to put the amplifier 502 in a nonactive state. By doing so, the current that would otherwise be consumed by the sense amplifier 502 in a read operation can be eliminated.

Further, in an embodiment other than those described above which is not shown in FIG. 43, a special word line associated with memory cells through which only little current flows is selected by the task null signal 500. A circuit similar to that of the first embodiment can be employed in order to implement this technique.

By employing at least one of the above embodiments, presumably the most suitable for the configuration of the memory unit in use, the current required for reading the microprogram storage memory unit 105 can thus be reduced.

According to the invention, in a microcomputer allowing a plurality of tasks to be executed one after another on a time-division basis, appearing to run concurrently, a functionally halted period during which no task is executed can be set at any time for an arbitrary period. Accordingly, the following effects are resulted in.

Current consumed by the microcomputer during a functionally halted period is reduced proportionally to a ratio of Texc to Tstp (Texc/Tstp), where Texc is a period in which a task is executed whereas Tstp is the functionally halted period.

By inserting functionally halted periods into a task execution sequence, the task execution sequence can be changed and the execution speeds of tasks can be set arbitrarily in order to meet performance required by the user.

In addition, in an execution pipeline scheme, pipeline initialization and a temporary halt function can be implemented by operations on an early pipeline stage only. To be more specific, by merely forcing a task execution sequence output circuit to output task null data, the pipeline initialization and temporarily halt function can be implemented. Therefore, no circuit is required for providing information for the pipeline initialization and temporary halt function to subsequent pipeline stages at timings delayed appropriately for each stage.

What is claimed is:

1. A method of setting peripheral functions of a microprocessor using a computer system, the method comprising the steps of:
    displaying a menu of functions for information provided in advance for defining peripheral functions implementable by a peripheral function implementing means in the microprocessor on a display screen of the computer system;
    retrieving the information for defining a peripheral function corresponding to a function selected from the menu of functions from storage media of the computer system; and
    transmitting the retrieved information from the computer system to a writing apparatus for programming electrically writable non-volatile memory elements of said peripheral function implementing means.

2. The method according to claim 1, further comprising the step of writing the transmitted information into the electrically writable non-volatile memory elements of said peripheral function implementing means by the writing apparatus.

3. The method according to claim 2, further comprising the steps of:
    erasing the information written into the electrically writable non-volatile memory elements of said peripheral function implementing means if it is necessary to change the peripheral function which has been once set in said peripheral function implementing means; and,
    writing modified information, which is obtained by repeating the displaying step, the retrieving step, the transmitting step and the writing step, into the electrically writable non-volatile memory elements of said peripheral function implementing means.

4. The method according to claim 1, further comprising the step of selecting a desired function from the menu of functions by a keyboard of the computer system.

5. The method according to claim 1, further comprising a step of selecting a desired function from the menu of functions by a mouse of the computer system.

6. The method according to claim 1, wherein the storage media includes a floppy disk.

7. A microcomputer comprising:
    a memory unit for storing, in address locations of the memory unit, a task execution order in which a plurality of tasks are to be executed;
    a register;
    a plurality of counters; and
    an address generating means in operable connection with said register and said plurality of counters for generating addresses by combining contents of said register and said plurality of counters,
    wherein the plurality of tasks are executed one after another in accordance with the task execution order read from the address locations of said memory unit according to the addresses generated by said address generating means.

8. A microcomputer according to claim 7, wherein said memory unit is used for storing identification numbers for identifying the plurality of tasks and a control coded for controlling said register and said plurality of counters and said memory unit generates addresses in accordance with said stored control code.

9. A microcomputer according to claim 8, wherein said control code comprises first control information for specifying initialization and counting-up of said plurality of counters and second control information for specifying how said register is to be combined with said plurality of counters in generating the memory addresses.

10. A microcomputer according to claim 7, wherein the microcomputer is formed on a single semiconductor chip and further comprises a plurality of means for setting a value in said register, with one of said plurality of means allowing a value to be set in said register from a source external of the semiconductor chip of said microcomputer.

11. A microcomputer according to claim 7, wherein a means for executing a plurality of tasks comprises a memory unit for storing execution programs of the plurality of tasks and a plurality of address registers for holding read addresses of said memory unit and generates addresses for reading said memory unit based on the read addresses held in said plurality of address registers.

12. A microcomputer according to claim 11, wherein predetermined values can be set in said plurality of address registers without regard to a current sequence of tasks execution according to the selected address registers.

13. A microcomputer according to claim 7, wherein the execution memory unit is read based on task identification numbers corresponding to said plurality of address registers.

* * * * *

UNITED STATES PATENT AND TRADEMARK OFFICE
CERTIFICATE OF CORRECTION

PATENT NO. : 5,307,464
DATED : April 26, 1994
INVENTOR(S) : Yasushi Akao, et al.

It is certified that error appears in the above-indentified patent and that said Letters Patent is hereby corrected as shown below:

Claim 2, column 49, line 67, delete the first occurrence of "the" and substitute therefor --a--.

Claim 8, column 50, line 44, delete "coded" and substitute therefor --code--.

Claim 12, column 51, line 4, delete "tasks" and substitute therefor --task--.

Signed and Sealed this

Ninth Day of August, 1994

Attest:

BRUCE LEHMAN

*Attesting Officer*  *Commissioner of Patents and Trademarks*